(12) United States Patent
Chujoh et al.

(10) Patent No.: US 12,206,888 B2
(45) Date of Patent: Jan. 21, 2025

(54) VIDEO DECODING APPARATUS AND VIDEO CODING APPARATUS

(71) Applicant: Sharp Kabushiki Kaisha, Sakai (JP)

(72) Inventors: Takeshi Chujoh, Sakai (JP); Tomoko Aono, Sakai (JP); Tomohiro Ikai, Sakai (JP); Eiichi Sasaki, Sakai (JP); Yukinobu Yasugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/134,600

(22) Filed: Apr. 14, 2023

(65) Prior Publication Data

US 2023/0300365 A1 Sep. 21, 2023

Related U.S. Application Data

(63) Continuation of application No. 17/544,991, filed on Dec. 8, 2021, now Pat. No. 11,671,620, which is a continuation of application No. 16/960,108, filed as application No. PCT/JP2019/000257 on Jan. 8, 2019, now Pat. No. 11,212,551.

(30) Foreign Application Priority Data

Jan. 9, 2018 (JP) ................. 2018-001191
Sep. 19, 2018 (JP) ................. 2018-175146

(51) Int. Cl.
*H04N 19/52* (2014.01)
*H04N 19/176* (2014.01)
*H04N 19/56* (2014.01)

(52) U.S. Cl.
CPC ........... *H04N 19/52* (2014.11); *H04N 19/176* (2014.11); *H04N 19/56* (2014.11)

(58) Field of Classification Search
CPC .... H04N 19/176; H04N 19/52; H04N 19/557; H04N 19/56; H04N 19/577; H04N 19/70
See application file for complete search history.

(56) References Cited

U.S. PATENT DOCUMENTS

| | | | | |
|---|---|---|---|---|
| 2003/0053543 | A1* | 3/2003 | Bhaumik | H04N 19/56 375/240.2 |
| 2006/0002474 | A1* | 1/2006 | Au | H04N 19/56 375/240.12 |
| 2007/0291846 | A1* | 12/2007 | Hussain | H04N 19/56 375/E7.113 |
| 2010/0215106 | A1* | 8/2010 | Au | H04N 19/573 375/E7.123 |

OTHER PUBLICATIONS

Chujoh et al., "Video Decoding Apparatus and Video Coding Apparatus", U.S. Appl. No. 17/544,991, filed Dec. 8, 2021.

* cited by examiner

*Primary Examiner* — Anner N Holder
(74) *Attorney, Agent, or Firm* — Keating & Bennett, LLP

(57) ABSTRACT

A load in processing of searching for a motion vector is reduced. In order to solve the problem described above, a motion vector derivation apparatus according to one aspect of the present invention that derives a motion vector to be referred to for generating a prediction image to be used for coding or decoding of a video includes a motion vector search unit configured to search for a motion vector on a prediction unit basis through matching processing. The motion vector search unit is configured to stop search of the motion vector, depending on whether or not a conditional expression according to a pixel bit-depth is satisfied.

3 Claims, 25 Drawing Sheets

(a)
| SPATIAL MERGE CANDIDATE (BLOCK L) |
|---|
| SPATIAL MERGE CANDIDATE (BLOCK A) |
| SPATIAL MERGE CANDIDATE (BLOCK AR) |
| SPATIAL MERGE CANDIDATE (BLOCK BL) |
| SPATIAL-TEMPORAL MERGE CANDIDATE (ATMVP) |
| SPATIAL-TEMPORAL MERGE CANDIDATE (STMVP) |
| SPATIAL MERGE CANDIDATE (BLOCK AL) |
| TEMPORAL MERGE CANDIDATE (TMVP) |
| COMBINED MERGE CANDIDATE |
| ZERO MERGE CANDIDATE |
(b)
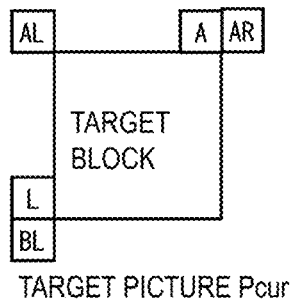
TARGET PICTURE Pcur
(c)
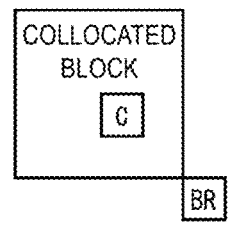
FIG. 7

| slice_segment_header( ) { | Descriptor |
|---|---|
|   first_slice_segment_in_pic_flag | u(1) |
|   ... | |
|   if( !first_slice_segment_in_pic_flag ) { | |
|     if( dependent_slice_segments_enabled_flag ) | |
|       dependent_slice_segment_flag | u(1) |
|       slice_segment_address | u(v) |
|   } | |
|   if( !dependent_slice_segment_flag ) { | |
|     ... | |
|     slice_type | ue(v) |
|     ... | |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       ... | |
|     } | |
|     if( slice_type == P || slice_type == B ) { | |
|       ... | |
|       if( slice_temporal_mvp_enabled_flag ) { | |
|         if( slice_type == B ) | |
|           collocated_from_l0_flag | u(1) |
|         if( ( collocated_from_l0_flag && num_ref_idx_l0_active_minus1 > 0 ) \|\| ( !collocated_from_l0_flag && num_ref_idx_l1_active_minus1 > 0 ) ) | |
|           collocated_ref_idx | ue(v) ⊢SYN01 |
|       } | |
|     } | |
|   } | |
|   if( tiles_enabled_flag \|\| entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset_minus1[ i ] | u(v) |
|     } | |
|   } | |
| } | |

FIG. 8

| seq_parameter_set_rbsp( ) { | Descriptor |
|---|---|
| bit_depth_luma_minus8 | ue(v) |
| bit_depth_chroma_minus8 | ue(v) |
| decoder_side_distortion_bit_depth | ue(v) |
| } | |

FIG. 24

| seq_parameter_set_rbsp( ) { | Descriptor |
|---|---|
| bit_depth_luma_minus8 | ue(v) |
| bit_depth_chroma_minus8 | ue(v) |
| refine_mv_use_flag | u(1) |
| } | |

FIG. 25

VIDEO DECODING APPARATUS AND VIDEO CODING APPARATUS

TECHNICAL FIELD

Embodiments of the present invention relate to a motion vector derivation apparatus, a video decoding apparatus, and a video coding apparatus.

BACKGROUND ART

A video coding apparatus (image coding apparatus) which generates coded data by coding a video, and a video decoding apparatus (image decoding apparatus) which generates decoded images by decoding the coded data are used to transmit or record a video efficiently.

For example, specific video coding schemes include methods suggested in H.264/AVC and High-Efficiency Video Coding (HEVC).

In such a video coding scheme, images (pictures) constituting a video are managed by a hierarchy structure including slices obtained by splitting images, Coding Tree Units (CTUs) obtained by splitting the slices, coding units (also sometimes referred to as Coding Units (CUs)) obtained by splitting the coding tree units, Prediction Units (PUs) which are blocks obtained by splitting coding units, and Transform Units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original image) are coded. Generation methods of prediction images include an inter-picture prediction (an inter prediction) and an intra-picture prediction (intra prediction) (NPL 2).

Examples of a technique of recent video coding and decoding are described in NPL 1. NPL 2 describes a technology called Pattern matched motion vector derivation, whereby a prediction image is generated by deriving a motion vector through matching of decoded images without transmitting motion vector information from a coder side to a decoder side.

CITATION LIST

Non Patent Literature

NPL 1: "Algorithm Description of Joint Exploration Test Model 7", JVET-G1001, Joint Video Exploration Team (JVET) of ITU-T SG 16 WP 3 and ISO/IEC JTC 1/SC 29/WG 11, 2017-08-19 02:20:15

NPL 2: ITU-T H.265 (February 2018) SERIES H: AUDIOVISUAL AND MULTIMEDIA SYSTEMS Infrastructure of audiovisual services—Coding of moving video High efficiency video coding

SUMMARY OF INVENTION

Technical Problem

In a case that a prediction image is generated by using a technology of deriving a motion vector through matching of decoded images, motion vector information is not transmitted from a coder side to a decoder side. Thus, it appears that the technology simply only requires minimization of prediction errors. However, in a case that the technology is used together with another prediction scheme, a derived motion vector affects generation of prediction images of temporally and spatially neighboring blocks. Accordingly, a reference to be used to derive a motion vector makes a significant difference in prediction efficiency.

Further, the prior art as described above still has room to reduce a load of processing in a case that a motion vector of a target block is searched for.

The present invention has an object to improve coding efficiency by improving a reference to be used to derive a motion vector.

Further, one aspect of the present invention is made in view of the problems described above, and has an object to reduce a load of processing in a case that a motion vector is searched for.

Solution to Problem

A prediction image generator according to an embodiment of the present invention includes a matching prediction processing unit configured to generate a prediction image, which is a prediction image of a target block, by using a decoded image in a region other than the target block as a template, the matching prediction processing unit including a value of a pixel bit-depth in calculation of a matching cost.

Further, in order to solve the problems, a motion vector derivation apparatus according to one aspect of the present invention that derives a motion vector to be referred to for generating a prediction image to be used for coding or decoding of a video includes a motion vector search unit configured to search for a motion vector for each of prediction units through matching processing, the motion vector search unit being configured to stop search of the motion vector, according to whether or not a conditional expression according to a pixel bit-depth is satisfied.

Advantageous Effects of Invention

According to the configuration described above, a prediction image that improves coding efficiency can be generated. In addition, a load of processing in a case that a motion vector is searched for can be reduced.

BRIEF DESCRIPTION OF DRAWINGS

FIG. 7 is a diagram in which (a) illustrates a prediction vector candidate list (merge candidate list), and (b) and (c) illustrate a relationship of positions of a target block and a reference block.

FIG. 8 is a diagram illustrating an example of syntax of a slice header.

FIG. 24 is a diagram illustrating an example of syntax of a sequence header according to the present embodiment.

FIG. 25 is a diagram illustrating an example of syntax of a sequence header according to the present embodiment.

DESCRIPTION OF EMBODIMENTS

First Embodiment

Hereinafter, embodiments of the present invention are described with reference to the drawings.

Figure 1:
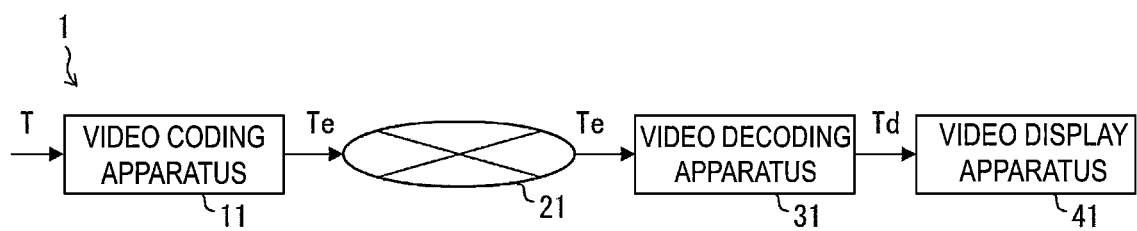
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system configured to transmit coding streams of a coding target image having been coded, decode the transmitted codes, and display an image. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The video decoding apparatus 31 decodes each of the coding streams Te transmitted by the network 21, and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Some examples of types of such a display are a stationary type, a mobile type, and an HMD. In a case that the video decoding apparatus 31 has high processing capability, an enhanced layer image having high image quality is displayed, and in a case that the image decoding apparatus 31 has only lower processing capability, a base layer image which does not require as high processing capability and display capability as the enhanced layer is displayed.

Operator

Operators used herein will be described below.

>> is a right bit shift, << is a left bit shift, & is a bitwise AND, | is a bitwise OR, and |= space is an OR assignment operator.

|| space denotes a logical sum.

x?y:z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

abs(a) is a function that returns an absolute value of a.

Int(a) is a function that returns an integer value of a.

floor(a) is a function that returns a maximum integer equal to or less than a.

a/d represents division of a by d (quotient is rounded off to the closest whole number).

avg(a(i)) is a function that derives an average value of N from a(0) to a(N−1).

sqrt(a) is a function that returns a value of a square root of a.

Structure of Coding Stream Te

Prior to the detailed description of the video coding apparatus 11 and the video decoding apparatus 31 according to the present embodiment, the data structure of the coding stream Te generated by the video coding apparatus 11 and decoded by the video decoding apparatus 31 will be described.

Figure 2:
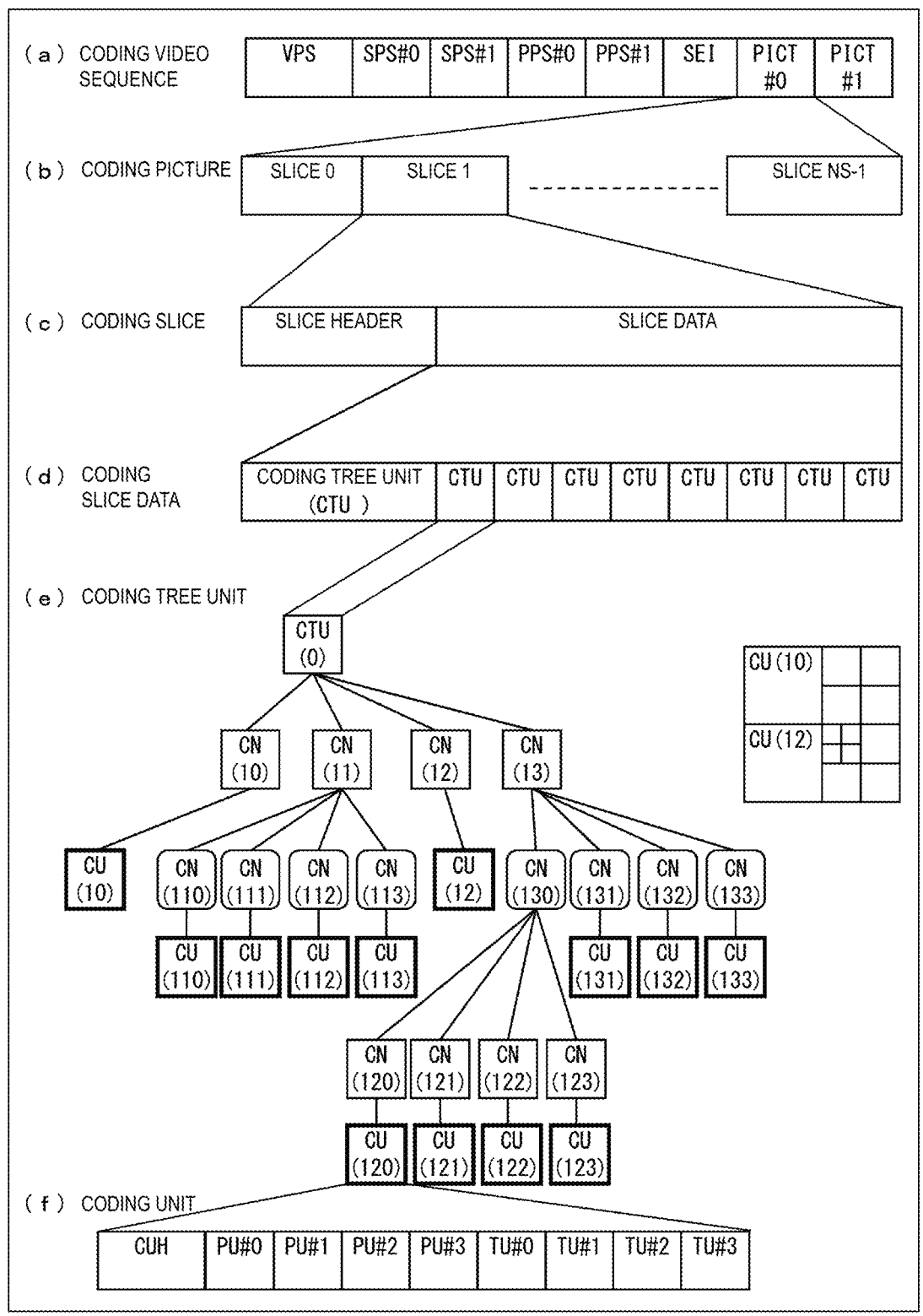
FIG. 2 is a diagram illustrating a hierarchy structure of data of a coding stream according to the present embodiment.

FIG. 2 is a diagram illustrating the hierarchy structure of data in the coding stream Te. The coding stream Te includes a sequence and multiple pictures constituting a sequence illustratively. (a) to (f) of FIG. 2 are diagrams indicating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the video decoding apparatus 31 to decode the sequence SEQ of a processing target is prescribed. As illustrated in (a) of FIG. 2, the sequence SEQ includes a Video Parameter Set VPS, a Sequence Parameter Set SPS, a Picture Parameter Set PPS, a picture PICT, and Supplemental Enhancement Information SEI. Here, a value indicated after #indicates a layer ID.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the video decoding apparatus 31 to decode a target sequence is prescribed. For example, width and height of a picture and a pixel bit-depth of each of luminance and chrominance are prescribed. Note that multiple SPSs may exist. In that case, any of multiple SPSs is selected from the PPS.

As an example of the present embodiment, semantics as below is illustrated on an assumption that a pixel bit-depth of each of luminance and chrominance and a bit-depth of error evaluation of a matching cost in the SPS are described as the syntax as in FIG. 24. Regarding the bit-depth of error evaluation in derivation of a normal motion vector, processing is performed only in a coder side, and thus motion vector information is not necessarily explicitly transmitted to a decoder side. However, in the technology called Pattern matched motion vector derivation where a prediction image is generated by deriving a motion vector through matching of decoded images without transmitting motion vector information from a coder side to a decoder side, explicit transmission of motion vector information allows for conformity of a reference in derivation of a motion vector with that used in a technique other than Pattern matched motion vector derivation.

bit_depth_luma_minus8 indicates values of a luminance pixel bit-depth BitDepthY and a luminance quantization parameter range offset QpBdOffsetY as follows.

$$BitDepthY=8+bit\_depth\_luma\_minus8$$

$$QpBdOffsetY=6*bit\_depth\_luma\_minus8$$

Note that the range of bit_depth_luma_minus8 must be 0 or more and 8 or less.

bit_depth_chroma_minus8 indicates values of a chrominance pixel bit-depth BitDepthC and a chrominance quantization parameter range offset QpBdOffsetC as follows.

$$BitDepthC=8+bit\_depth\_chroma\_minus8$$

$$QpBdOffsetC=6*bit\_depth\_chroma\_minus8$$

Note that the range of bit_depth_chroma_minus8 must be 0 or more and 8 or less.

decoder_side_distortion_bit_depth is a bit-depth of error error evaluation, and values of a shift amount ShiftDistortionBitDepthY for adjusting the luminance pixel bit-depth and a shift amount ShiftDistortionBitDepthC for adjusting the chrominance pixel bit-depth are calculated as follows.

$$ShiftDistortionBitDepthY=BitDepthY-decoder\_side\_distortion\_bit\_depth$$

$$ShiftDistortionBitDepthC=BitDepthC-decoder\_side\_distortion\_bit\_depth$$

Note that the range of decoder_side_distortion_bit_depth must be 8 or more and min(BitDepthY, BitDepthC) or less.

FIG. 24 illustrates an example of the SPS. However, the syntaxes described above may be used at the level of the PPS or the Slice. Note that the present embodiment illustrates an example in which decoder_side_distortion_bit_depth is explicitly described in syntax and information is transmitted from a coder side to a decoder side in the form of coded data. However, decoder_side_distortion_bit_depth may be implicitly prescribed in conjunction with the pixel bit-depths. Note that such is applicable on the condition that the range is 8 or more and min(BitDepthY, BitDepthC) or less.

In the picture parameter set PPS, a set of coding parameters referred to by the video decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each slice header in a target sequence.

Coding Picture

In the coding picture, a set of data referred to by the video decoding apparatus 31 to decode the picture PICT of a processing target is prescribed. As illustrated in (b) of FIG. 2, the picture PICT includes slices $S_0$ to $S_{NS-1}$ (NS is the total number of slices included in the picture PICT).

Note that in a case not necessary to distinguish the slices $S_0$ to $S_{NS-1}$ below, subscripts of reference signs may be omitted and described. The same applies to other data included in the coding stream Te described below and described with an added subscript.

Coding Slice

In the coding slice, a set of data referred to by the video decoding apparatus 31 to decode the slice S of a processing target is prescribed. As illustrated in (c) of FIG. 2, the slice S includes a slice header SH and a slice data SDATA.

The slice header SH includes a coding parameter group referred to by the video decoding apparatus 31 to determine a decoding method of a target slice. Slice type indication information (slice_type) to indicate a slice type is one example of a coding parameter included in the slice header SH.

Examples of slice types that can be indicated by the slice type indication information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that an inter prediction is not limited to a uni-prediction and a bi-prediction. A prediction image may be generated by using a larger number of reference pictures. The terms "P slice" and "B slice" hereinafter each refer to a slice including a block that can be subjected to an inter prediction.

Note that, the slice header SH may include a reference (pic_parameter_set_id) to the picture parameter set PPS included in the coding video sequence.

Coding Slice Data

In the coding slice data, a set of data referred to by the video decoding apparatus 31 to decode the slice data SDATA of a processing target is prescribed. As illustrated in (d) of FIG. 2, the slice data SDATA includes Coding Tree Units (CTUs) (CTU blocks). The CTU is a block of a fixed size (for example, 64×64) constituting a slice, and may be referred to as a Largest Coding Unit (LCU).

Coding Tree Unit

As illustrated in (e) of FIG. 2, a set of data referred to by the video decoding apparatus 31 to decode a coding tree unit of a processing target is prescribed. The coding tree unit is subjected to recursive quad tree splits (QT split) or binary tree splits (BT split) to be split into Coding Units (CUs), each of which is a basic unit of coding processing. A tree structure obtained by the recursive quad tree splits or binary tree splits is referred to as a Coding Tree (CT), and nodes of a tree structure obtained thereby are referred to as Coding Nodes (CN). Intermediate nodes of a quad tree and a binary tree are coding nodes, and the coding tree unit itself is also prescribed as the highest coding node.

The CT includes, as CT information, a QT split flag (cu_split_flag) indicating whether or not to perform a QT split and a BT split mode (split_bt_mode) indicating a split method of a BT split. cu_split_flag and/or split_bt_mode is transmitted for each coding node CN. In a case that cu_split_flag is 1, the coding node CN is split into four coding node CNs. In a case that cu_split_flag is 0 and split_bt_mode is 1, the coding node CN is horizontally split into two coding node CNs. In a case that split_bt_mode is 2, the coding node CN is vertically split into two coding node CNs. In a case that split_bt_mode is 0, the coding node CN is not split, and has one coding unit CU as its node. The coding unit CU is an end node (leaf node) of the coding nodes, and is not split anymore.

Further, in a case that the size of the coding tree unit CTU is 64×64 pixels, the size of the coding unit may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in (f) of FIG. 2, a set of data referred to by the video decoding apparatus 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction parameters (a reference picture index, a motion vector, and the like) of each prediction unit (PU) where the coding unit is split into one or multiple are prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by horizontal split into two and vertical split into two.

The prediction processing may be performed for each of these prediction units (subblocks).

Generally speaking, there are two types of predictions in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. The PUs included in the CU are expressed as PU0, PU1, PU2, and PU3 sequentially.

In the transform tree, the coding unit is split into one or multiple transform unit TUs, and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters added to the PUs. The prediction parameter includes a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters included in a coded data include a PU split mode part_mode, a merge flag merge_flag, a merge index merge_idx, an inter prediction indicator inter_pred_idc, a reference picture index ref_idx_lX (refIdxLX), a prediction vector index mvp_lX_idx, and a difference vector mvdLX.

Reference Picture List

Figure 3:
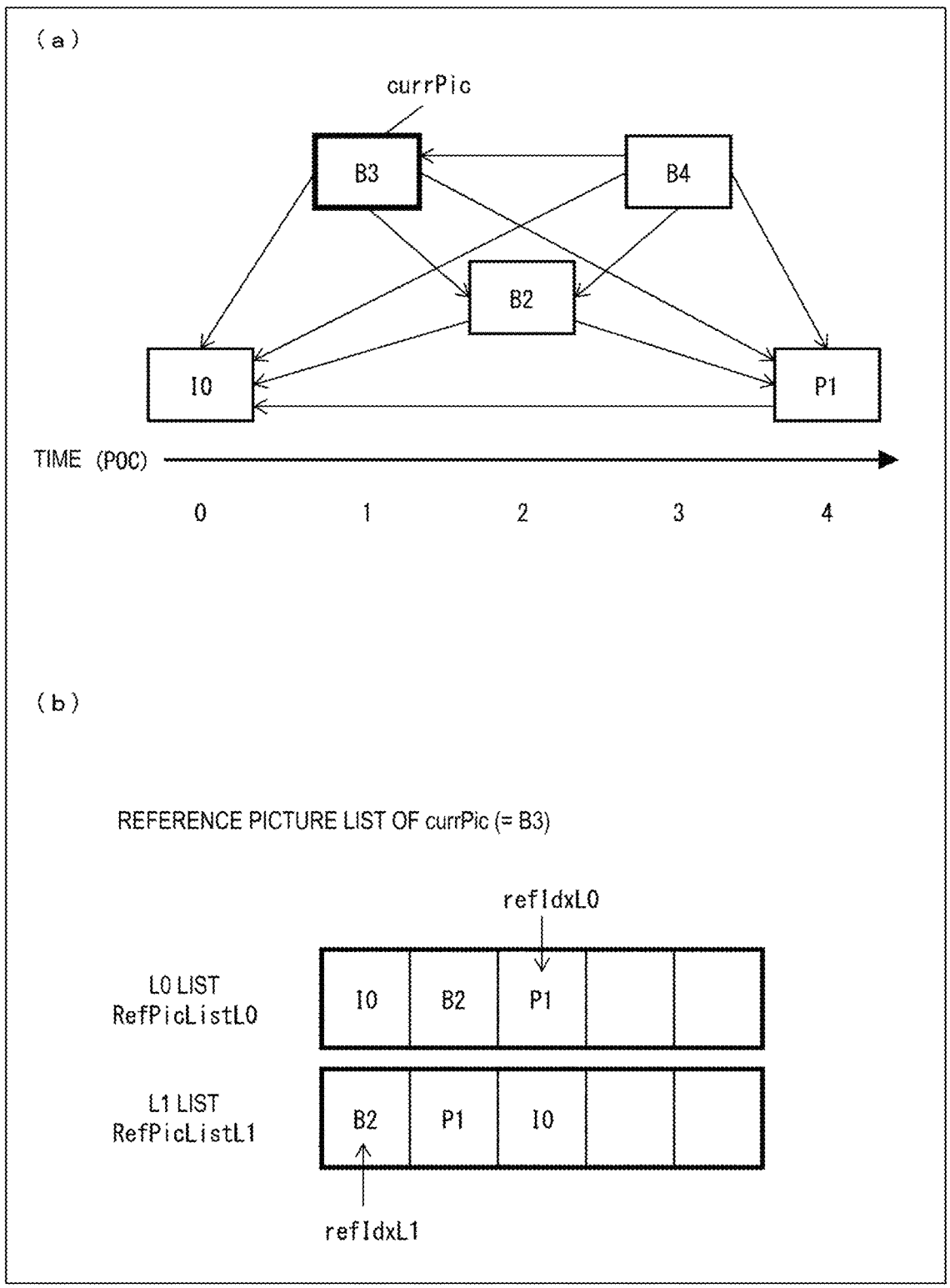
FIG. 3 is a conceptual diagram illustrating an example of reference pictures and reference picture lists.

A reference picture list is a list constituted by reference pictures stored in a reference picture memory 306. FIG. 3 is a conceptual diagram illustrating an example of reference pictures and reference picture lists. In FIG. 3(a), a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, decoding order of the pictures is I0, P1, B2, B3, and B4, and the display order is I0, B3, B2, B4, and P1. FIG. 3(b)

indicates an example of reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. For an individual prediction unit, which picture in a reference picture list RefPicListX (X=0 or 1) is actually referred to is indicated with a reference picture index refIdxLX. The diagram indicates an example where reference pictures P1 and B2 are referred to by refIdxL0 and refIdxL1. Note that LX is a description method used in a case of not distinguishing the L0 prediction and the L1 prediction, and in the following, distinguishes parameters for the L0 list and parameters for the L1 list by replacing LX with L0 and L1.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge mode is a mode to use to derive from prediction parameters of neighboring PUs already processed without including a prediction list utilization flag predFlagLX (or an inter prediction indicator inter_pred_idc), a reference picture index refIdxLX, and a motion vector mvLX in a coded data. The AMVP mode is a mode to include an inter prediction indicator inter_pred_idc, a reference picture index refIdxLX, and a motion vector mvLX in a coded data. Note that, the motion vector mvLX is coded as a prediction vector index mvp_lX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to uses reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_lX_idx is an index indicating a prediction vector, and the reference picture index refIdxLX is an index indicating reference pictures managed in a reference picture list.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap (shift) quantity between blocks in two different pictures. A prediction vector and a difference vector related to the motion vector mvLX is referred to as a prediction vector mvpLX and a difference vector mvdLX respectively.

Determination of Bi-Prediction biPred

A flag biPred of whether or not a bi-prediction BiPred can be derived from whether or not two prediction list utilization flags are both 1. For example, the flag can be derived by the following expression.

biPred=(predFlagL0==1&& predFlagL1==1)

The flag biPred can be also derived from whether an inter prediction indicator is a value indicating to use two prediction lists (reference pictures). For example, the flag can be derived by the following expression.

biPred=(inter_pred_idc==PRED_BI)?1:0

Intra Prediction

Next, an intra prediction parameter will be described.

The intra prediction parameter is a parameter that is used to perform prediction processing on the CU by using information in a picture, and is an intra prediction mode IntraPredMode, for example. A luminance intra prediction mode IntraPredModeY and a chrominance intra prediction mode IntraPredModeC may be different. There are 67 types of intra prediction modes, for example, which include a planar prediction, a DC prediction, and an Angular (directional) prediction. A chrominance prediction mode IntraPredModeC uses, for example, any one of a planar prediction, a DC prediction, an Angular prediction, a direct mode (a mode using a prediction mode of luminance), and an LM prediction (a mode in which a linear prediction is performed from a luminance pixel).

Loop Filter

A loop filter is a filter provided in a coding loop, and is a filter that removes block distortion and ringing distortion to improve image quality. Major examples of the loop filter include a deblocking filter, a Sample Adaptive Offset (SAO), and an Adaptive Loop Filter (ALF).

Entropy Coding

Entropy coding includes a scheme in which syntax is subjected to variable-length coding by using a context (stochastic model) that is adaptively selected according to a type of syntax and circumstances, and a scheme in which syntax is subjected to variable-length coding by using a table or a calculation expression that is determined in advance. With the former scheme, namely Context Adaptive Binary Arithmetic Coding (CABAC), a stochastic model updated for each coded or decoded picture is stored in memory. Then, in the P picture or the B picture to be subjected to a subsequent inter prediction, a stochastic model of a picture using a quantization parameter of the same slice type and at the same slice level is selected from the stochastic models stored in the memory for an initial state of the context of the target picture, and is used for coding and decoding processing.

Configuration of Video Decoding Apparatus

Figure 4:
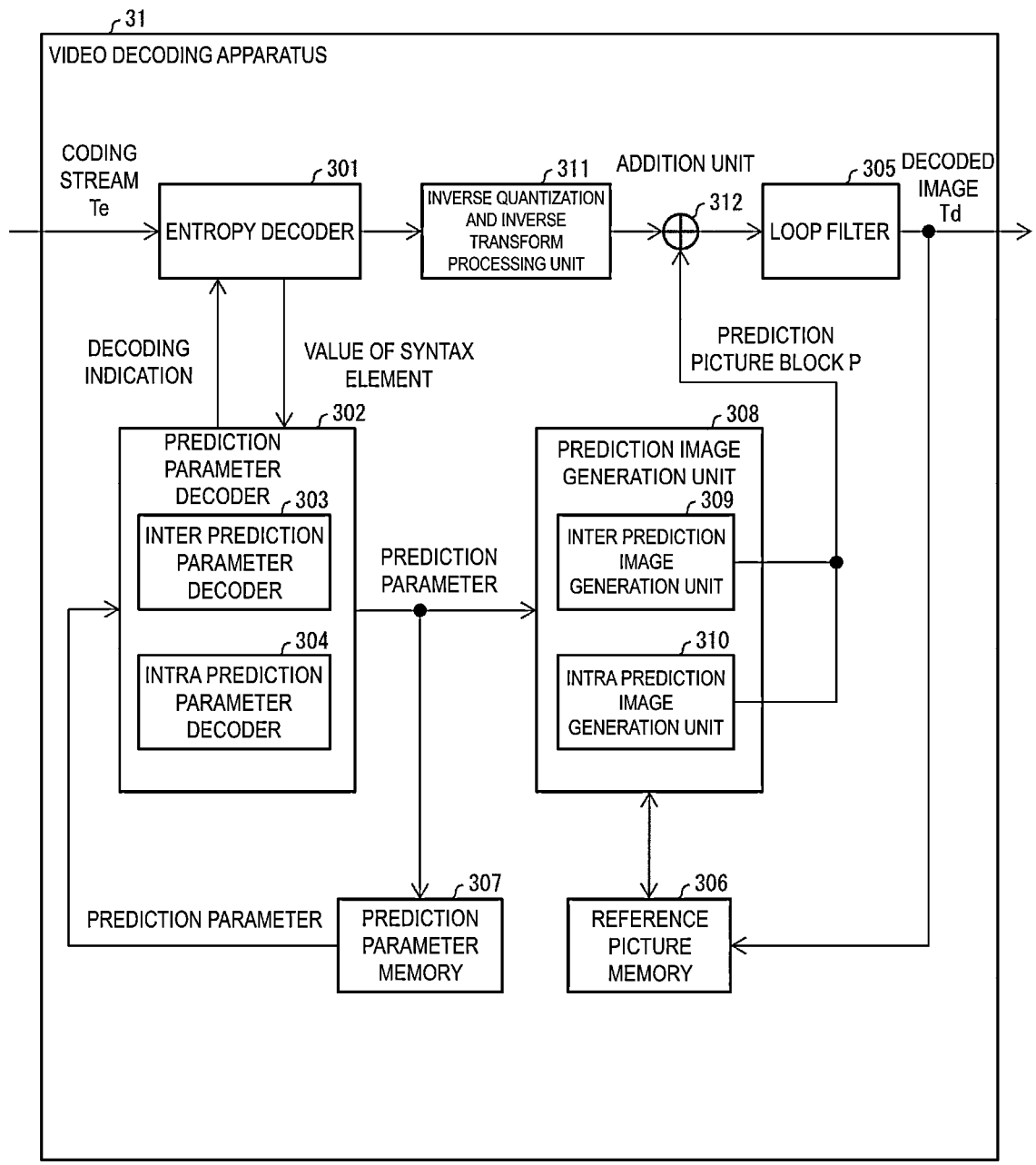
FIG. 4 is a diagram illustrating a configuration of a video decoding apparatus according to the present embodiment.

FIG. 4 illustrates the video decoding apparatus (image decoding apparatus) 31 according to the present invention. The video decoding apparatus 31 includes an entropy decoder 301, a prediction parameter decoder (a prediction image decoding apparatus) 302, a loop filter 305, a reference picture memory 306, a prediction parameter memory 307, a prediction image generator (prediction image generation apparatus) 308, an inverse quantization and inverse transform processing unit 311, and an addition unit 312. Note that the loop filter 305 may not be included in the video decoding apparatus 31, in keeping with the video coding apparatus 11 to be described later.

The prediction parameter decoder 302 includes an inter prediction parameter decoder 303 and an intra prediction parameter decoder 304. The prediction image generator 308 includes an inter prediction image generator 309 and an intra prediction image generator 310.

Further, the following will describe examples in which processing is performed for each CTU, CU, PU, or TU. However, the present invention is not limited to those examples, and processing may be performed for each CU, instead TU or PU. Alternatively, the CTU, the CU, the PU, and the TU may be interpreted as a block, and processing may be performed for each of such block units.

The entropy decoder 301 performs entropy decoding on the coding stream Te input from the outside, and separates and decodes individual codes (syntax elements). Separated codes include a prediction parameter to generate a prediction image and residual information to generate a difference image and the like.

The entropy decoder 301 outputs a part of the separated codes to the prediction parameter decoder 302. For example, a part of the separated codes includes a prediction mode predMode, a PU split mode part_mode, a merge flag merge_flag, a merge index merge_idx, an inter prediction indicator inter_pred_idc, a reference picture index ref_idx_lX, a prediction vector index mvp_lX_idx, and a difference vector mvdLX. The control of which code to decode is performed based on an indication of the prediction parameter decoder 302. The entropy decoder 301 outputs quantization transform coefficients to the inverse quantization and inverse transform processing unit 311. The quantization transform coefficients are coefficients obtained by performing frequency transform, such as Discrete Cosine Transform (DCT), Discrete Sine Transform (DST), and Karyhnen Loeve Transform (KLT), and quantization on a residual signal in coding processing.

The inter prediction parameter decoder 303 decodes an inter prediction parameter with reference to a prediction parameter stored in the prediction parameter memory 307, based on a code input from the entropy decoder 301. The inter prediction parameter decoder 303 also outputs a decoded inter prediction parameter to the prediction image generator 308, and also stores the decoded inter prediction parameter in the prediction parameter memory 307. Details of the inter prediction parameter decoder 303 will be described later.

The intra prediction parameter decoder 304 decodes an intra prediction parameter with reference to a prediction parameter stored in the prediction parameter memory 307, based on a code input from the entropy decoder 301. The intra prediction parameter is a parameter used in a processing to predict a CU in one picture, for example, an intra prediction mode IntraPredMode. The intra prediction parameter decoder 304 outputs a decoded intra prediction parameter to the prediction image generator 308, and also stores the decoded intra prediction parameter in the prediction parameter memory 307.

The loop filter 305 applies a filter such as a deblocking filter, a sample adaptive offset (SAO), and an adaptive loop filter (ALF) on a decoded image of a CU generated by the addition unit 312. Note that the loop filter 305 need not necessarily include the three types of filters described above on the condition that the loop filter 305 corresponds to a loop filter of the video coding apparatus 11, and may include only a deblocking filter, for example.

The reference picture memory 306 stores a decoded image of a CU generated by the addition unit 312 in a prescribed position for each picture and CTU or CU of a decoding target.

The prediction parameter memory 307 stores a prediction parameter in a prescribed position for each picture and prediction unit (or a subblock, a fixed size block, and a pixel) of a decoding target. Specifically, the prediction parameter memory 307 stores an inter prediction parameter decoded by the inter prediction parameter decoder 303, an intra prediction parameter decoded by the intra prediction parameter decoder 304 and a prediction mode predMode separated by the entropy decoder 301. For example, inter prediction parameters stored include a prediction list utilization flag predFlagLX (the inter prediction indicator inter_pred_idc), a reference picture index refIdxLX, and a motion vector mvLX.

To the prediction image generator 308, a prediction mode predMode input from the entropy decoder 301 is input, and a prediction parameter is input from the prediction parameter decoder 302. The prediction image generator 308 reads a reference picture from the reference picture memory 306. The prediction image generator 308 generates a prediction image of a PU (block) or a subblock by using a prediction parameter input and a reference picture (reference picture block) read, with a prediction mode indicated by the prediction mode predMode.

Here, in a case that the prediction mode predMode indicates an inter prediction mode, the inter prediction image generator 309 generates a prediction image of a block or a subblock by an inter prediction by using an inter prediction parameter input from the inter prediction parameter decoder 303 and a read reference picture (reference picture block).

For a reference picture list (an L0 list or an L1 list) where a prediction list utilization flag predFlagLX is 1, the inter prediction image generator 309 reads a reference picture block from the reference picture memory 306 in a position indicated by a motion vector mvLX, based on a decoding target block from reference pictures indicated by the reference picture index refIdxLX. The inter prediction image generator 309 performs interpolation based on a read reference picture block and generates a prediction image (interpolation image, motion compensation image) of a block. The inter prediction image generator 309 outputs the generated prediction image of the block to the addition unit 312. Here, the reference picture block is a set of pixels of a reference picture (usually in the form of a rectangle, hence the term "block"), and is a region that is referred to in order to generate a prediction image of a block or a subblock.

In a case that the prediction mode predMode indicates an intra prediction mode, the intra prediction image generator 310 performs an intra prediction by using an intra prediction parameter input from the intra prediction parameter decoder 304 and a read reference pixel.

The intra prediction image generator 310 refers to a prediction mode indicated by the intra prediction mode IntraPredMode for a read adjacent block, and generates a prediction image of a block. The intra prediction image generator 310 outputs the generated prediction image of the block to the addition unit 312.

The inverse quantization and inverse transform processing unit 311 performs inverse quantization on quantization transform coefficients input from the entropy decoder 301 and calculates transform coefficients. The inverse quantization and inverse transform processing unit 311 performs inverse frequency transform, such as inverse DCT, inverse DST, and inverse KLT, on the calculated transform coefficients, and calculates a prediction residual signal. The inverse quantization and inverse transform processing unit 311 outputs the calculated residual signal to the addition unit 312.

The addition unit 312 adds a prediction image of a block input from the inter prediction image generator 309 or the prediction image generator 308 and a residual signal input from the inverse quantization and inverse transform processing unit 311 for each pixel, and generates a decoded image of a block. The addition unit 312 outputs the generated decoded image of the block to at least one of the deblocking filter, the SAO unit, and the ALF.

Configuration of Inter Prediction Parameter Decoder

Next, a configuration of the inter prediction parameter decoder 303 will be described.

Figure 5:
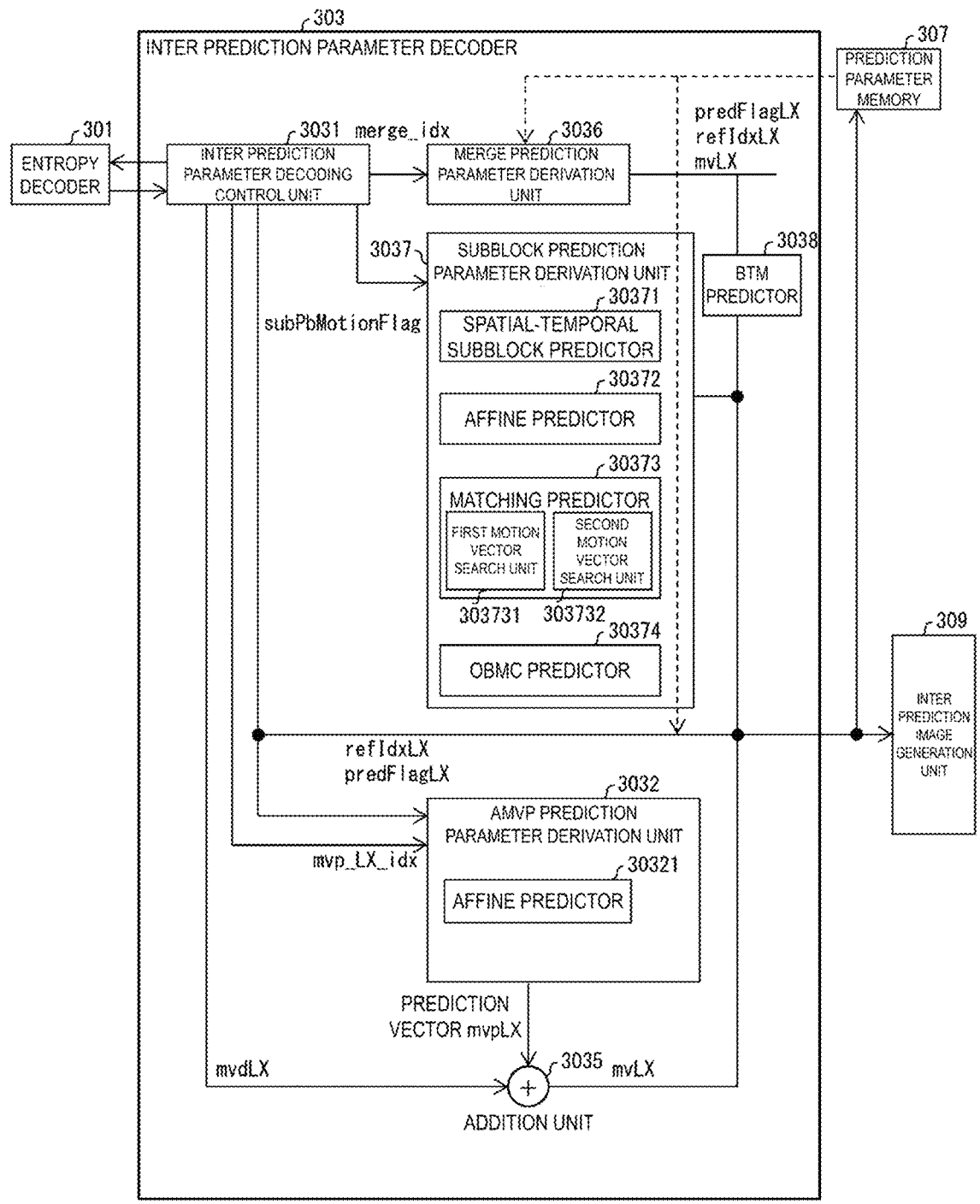
FIG. 5 is a diagram illustrating a configuration of an inter prediction parameter decoder according to the present embodiment.

FIG. 5 is a schematic diagram illustrating a configuration of the inter prediction parameter decoder 303 according to the present embodiment. The inter prediction parameter decoder 303 includes an inter prediction parameter decoding control unit 3031, an AMVP prediction parameter derivation unit 3032, an addition unit 3035, a merge prediction parameter derivation unit 3036, a subblock prediction parameter derivation unit 3037, and a BTM predictor 3038. The AMVP prediction parameter derivation unit 3032, the merge prediction parameter derivation unit 3036, the subblock prediction parameter derivation unit 3037, and the BTM predictor 3038 may be collectively referred to as a motion vector derivation unit (motion vector derivation apparatus).

The inter prediction parameter decoding control unit 3031 commands the entropy decoder 301 to decode codes (syntax elements) related to an inter prediction, and extracts codes (syntax elements) included in coded data, such as a PU split mode part_mode, a merge flag merge_flag, a merge index merge_idx, an inter prediction indicator inter_pred_idc, a reference picture index ref_idx_lX, a prediction vector index mvp_lX_idx, and a difference vector mvdLX.

The inter prediction parameter decoding control unit 3031 first extracts the merge flag merge_flag. The inter prediction parameter decoding control unit 3031 indicating extraction of a certain syntax element means that the inter prediction parameter decoding control unit 3031 commands the entropy decoder 301 to decode the certain syntax element, and reads the certain syntax element from coded data.

In a case that the merge flag merge_flag is 0, i.e., in a case that the merge flag merge_flag indicates the AMVP prediction mode, the inter prediction parameter decoding control unit 3031 extracts an AMVP prediction parameter from coded data by using the entropy decoder 301. Examples of the AMVP prediction parameter includes the inter prediction indicator inter_pred_idc, the reference picture index refIdxLX, the prediction vector index mvp_lX_idx, and the difference vector mvdLX. The AMVP prediction parameter derivation unit 3032 derives the prediction vector mvpLX from the prediction vector index mvp_lX_idx. Details thereof will be described later. The inter prediction parameter decoding control unit 3031 outputs the difference vector mvdLX to the addition unit 3035. The addition unit 3035 adds the prediction vector mvpLX and the difference vector mvdLX, and derives a motion vector.

In a case that the merge flag merge_flag is 1, i.e., in a case that the merge flag merge_flag indicates the merge prediction mode, the inter prediction parameter decoding control unit 3031 extracts the merge index merge_idx as a prediction parameter related to the merge prediction. The inter prediction parameter decoding control unit 3031 outputs the extracted merge index merge_idx to the merge prediction parameter derivation unit 3036 (details thereof will be described later), and outputs the subblock prediction mode flag subPbMotionFlag to the subblock prediction parameter derivation unit 3037. The subblock prediction parameter derivation unit 3037 splits the block into multiple subblocks according to the value of the subblock prediction mode flag subPbMotionFlag, and derives a motion vector in each subblock. In other words, in the subblock prediction mode, the prediction block is predicted in each block having such a small size as 4×4 or 8×8. In comparison with a method in which the CU is split into multiple partitions (blocks having the size of 2N×N, N×2N, N×N, or the like) and syntax of a prediction parameter is coded and decoded in each partition, in the subblock prediction mode, multiple subblocks are collected into sets, and syntax of a prediction parameter is coded and decoded for each of the sets. Consequently, a larger amount of motion information of the subblocks can be coded with a small code amount. The subblock prediction parameter derivation unit 3037 (subblock prediction processing unit) splits a target block into multiple subblocks, and derives a motion vector of each subblock.

To give a detailed description, the subblock prediction parameter derivation unit 3037 (subblock prediction processing unit) includes at least one of a spatial-temporal subblock predictor 30371 (ATMVP prediction processing unit, STMVP prediction processing unit), an affine predictor 30372 (affine prediction processing unit), a matching motion derivation unit 30373 (matching prediction processing unit), and an OBMC predictor 30374, which perform subblock prediction in the subblock prediction mode.

The affine predictor 30372 (affine prediction processing unit) derives a motion vector of the subblock by using two or more reference motion vectors.

The spatial-temporal subblock predictor 30371 (ATMVP prediction processing unit) derives a motion vector of the subblock by using a motion vector at a point obtained by splitting a block of a reference picture located at a position corresponding to the target block.

The spatial-temporal subblock predictor 30371 (STMVP prediction processing unit) derives a motion vector of the subblock by using an adjacent motion vector that is motion vector of a block adjacent to the target block and a motion vector at a point obtained by splitting a block of a reference picture located at a position corresponding to the target block.

The matching motion derivation unit 30373 (matching prediction processing unit) is a matching prediction processing unit that derives a motion vector of each block through matching for each target block, and further derives a motion vector through matching for each of the subblocks by using the motion vector of each block as an initial motion vector.

Subblock Prediction Mode Flag

Here, a method used in the video decoding apparatus 31 and the video coding apparatus 11 (details thereof will be described later) to derive the subblock prediction mode flag subPbMotionFlag indicating whether or not a prediction mode of a certain block is the subblock prediction mode will be described. The video decoding apparatus 31 and the video coding apparatus 11 derive the subblock prediction mode flag subPbMotionFlag, based on the use of spatial subblock prediction SSUB, temporal subblock prediction TSUB, affine prediction AFFINE, or matching motion derivation MAT, which will be described later. For example, suppose a prediction mode selected in a certain block is represented by N (for example, N is a label representing a selected merge candidate). In this case, the subblock prediction mode flag subPbMotionFlag may be derived according to the following expression.

subPbMotionFlag=(N==TSUB)||(N==SSUB)||
(N==AFFINE)||(N==MAT)

In a case that the video decoding apparatus 31 and the video decoding apparatus 11 perform partial prediction, such as spatial subblock prediction SSUB or affine prediction AFFINE, the subblock prediction mode flag subPbMotionFlag may be derived as follows.

subPbMotionFlag=(N==SSUB)||(N==AFFINE)

Figure 6:
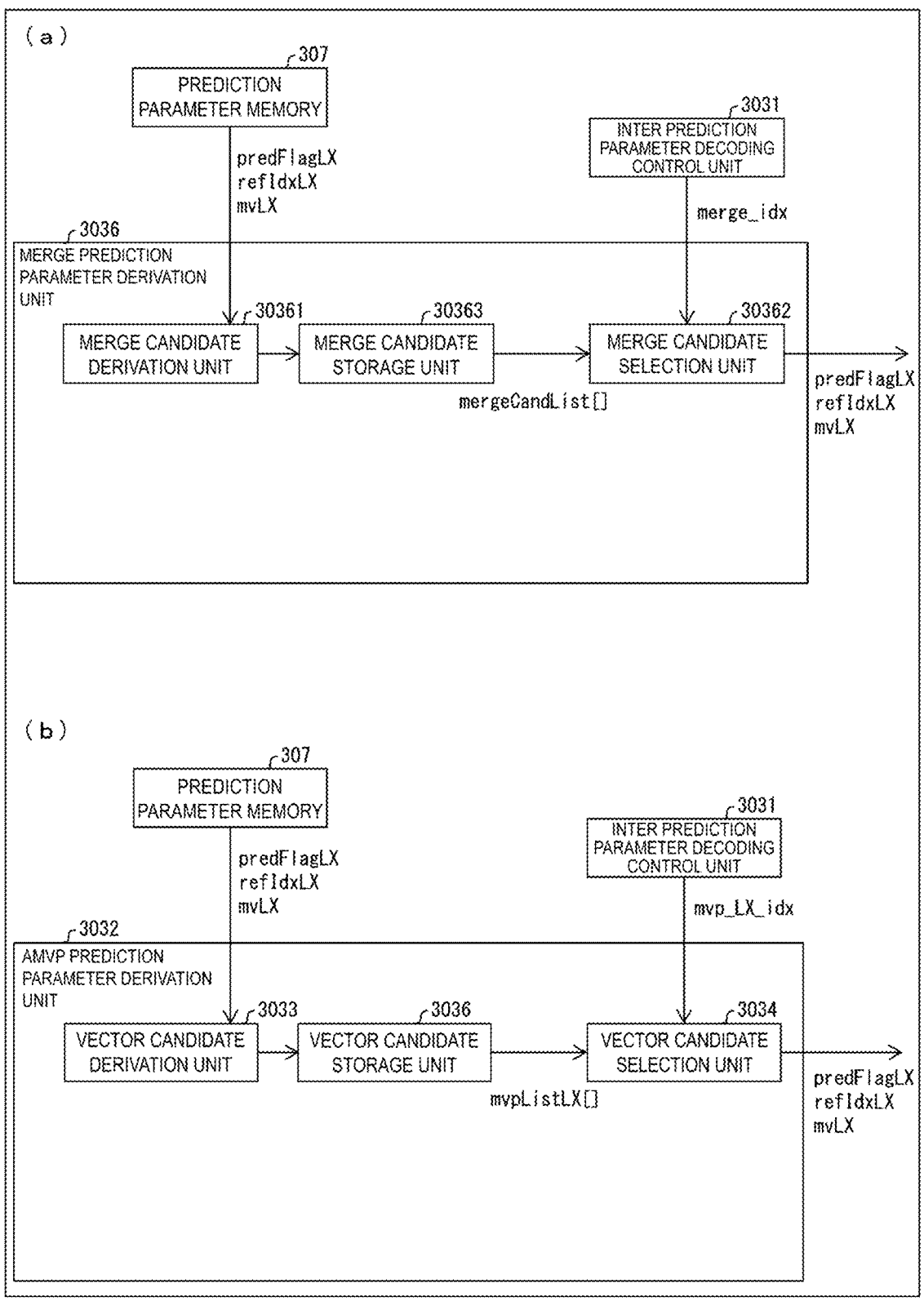
FIG. 6 is a diagram illustrating a configuration of an AMVP prediction parameter derivation unit and a merge prediction parameter derivation unit according to the present embodiment.

FIG. 6(a) is a schematic diagram illustrating a configuration of the merge prediction parameter derivation unit 3036 according to the present embodiment. The merge prediction parameter derivation unit 3036 includes a merge candidate derivation unit 30361, a merge candidate selection unit 30362, and a merge candidate storage unit 30363. The merge candidate storage unit 30363 stores merge candidates input from the merge candidate derivation unit 30361. Note that the merge candidates include the prediction list utilization flag predFlagLX, the motion vector mvLX, and the reference picture index refIdxLX. The merge candidates stored in the merge candidate storage unit 30363 are assigned indexes in accordance with a prescribed rule.

The merge candidate derivation unit 30361 derives the merge candidates by directly using a motion vector of an adjacent block and the reference picture index refIdxLX that have already been subjected to decoding processing. In addition to the above, the merge candidate derivation unit 30361 may derive the merge candidates by using affine prediction. In other words, the merge candidate derivation unit 30361 may use the affine prediction for spatial merge candidate derivation processing, temporal merge candidate derivation processing, combined merge candidate derivation processing, and zero merge candidate derivation processing, each of which will be described later. Note that the affine prediction is performed for each subblock, and prediction parameters are stored in the prediction parameter memory 307 for each subblock. Alternatively, the affine prediction may be performed for each pixel.

Spatial Merge Candidate Derivation Processing

As the spatial merge candidate derivation processing, the merge candidate derivation unit 30361 reads the prediction parameters (the prediction list utilization flag predFlagLX, the motion vector mvLX, and the reference picture index refIdxLX) stored in the prediction parameter memory 307, in accordance with a prescribed rule, derives the read prediction parameters as the merge candidates, and stores the merge candidates in a merge candidate list mergeCandList[ ] (prediction vector candidate list mvpListLX[ ]). The read prediction parameters are prediction parameters related to each of the blocks located within a prescribed range from the decoding target block (for example, all or a part of blocks bordering each of the lower left ends L and BL, the upper left end AL, and the upper right ends A and AR of the decoding target block illustrated in FIG. 7(b)).

Temporal Merge Candidate Derivation Processing

As the temporal merge derivation processing, the merge candidate derivation unit 30361 reads prediction parameters of the lower right block BR of a collocated block illustrated in FIG. 7(c) in a reference picture or the block C including coordinates of the center of the decoding target block from the prediction parameter memory 307 as merge candidates, and stores the merge candidates in the merge candidate list mergeCandList[ ]. In general, the block BR is preferentially added to the merge candidate list mergeCandList[ ]. In a case that the block BR does not have a motion vector (for example, an intra prediction block) or in a case that the block BR is located outside the picture, a motion vector of the block C is added to the prediction vector candidates. Addition of a motion vector of the collocated block, which is likely to have a different motion, as a prediction candidate increases the number of options of the prediction vector. As a result, coding efficiency is enhanced. To indicate a reference picture, for example, a reference picture index collocated_ref_idx (SYN01) indicated in the slice header of FIG. 8 may be used. Alternatively, a reference picture may be indicated by using a minimum index out of the reference picture indexes refIdxLX of blocks adjacent to the decoding target block.

For example, the merge candidate derivation unit 30361 may derive the position of the block C (xColCtr, yColCtr) and the position of the block BR (xColBr, yColBr) according to the following expression.

$xColCtr = xPb + (W \gg 1)$ $yColCtr = yPb + (H \gg 1)$ $xColBr = xPb + W$ $yColBr = yPb + H$

Here, (xPb, yPb) represents upper left coordinates of a target block, and (W, H) represents the width and the height of a target block.

Combined Merge Candidate Derivation Processing

As the combined merge derivation processing, the merge candidate derivation unit 30361 derives combined merge candidates by combining motion vectors and reference picture indexes of two different derived merge candidates that have already been derived and stored in the merge candidate storage unit 30363 as motion vectors of L0 and L1, respectively, and stores the combined merge candidates in the merge candidate list mergeCandList[ ].

Zero Merge Candidate Derivation Processing

As the zero merge candidate derivation processing, the merge candidate derivation unit 30361 derives merge candidates whose reference picture index refIdxLX is 0 and whose X component and Y component of the motion vector mvLX are both 0, and stores the merge candidates in the merge candidate list mergeCandList[ ].

The above merge candidates derived by the merge candidate derivation unit 30361 are stored in the merge candidate storage unit 30363. In the merge candidate list, labels of the names of the merge candidates may be stored, and motion vectors and reference picture indexes of the merge candidates may be stored. The order of storage in the merge candidate list mergeCandList[ ] is {L, A, AR, BL, AL, BR/C, combined merge candidate, zero merge candidate}, in which the blocks illustrated in FIGS. 7(b) and 7(c) and the combined merge candidates and the zero merge candidates are added. BR/C indicates that the block C is used in a case that the block BR is not available. Note that a reference block whose motion vector is not available (for example, a block is subjected to an intra prediction) is not stored in the merge candidate list.

The merge candidate selection unit 30362 selects a merge candidate assigned an index that corresponds to the merge index merge_idx input from the inter prediction parameter decoding control unit 3031 out of the merge candidates stored in the merge candidate list mergeCandList[ ] of the merge candidate storage unit 30363 as an inter prediction parameter of the target block. The merge candidate selection unit 30362 stores the selected merge candidate in the prediction parameter memory 307, and also outputs the selected merge candidate to the prediction image generator 308.

Subblock Predictor

Next, the subblock predictor will be described.

Spatial-Temporal Subblock Predictor 30371

The spatial-temporal subblock predictor 30371 derives a motion vector of a subblock obtained by splitting the target block, based on a motion vector of a block of a reference picture (for example, of an immediately preceding picture) temporally adjacent to the target block or a motion vector of a block spatially adjacent to the target block. Specifically, a motion vector spMvLX[xi][yi] (xi=xPb+BW*i, yj=yPb+BH*j, i=0, 1, 2, . . . , W/BW−1, j=0, 1, 2, . . . , H/BH−1) of each subblock of the target block is derived by scaling a motion vector of the reference picture in accordance with the reference picture used as a reference by the target block (temporal subblock prediction). Here, (xPb, yPb) represents upper left coordinates of a target block, W, H represents the size of a target block, and BW, BH represents the size of a subblock.

Note that the description herein may use a suffix [k][l] using k and j each being an index (integer value) representing a subblock, instead of a suffix [xi][yi] using xi and yi each being a value of coordinates. This, however, does not make a difference in the processing. In this case, spMvLX[k][l] (k=0 . . . NBW−1, l=0 . . . NBH−1) is derived by using NBW and NBH, which represent the number of subblocks in the horizontal direction and the vertical direction, respectively. Here, the following expressions hold: NBW=W/BW, NBH=H/BH.

Further, the motion vector spMvLX[xi][yi] (xi=xPb+BW*i, yj=yPb+BH*j, i=0, 1, 2, . . . , W/BW−1, j=0, 1, 2, . . . , H/BH−1) of each subblock of the target block may be derived by calculating a weighted average of motion vectors of adjacent blocks according to a distance from a subblock obtained by splitting the target block (spatial subblock prediction).

The temporal subblock prediction candidate TSUB and the spatial subblock prediction candidate SSUB in the above are selected as one mode (merge candidate) of the merge mode.

Motion Vector Scaling

A method of deriving scaling of a motion vector will be described. Let My be a motion vector, Pic1 (colPic) be a picture including a block having the motion vector Mv, Ric2 (refPicCol) be a reference picture having the motion vector Mv, sMv be a motion vector after scaling, Pic3 (currPic) be a picture including a block having the motion vector sMv after scaling, and Pic4 (refPic) be a reference picture used as a reference by the motion vector sMv after scaling. In this case, an sMv derivation function MvScale(Mv, Pic1, Pic2, Pic3, Pic4) is expressed as in the following expression.

sMv=MvScale(Mv,Pic1,Pic2,Pic3,Pic4)=Clip3(−R1, R1−1, sign(distScaleFactor*Mv)*((abs (distScaleFactor*Mv)+round1−1)>> shift1))   (Expression MVSCALE-1)

distScaleFactor=Clip3(−R2,R2−1,(tb*tx+round2)>> shift2)

tx=(16384+abs(td)>>1)/td td=DiffPicOrderCnt(Pic1,Pic2)//e.g.,POC diff of col pics tb=DiffPicOrderCnt(Pic3,Pic4)//e.g. POC diff of curr pics Here, round1, round2, shift1, and shift2 are round values and shift values for performing division by using a reciprocal, examples of which include round1=1<<(shift1−1), round2=1<<(shift2−1), shift1=8, and shift2=6, for example. DiffPicOrderCnt(Pic1, Pic2) is a function that returns a difference of temporal information (for example, POC) between Pic1 and Pic2. R1, R2, and R3 are used to limit a range of values in order to perform processing with limited accuracy, examples of which include R1=32768, R2=4096, and R3=128, for example.

Further, the scaling function MvScale(Mv, Pic1, Pic2, Pic3, Pic4) may be expressed as in the following expression.

MvScale(Mv,Pic1,Pic2,Pic3,Pic4)= Mv*DiffPicOrderCnt(Pic3,Pic4)/DiffPicOrder-Cnt(Pic1,Pic2)   (Expression MVSCALE-2)

In other words, My may be scaled according to a ratio between a difference of temporal information between Pic1 and Pic2 and a difference of temporal information between Pic3 and Pic4.

Adaptive Temporal Motion Vector Prediction (ATMVP) and Spatial-Temporal Motion Vector Prediction (STMVP) will be described as specific methods for spatial-temporal subblock predictions.

ATMVP

ATMVP is a scheme in which a prediction image is generated for each subblock by deriving a motion vector for each subblock of a target block, based on motion vectors of spatially adjacent blocks (L, A, AR, BL, and AL) of the target block of a target picture PCur illustrated in FIG. 7(b). In ATMVP, processing is performed in the following procedure.

Step 1) Block Level Motion Vector Derivation

The spatially adjacent blocks L, A, AR, BL, and AL around the target block are scanned in the mentioned order so as to search for the first adjacent block having an available motion vector. In a case that an adjacent block having an available motion vector is successfully detected, a motion vector and a reference picture of the block are configured in a block level motion vector BMV (bmv[0], bmv[1]) and a block level reference picture BRef of the target block, and the process proceeds to Step 2. In a case that the motion vectors of all of the adjacent blocks are not available, ATMVP is turned off, and the process ends. To "turn off ATMVP" means that no ATMVP candidates are stored in the merge candidate list.

Step 2) Subblock Level Motion Vector Derivation

Figure 9:
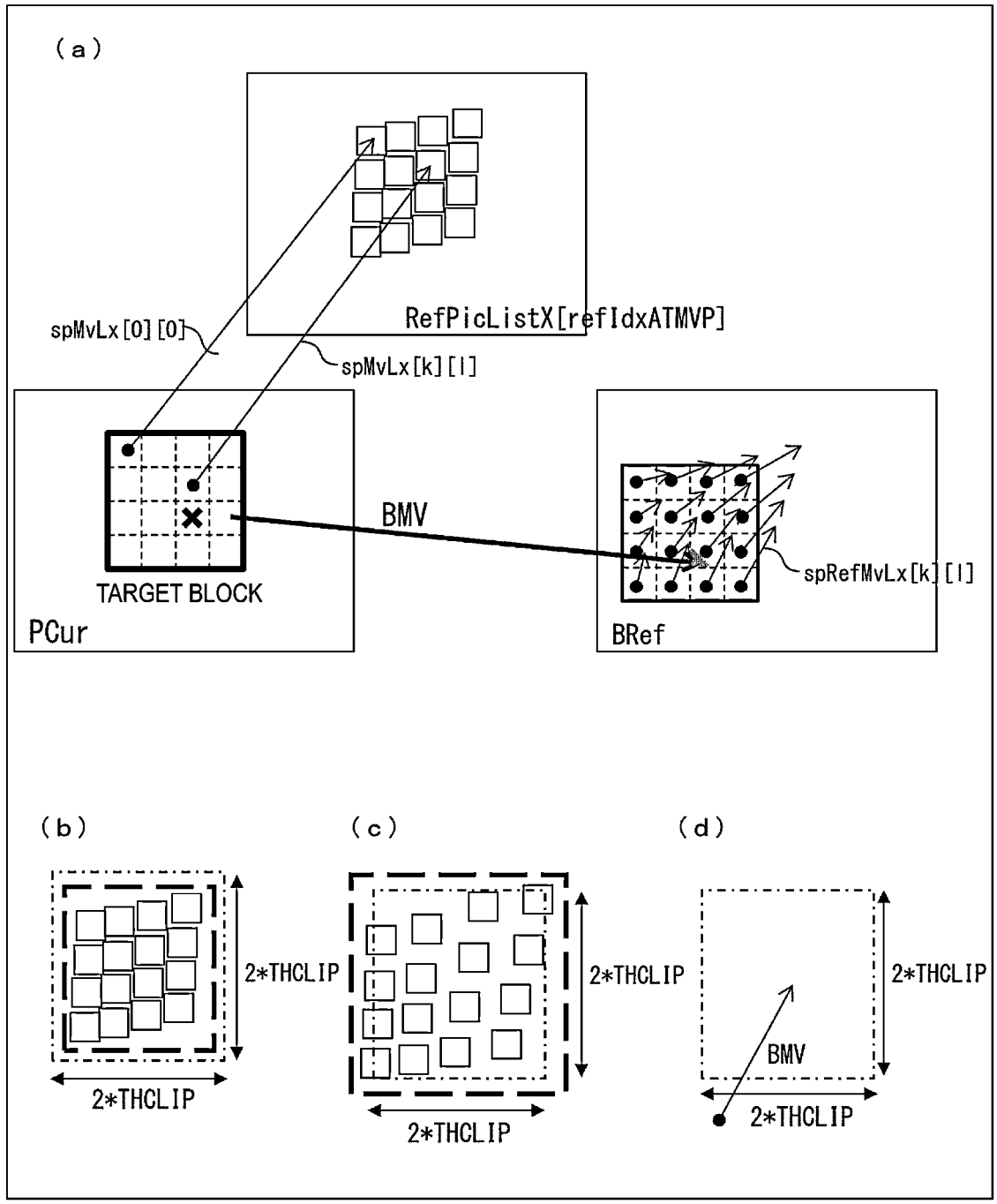
FIG. 9 is a diagram illustrating ATMVP processing.

As illustrated in FIG. 9(a), a block (collocated block) located at a position shifted by the motion vector BMV in the reference picture BRef is split into subblocks, and information of a motion vector SpRefMvLX[k][l] (k=0 . . . NBW−1, l=0 . . . NBH−1) and a reference picture SpRef[k][l] of each subblock is acquired.

Note that the target block may be split into subblocks, and the motion vector SpRefMvLX[k][l] (k=0 . . . NBW−1, l=0 . . . NBH−1) at a position shifted from each subblock by the motion vector BMV may be derived. Here, NBW and NBH represent the number of subblocks in the horizontal direction and the vertical direction, respectively. In a case that a motion vector of a certain subblock M(kM, lM) is absent, the block level motion vector BMV and the block level reference picture BRef are set as a motion vector SpRefMvLX[kM][lM] and a reference picture SpRef[kM][lM] of the subblock (kM, lM).

Step 3) Motion Vector Scaling

A motion vector SpMvLX[k][l] of each subblock of the target block is derived by using the scaling function MvScale( ), based on the motion vector SpRefMvLX[k][l] and the reference picture SpRef[k][l] of each subblock of the reference picture.

SpMvLX[k][l]=MvScale(SpRefMvLX[k][l],Bref, SpRef[k][l],PCur,RefPicListX[refIdx ATMVP])   (Expression ATMVP-1)

Here, RefPicListX[refIdxATMVP] represents a reference picture of a target block, and for example, refIdxATMVP is configured to 0.

Note that a subblock level reference picture of the target block may be a reference picture indicated by an index (collocated_ref_idx) used for prediction motion vector derivation in the temporal direction reported in the slice header, which is illustrated in FIG. 8. In this case, the subblock level reference picture of the target block is represented by RefPicListX[collocated_ref_idx], and a calculation expression for the subblock level motion vector SpMvLX[k][l] of the target block is as follows.

SpMvLX[k][l]=MvScale(SpRefMvLX[k][l],Bref,
　SpRef[k][l],PCur,RefPicListX[collocated_re-
　f_idx])) (Expression ATMVP-2)

Step 4) Clipping of Subblock Level Motion Vector after Scaling

In a case that the inter prediction image generator 309 generates a prediction image based on a subblock level motion vector after scaling, the inter prediction image generator 309 transfers image data of the reference picture from the reference picture memory 306. On a reference image RefPicListX[refIdxATMVP], as in FIG. 9(b), a difference of a motion vector (shift amount) between subblocks may widen due to scaling. In a case that a difference of each motion vector widens as in FIG. 9(c), the transfer amount (memory bandwidth) of image data of the entire block increases. In order to prevent increase in the transfer amount (memory bandwidth) from the reference picture memory 306, a configuration of limiting a difference of motion vectors of subblocks is preferable.

Clipping of Subblock Motion Vector, Common to ATMVP, STMVP, and Affine

The spatial-temporal subblock predictor 30371 limits (clips) motion vectors exceeding a range of a representative motion vector repMV (repMV[0], repMV[1]) of the subblock level motion vector ±THCLIP so that the motion vectors fall within a prescribed range.

spMvLX[k][l][0]=Clip3(repMV[0]−THCLIP,repMV
　[0]+THCLIP−1,spMvLX[k][l][0])

spMvLX[k][l][1]=Clip3(repMV[1]−THCLIP,repMV
　[1]+THCLIP−1,spMvLX[k][l][1])　　(Expression ATMVP-3)

Further, the following configuration in which a motion vector of each subblock is updated after calculation of all the subblock level motion vectors spMvLX[ ][ ] may be used.

The spatial-temporal subblock predictor 30371 calculates a range of the subblock level motion vectors spMvLX[k][l] included in the target block. maxspMvLXx and maxspMvLXy, which are maximum values of spMvLX[k][l] in the horizontal and vertical directions, respectively, and minspMvLXx and minspMvLXy, which are minimum values of spMvLX[k][l] in the horizontal and vertical directions, respectively, are derived.

maxspMvLXx=max(spMvLX[k][l][0])k=0 . . .
　NBW−1,l=0 . . . NBH−1 maxspMvLXy=max(spMvLX[k][l][1])k=0 . . .
　NBW−1,l=0 . . . NBH−1 minspMvLXx=min(spMvLX[k][l][0])k=0 . . .
　NBW−1,l=0 . . . NBH−1 minspMvLXy=min(spMvLX[k][l][1])k=0 . . .
　NBW−1,l=0 . . . NBH−1 rangeX=maxSpMvLxx−minspMvLXx rangeY=maxSpMvLxy−minspMvLXy　　(Expression CLIP1)

Here, NBW and NBH represent the number of subblocks in the horizontal direction and the vertical direction, respectively.

In a case that a difference value of the maximum values and the minimum values of spMvLX[k][l] exceeds a prescribed value THCLIP*2, as illustrated in FIG. 9(d), the spatial-temporal subblock predictor 30371 limits (clips) motion vectors exceeding a range of the block level motion vector BMV (bmv[0], bmv[1])±THCLIP so that the motion vectors fall within the range.

if(rangeX>THCLIP*2)spMvLX[k][l][0]=Clip3(bmv
　[0]−THCLIP,bmv[0]+THCLIP−1,spMvLX[k][l]
　[0])

if(rangeY>THCLIP*2)spMvLX[k][l][1]=Clip3(bmv
　[1]−THCLIP,bmv[1]+THCLIP−1,spMvLX[k][l]
　[1])　　(Expression CLIP2)

Note that, in the above description, motion vectors exceeding a range of the block level motion vector BMV (bmv[0], bmv[1])±THCLIP are clipped. However, instead of using the block level motion vector BMV (bmv[0], bmv[1]), motion vectors exceeding a range of a representative value (for example, an average value) of subblock level motion vectors ±THCLIP may be clipped.

if(rangeX>THCLIP*2)spMvLX[k][l][0]=Clip3
　(repMV[0]−THCLIP,repMV[0]+THCLIP−1,
　spMvLX[k][l][0])

if(rangeY>THCLIP*2)spMvLX[k][l][1]=Clip3
　(repMV[1]−THCLIP,repMV[1]+THCLIP−1,
　spMvLX[k][l][1])　　(Expression CLIP3)

Representative Motion Vector

Here, for example, the representative motion vector repMV[0], repMV[1] may be derived using an average value of horizontal and vertical components of the motion vector spMvLX[k][l] of the subblock. For example, the representative motion vector repMV may be a motion vector spMvLX[(NBW−1)/2][(NBH−1)/2] of a subblock located at the center position of the target block or a motion vector spMvLX[0][0] of a subblock located at an upper left position of the target block. Further, in a case that the motion vector spMvLX[(NBW−1)/2][(NBH−1)/2] of the subblock located at the center position of the target block is not available, the motion vector spMvLX[0][0] of the subblock located at the upper left position may be used. Further, as the representative motion vector repMV, an average value of motion vectors of the subblocks located at four corners of the target block may be used.

repMV[0]=(spMvLX[0][0][0]+spMvLX[NBW−1][0]
　[0]+spMvLX[0][NBH−1][0]+spMvLX[NBW−1]
　[NBH−1][0]+2)>>2 repMV[1]=(spMvLX[0][0][1]+spMvLX[NBW−1][0]
　[1]+spMvLX[0][NBH−1][1]+spMvLX[NBW−1]
　[NBH−1][1]+2)>>2

Step 5) Store ATMVP in Merge Candidate List

An example of order of merge candidates stored in the merge candidate list is illustrated in FIG. 7(a). A merge candidate of the target block is selected from the list by using merge_idx derived in the inter prediction parameter decoding control unit 3031.

In a case that ATMVP is selected as the merge candidate, as illustrated in FIG. 9(a), a prediction image is derived by reading an image of a reference picture RefPicListX[refIdx-ATMVP] based on each subblock SpMvLX[k][l] of the target block and performing interpolation.

Figure 10:
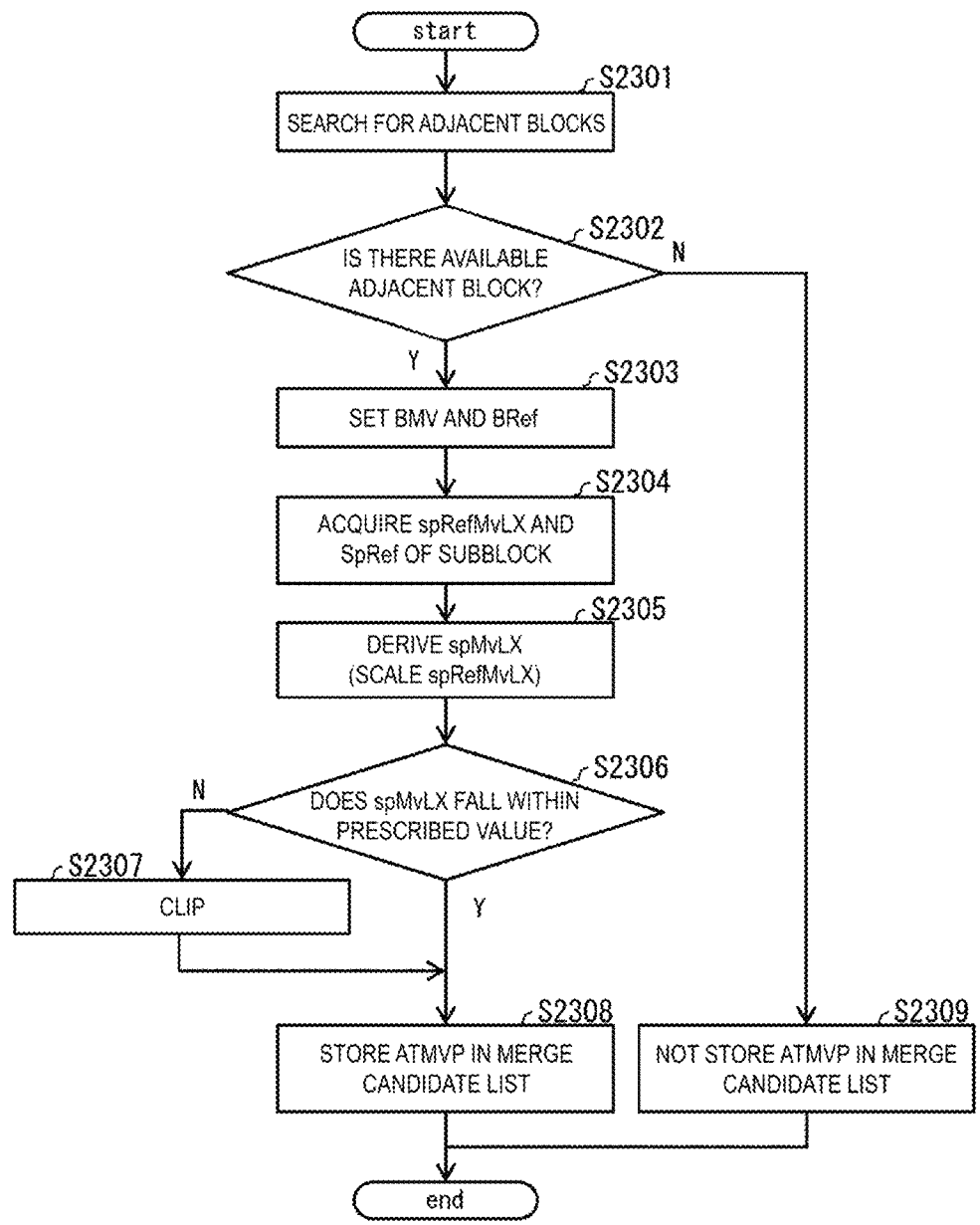
FIG. 10 is a flowchart illustrating an operation of the ATMVP processing.

The above merge candidate list derivation processing related to ATMVP described in Step 1) to Step 5) will be described using the flowchart of FIG. 10.

The spatial-temporal subblock predictor 30371 searches for five adjacent blocks of a target block (S2301).

The spatial-temporal subblock predictor 30371 determines whether or not there is a first available adjacent block. In a case that there is an available adjacent block, the process proceeds to S2303. In a case that there are no available adjacent blocks, the process proceeds to S2309 (S2302).

The spatial-temporal subblock predictor 30371 configures a motion vector and a reference picture of the available adjacent block as a block level motion vector BMV and a block level reference picture BRef of the target block (S2303).

The spatial-temporal subblock predictor 30371 acquires a subblock based motion vector SpRefMvLX [k][l] and a subblock based reference picture SpRef[k][l] of a collocated block by using the block based motion vector BMV and the block based reference picture BRef of the target block (S2304).

The spatial-temporal subblock predictor 30371 performs scaling to derive a subblock based motion vector spMvLX [k][l] of the target block in a case that the reference picture of the target picture is configured to RefPicListX[refIdx-ATMVP] by using the motion vector SpRefMvLX[k][l] and the reference picture SpRef (S2305).

The spatial-temporal subblock predictor 30371 determines whether or not the subblock based motion vector spMvLX[k][l] derived through scaling falls within a prescribed value. In a case that spMvLX[k][l] falls within the prescribed value, the process proceeds to S2308. Otherwise, the process proceeds to S2307 (S2306).

In a case that the motion vector spMvLX[k][l] falls outside the prescribed value, the spatial-temporal subblock predictor 30371 clips spMvLX[k][l] with a method described in the clipping of the subblock motion vectors (S2307).

The spatial-temporal subblock predictor 30371 stores a motion vector of ATMVP or a label of ATMVP in the merge candidate list mergeCandList[ ] illustrated in FIG. 7(*a*) (S2308).

The spatial-temporal subblock predictor 30371 does not store the motion vector of ATMVP or the label of ATMVP in the merge candidate list mergeCandList[ ] (S2309).

Through the processing described above, a merge candidate list related to ATMVP is derived.

In this manner, in ATMVP, increase of a memory bandwidth can be prevented by limiting a range of the motion vectors of the subblocks after scaling so that the motion vectors fall within a prescribed value.

STMVP

Figure 11:
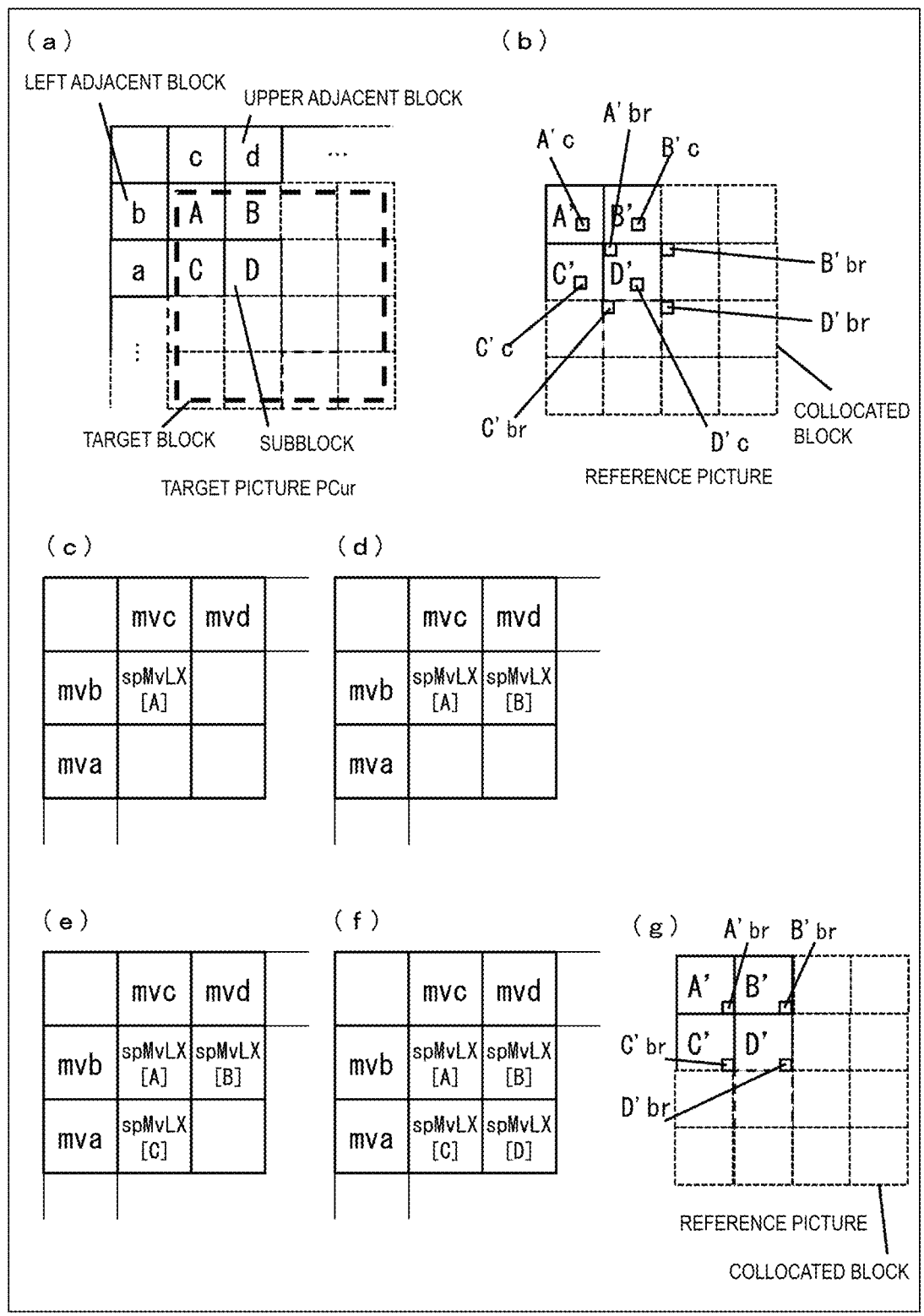
FIG. 11 is a diagram illustrating STMVP processing.

STMVP is a scheme in which a prediction image is generated for each subblock by deriving a motion vector for each subblock of a target block, based on spatially adjacent blocks (a, b, c, d, . . . ) of the target block of a target picture PCur illustrated in FIG. 11(*a*) and motion vectors of collocated blocks (A', B', C', D', . . . ) of the target block illustrated in FIG. 11(*b*). A, B, C, and D of FIG. 11(*a*) are examples of subblocks obtained by splitting the target block. A', B', C', and D' of FIG. 11(*b*) are collocated blocks of the subblocks A, B, C, and D of FIG. 11(*a*). A'c, B'c, C'c, and D'c of FIG. 11(*b*) are regions located at the center of A', B', C', and D', respectively, and A'br, B'br, C'br, and D'br are regions located at the lower right of A', B', C', and D', respectively. Note that A'br, B'br, C'br, and D'br may be located at lower right positions inside A', B', C', and D' illustrated in FIG. 11(*g*), instead of being located at lower right positions outside A', B', C', and D' illustrated in FIG. 11(*b*), respectively. In STMVP, processing is performed in the following procedure. The target block is split into subblocks, and the following procedure is sequentially performed on each subblock.

Step 1) A first available block is searched for rightward from an upper adjacent block of the target subblock (referred to as a subblock A). In a case that an available adjacent block is successfully detected, a motion vector and a reference picture of the first block are configured as an upper vector mvA_above and an upper reference picture RefA_above of STMVP, and a count cnt is configured to 1. In a case that there are no available adjacent blocks, the count cnt is configured to 0.

Step 2) A first available block is searched for downward from a left adjacent block b of the target subblock (subblock A). In a case that an available adjacent block is successfully detected, a motion vector and a reference picture of the first block are set as a left vector mvA_left and a left reference picture RefA_left, and the count cnt is incremented by 1. In a case that there are no available adjacent blocks, the count cnt is not updated.

Step 3) In the collocated block A' being a temporal-direction adjacent block of the target subblock (subblock A), whether or not a region is available is checked in the order of the lower right position A'br and the center position A'c. In a case that an available region is successfully detected, a first motion vector and a reference picture of the block are set as a collocated vector mvA_col and a collocated reference picture RefA_col, and the count is incremented by 1. In a case that there are no available blocks, the count cnt is not updated.

Step 4) In a case that cnt=0 (in a case that there are no available motion vectors), a motion vector of the target subblock (subblock A) is set to a zero vector.

Step 5) In a case that ctn is other than 0, available motion vectors calculated in Step 1) to Step 3) are scaled by using temporal information of the target picture PCur and a reference picture RefPicListX[collocated_ref_idx] of the target block. The motion vectors after scaling are set as smvA_above, smvA_left, and smvA_col.

P smvA_above=MvScale(mvA_above,PCur,RefA_above,PCur,RefPicListX[collocated_ref_idx]))

smvA_left=MvScale(mvA_left,PCur,RefA_left,PCur,RefPicListX[collocated_ref_idx]))

smvA_col=MvScale(mvA_col,PCur,RefA_col,PCur,RefPicListX[collocated_ref_idx]))(Expression STMVP-1)

Non available motion vectors are set to 0.

Step 6) The average of the motion vectors smvA_above, smvA_left, and smvA_col of neighboring blocks are calculated, and the calculated result is set as a motion vector spMvLX[A] of the target subblock (subblock A). A reference picture of the target block (subblock A) is RefPicListX [collocated_ref_idx].

spMvLX[A]=(smvA_above+smvA_left+smvA_col)/cnt (Expression STMVP-2)

For the sake of integer arithmetic, for example, derivation may be performed as follows. In a case that the count cnt of the number of derived motion vectors indicates 2, the two motion vectors are sequentially described as mvA_0 and mvA_1, and then the motion vector spMvLX of the target block may be derived according to the following expression.

spMvLX[A]=(smvA_0+smvA_1)>>1

In a case that cnt indicates 3, derivation may be performed according to the following expression.

spMvLX[A]=(5*smvA_above+5*smvA_left+6*smvA_col)>>4

The above processing of Step 1) to Step 6) is performed on each subblock of the target block, such as the subblocks B, C, and D, and a motion vector of each subblock is calculated as in FIGS. 11(d), 11(e), and 11(f). Note that, as for the subblock B, search is performed rightward from d as the upper adjacent block. As for the subblock C, the upper adjacent block is A, and search is performed downward from a as the left adjacent block. As for the subblock D, the upper adjacent block is B, and the left adjacent block is C.

Step 7) A subblock level motion vector is clipped.

In a similar manner to Step 4) of ATMVP, in order to prevent increase in the memory bandwidth, the subblock level motion vectors spMvLX[ ] may be limited after motion vector derivation of each subblock (Step 6).

Specifically, the spatial-temporal subblock predictor 30371 limits (clips) motion vectors exceeding a range of a representative motion vector repMV (repMV[0], repMV[1]) of the subblock level motion vector ±THCLIP so that the motion vectors fall within the range.

spMvLX[k][0]=Clip3(repMV[0]−THCLIP,repMV[0]+THCLIP−1,spMvLX[k][0])

spMvLX[k][l]=Clip3(repMV[1]−THCLIP,repMV[1]+THCLIP−1,spMvLX[k][1])

The spatial-temporal subblock predictor 30371 may limit the motion vector of each subblock of STMVP as has been described in (Expression CLIP1), (Expression CLIP2), and (Expression CLIP3) in ATVMP.

Step 8) A motion vector of STMVP (or a label of STMVP) is stored in the merge candidate list. The order of merge candidates stored in the merge candidate list is illustrated in FIG. 7(a). A merge candidate of the target block is selected from the list by using merge_idx derived in the inter prediction parameter decoding control unit 3031.

In a case that STMVP is selected as the merge candidate, a prediction image is derived by reading an image of a reference picture RefPicListX[collocated_ref_idx] based on the motion vector from each subblock of the target block and performing interpolation.

Figure 12:
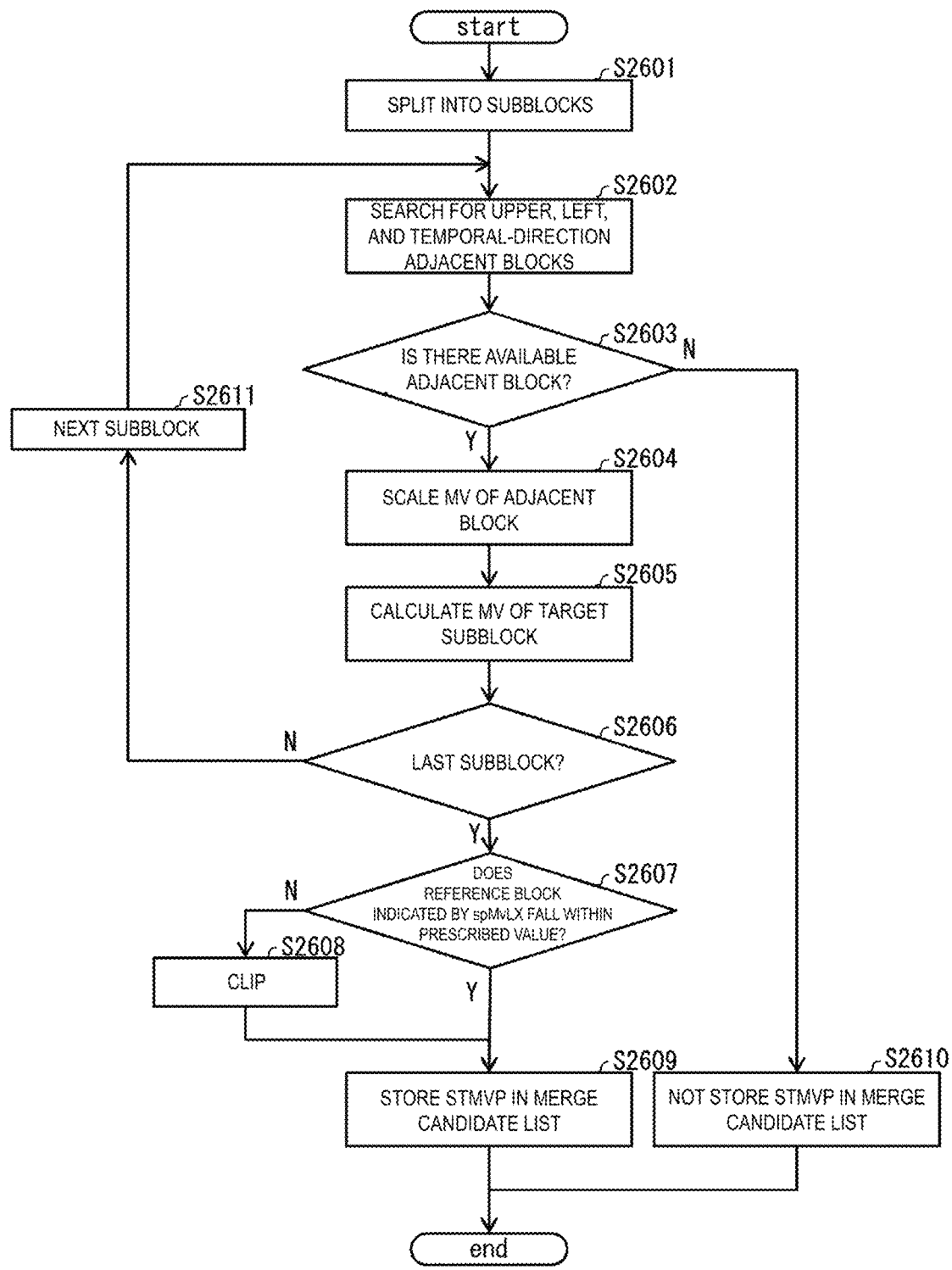
FIG. 12 is a flowchart illustrating an operation of the STMVP processing.

The above merge candidate list derivation processing related to STMVP described in Step 1) to Step 8) will be described using the flowchart of FIG. 12.

The spatial-temporal subblock predictor 30371 splits a target block into subblocks (S2601).

The spatial-temporal subblock predictor 30371 searches for upper, left, and temporal-direction adjacent blocks of the subblock (S2602).

The spatial-temporal subblock predictor 30371 determines whether or not there is an available adjacent block. In a case that there is an available adjacent block, the process proceeds to S2604. In a case that there are no available adjacent blocks, the process proceeds to S2610 (S2603).

The spatial-temporal subblock predictor 30371 scales a motion vector of the available adjacent block, according to a temporal distance between the target picture and reference pictures of multiple adjacent blocks (S2604).

The spatial-temporal subblock predictor 30371 calculates an average value of the scaled motion vectors, and sets the calculated result as a motion vector spMvLX[ ] of the target subblock (S2605).

The spatial-temporal subblock predictor 30371 checks whether or not the currently processed subblock is the last subblock of the target block (S2606). In a case that the currently processed subblock is the last subblock, the process proceeds to S2607. Otherwise, the next subblock is subjected to the processing, and the process proceeds to S2602 (S2611). Then, the process of S2602 to S2605 is repeatedly performed.

The spatial-temporal subblock predictor 30371 determines whether or not the derived subblock based motion vector spMvLX[ ] falls within a prescribed value. In a case that spMvLX[ ] falls within the prescribed value, the process proceeds to S2609. Otherwise, the process proceeds to S2608 (S2607).

In a case that the motion vector spMvLX[ ] falls outside the prescribed value, the spatial-temporal subblock predictor 30371 clips the motion vector spMvLX[ ] with a method of clipping of the subblock motion vectors (S2608).

The spatial-temporal subblock predictor 30371 stores a motion vector of STMVP or a label of STMVP in the merge candidate list mergeCandList[ ] illustrated in FIG. 7(a) (S2609).

In a case that there are no available motion vectors, the spatial-temporal subblock predictor 30371 ends the processing without storing a motion vector of STMVP in the merge candidate list mergeCandList[ ] (S2610).

Through the processing described above, a merge candidate list related to STMVP is derived.

In this manner, in STMVP, increase of a memory bandwidth can be prevented by limiting a range of the motion vectors of the subblocks after scaling so that the motion vectors fall within a prescribed value.

Affine Predictor

Affine predictors 30372 and 30321 derive an affine prediction parameter of a target block. In the present embodiment, as the affine prediction parameter, motion vectors (mv0_x, mv0_y) and (mv1_x, mv1_y) of two control points (V0, V1) of the target block are derived. Specifically, a motion vector of each control point may be derived by performing prediction based on a motion vector of an adjacent block (the affine predictor 30372), or a motion vector of each control point may be derived by using a sum of a prediction vector derived as a motion vector of a control point and a difference vector derived from coded data (the affine predictor 30321).

Subblock Motion Vector Derivation Processing

As a specific example of a configuration for carrying out the processing, a flow of processing in which the affine predictors 30372 and 30321 derive a motion vector mvLX of each subblock by using affine prediction will be described below according to steps. The processing in which the affine predictors 30372 and 30321 derive a motion vector mvLX of a target subblock by using affine prediction includes the following three steps of (STEP1) to (STEP3).

(STEP1) Derivation of Control Point Vector

The affine predictors 30372 and 30321 derive a motion vector of each of representative points of a target block (here, a point V0 located at the upper left of the block and a point V1 located at the upper right of the block) as two control points used for affine prediction for deriving candidates. Note that, as the representative points of the block, points in the target block are used. The representative point of the block used as a control point of affine prediction is herein referred to as a "block control point".

Figure 13:
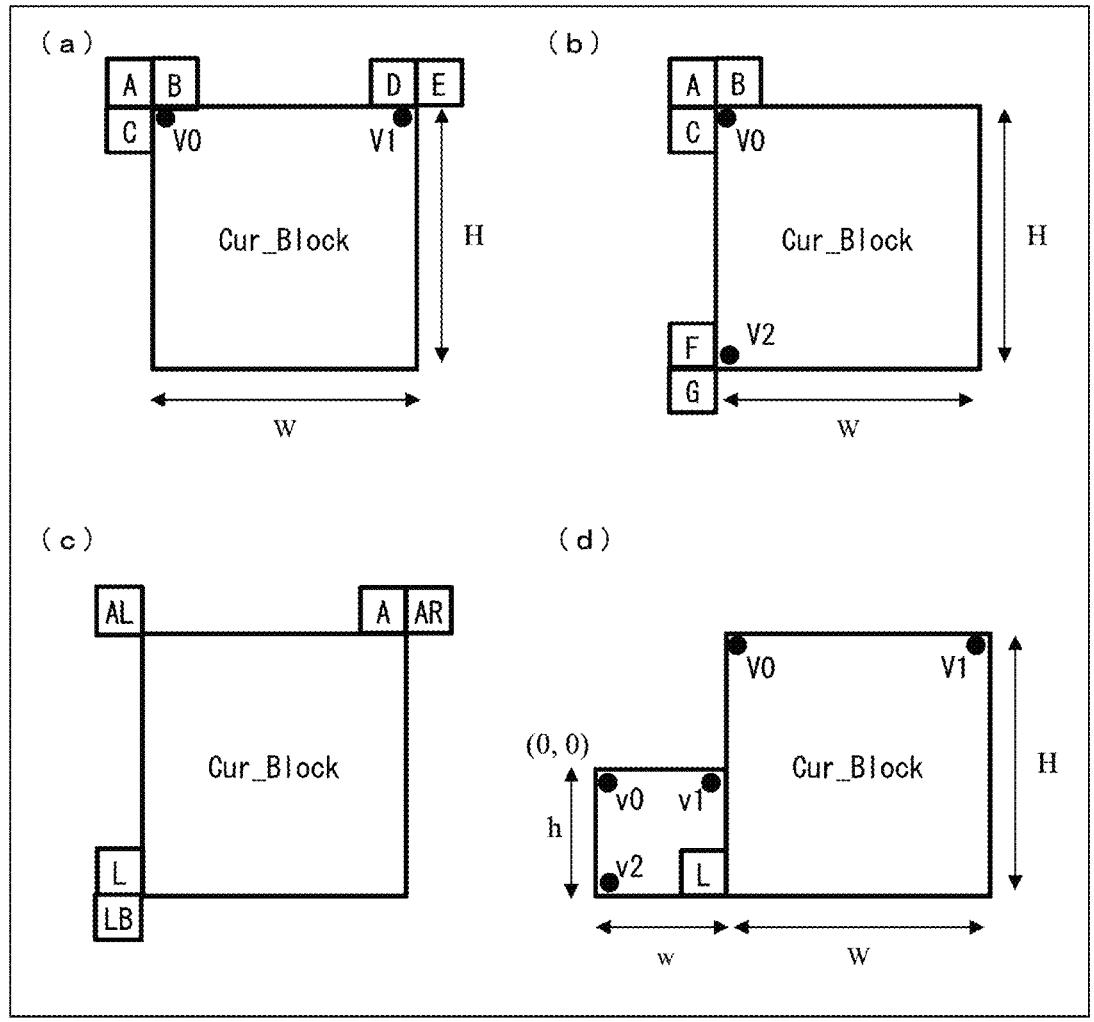
FIG. 13 is a diagram illustrating an example of a position of a block referred to in order to derive motion vectors of control points in affine prediction.

First, the processing of (STEP1) in each of the AMVP mode and the merge mode will be described with reference to FIG. 13. FIG. 13 is a diagram illustrating examples of positions of reference blocks used for deriving motion vectors of control points in the AMVP mode and the merge mode.

Derivation of Motion Vectors of Control Points in AMVP Mode

The affine predictor 30321 adds prediction vectors mvpVNLX and difference vectors of two control points (V0, V1) illustrated in FIG. 13(*a*) or of two control points (V0, V2) illustrated in FIG. 13(*b*), and derives respective motion vectors mvN=(mvN_x, mvN_y). N represents a control point.

Derivation of Motion Vectors of Control Points in Merge Mode

The affine predictor 30372 refers to the prediction parameter memory 307, and checks whether or not affine prediction is used for a block including L, A, AR, LB, and AL as illustrated in FIG. 13(*c*). A motion vector is derived by searching the blocks L, A, AR, LB, and AL in the mentioned order, and selecting a first detected block using affine prediction (here, L of FIG. 13(*c*)) as a reference block (merge reference block).

The affine predictor 30372 derives motion vectors (mvN_x, mvN_y) (N=0 . . . 1) of control points (for example, V0 and V1), based on motion vectors (mvvN_x, mvvN_y) (N=0 . . . 2) of a block including three points (a point v0, a point v1, and a point v2 of FIG. 13(*d*)) of the selected merge reference block.

(STEP2) Derivation of Subblock Vector

The affine predictors 30372 and 30321 derive a motion vector of each subblock included in the target block, based on the motion vectors of the block control points (the control points V0 and V1 or the control points V0 and V2) being representative points of the target block derived in (STEP1). Through (STEP1) and (STEP2), the motion vector spMvLX of each subblock is derived. Note that the following will describe an example of the control points V0 and V1. However, a motion vector of each subblock can be derived using the control points V0 and V2 in similar processing simply by replacing the motion vector of V1 with a motion vector of V2.

Figure 14:
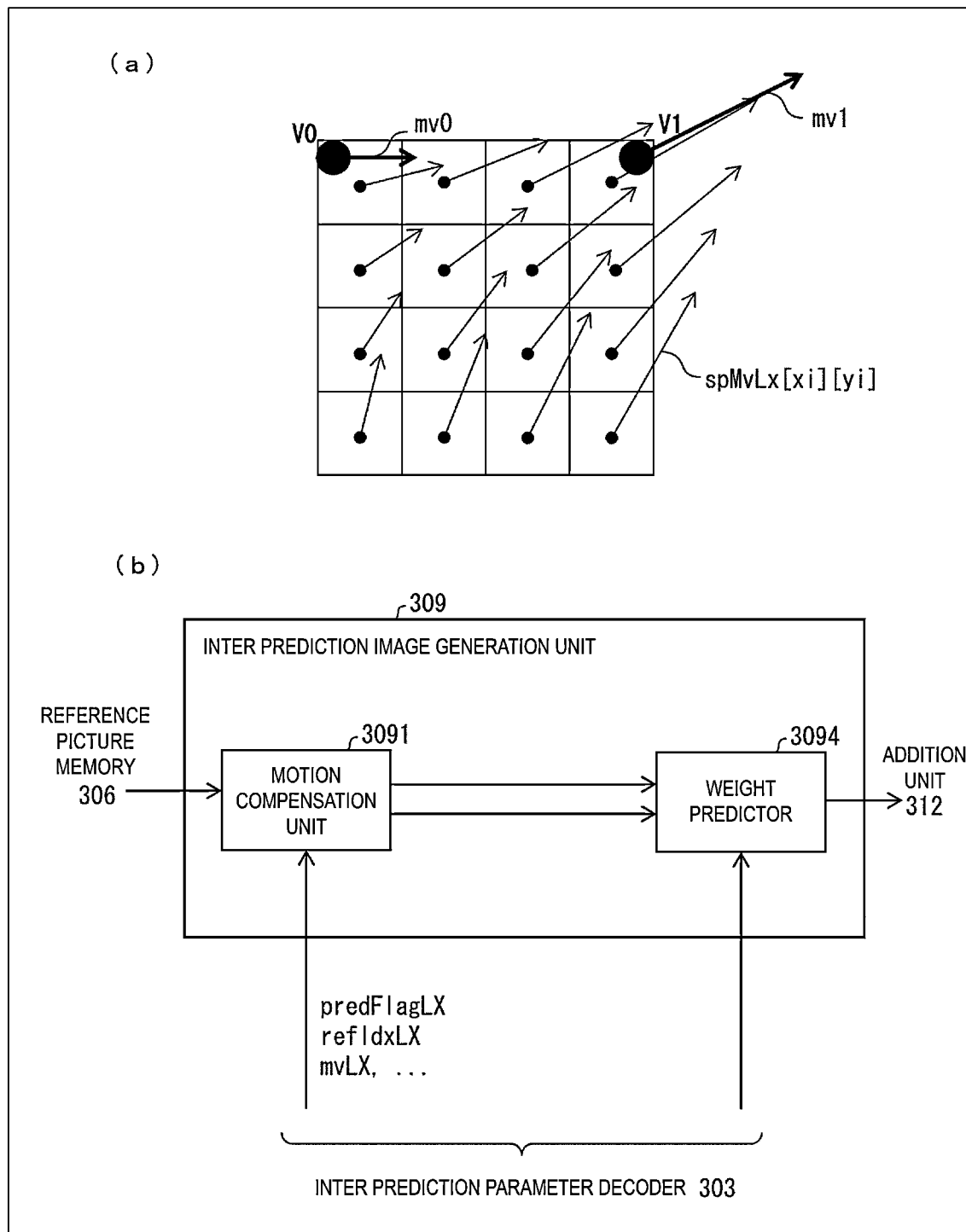
FIG. 14 is a diagram in which (a) illustrates a motion vector of each of subblocks constituting a block and (b) illustrates a configuration of an inter prediction image generator according to the present embodiment.

FIG. 14(*a*) is a diagram illustrating an example of deriving the motion vector spMvLX of each of subblocks constituting the target block, based on a motion vector mv0 (mv0_x, mv0_y) of the control point V0 and a motion vector mv1 (mv1_x, mv1_y) of V1. As illustrated in FIG. 14(*a*), the motion vector spMvLX of each subblock is derived as a motion vector of each point located at the center of each subblock.

The affine predictors 30372 and 30321 derive a motion vector spMvLX[xi] [yi] (xi=xb+BW*i, yj=yb+BH*j, i=0, 1, 2, . . . , W/BW−1, j=0, 1, 2, . . . , H/BH−1) of each subblock of the target block, based on the motion vectors (mv0_x, mv0_y) and (mv1_x, mv1_y) of the control points V0 and V1.

(STEP3) Subblock Motion Compensation

The motion compensation unit 3091 performs motion compensation of each subblock, based on the prediction list utilization flag predFlagLX and the reference picture index refIdxLX input from the inter prediction parameter decoder 303 and the motion vector spMvLX of the subblock derived in (STEP2). Specifically, a motion compensation image PredLX is generated by reading and filtering a block located at a position shifted by the motion vector spMvLX from a position of a target subblock of a reference picture indicated by the reference picture index refIdxLX from the reference picture memory 306.

In a similar manner to ATMVP and STMVP, in order to prevent increase in the memory bandwidth, the subblock level motion vectors spMvLX[ ] may be limited after motion vector derivation of each subblock.

Specifically, the affine predictor 30372 limits (clips) motion vectors exceeding a range of a representative motion vector repMV (repMV[0], repMV[1]) of the subblock level motion vector ±THCLIP so that the motion vectors fall within the range.

spMvLX[k][0]=Clip3(repMV[0]−THCLIP,repMV[0]+THCLIP−1,spMvLX[k][0])

spMvLX[k][1]=Clip3(repMV[1]−THCLIP,repMV[1]+THCLIP−1,spMvLX[k][1])

The affine predictor 30372 may limit the motion vector of each subblock of affine prediction as has been described in (Expression CLIP1), (Expression CLIP2), and (Expression CLIP3) in ATVMP.

In this manner, in affine prediction, increase of a memory bandwidth can be prevented by limiting a range of the motion vectors of the subblocks after derivation so that the motion vectors fall within a prescribed value.

Matching Motion Derivation Unit 30373

Figure 15:
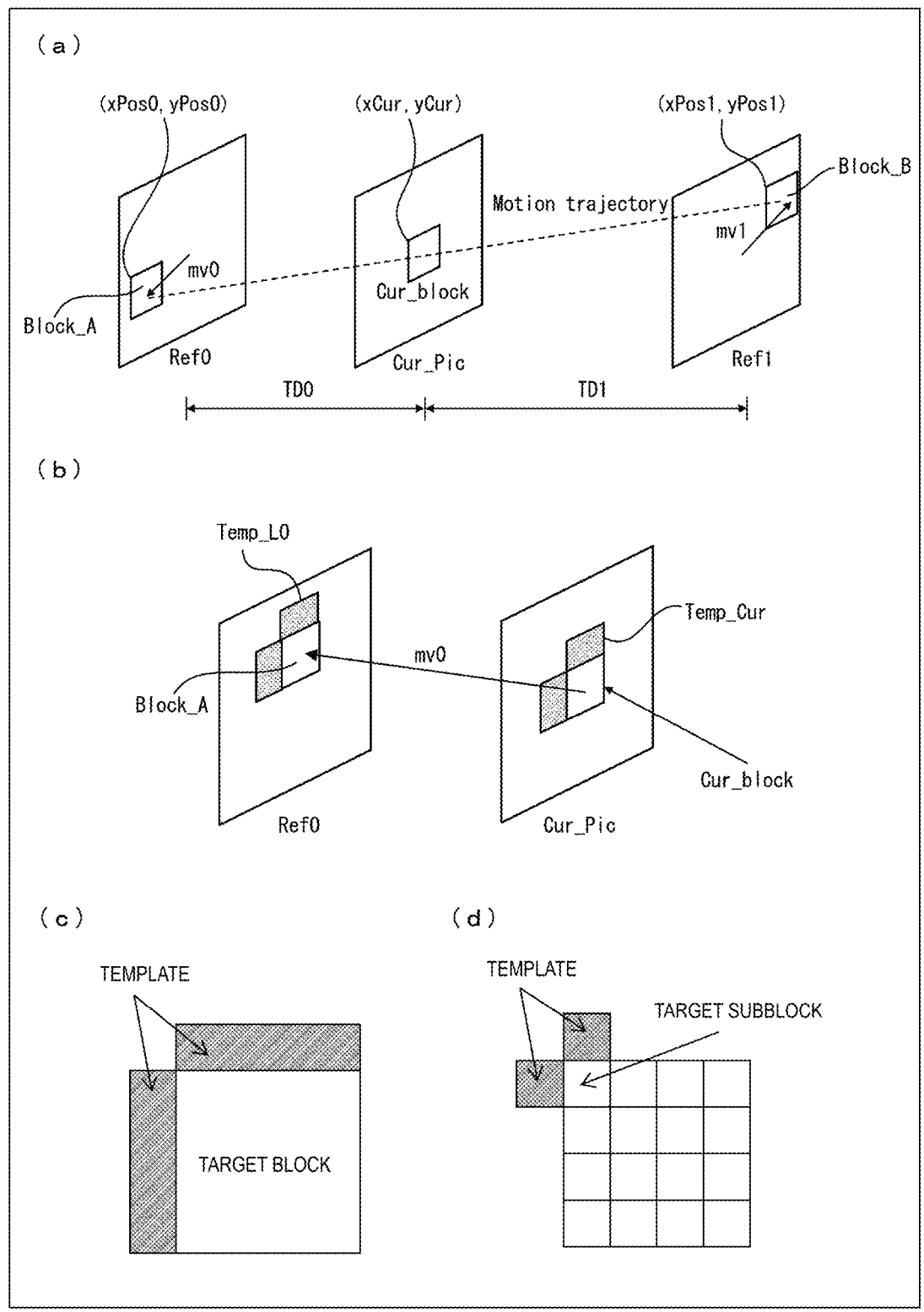
FIG. 15 is a diagram in which (a) illustrates Bilateral matching and (b) illustrates Template matching.

The matching motion derivation unit 30373 derives a motion vector spMvLX of a block or a subblock by performing matching processing of either bilateral matching or template matching. FIG. 15 is a diagram for describing (a) Bilateral matching and (b) Template matching. A matching motion derivation mode is selected as one merge candidate (matching candidate) of the merge mode.

The matching motion derivation unit 30373 derives a motion vector through matching of regions in multiple reference pictures, on an assumption that an object moves at a constant speed. In bilateral matching, a motion vector of a target block is derived through matching between reference pictures A and B, on an assumption that a certain object passes through a certain region of the reference picture A, a target block of a target picture Cur_Pic, and a certain region of the reference picture B. In template matching, a motion vector is derived through matching of an adjacent region Temp_Cur (template) of a target block and an adjacent region Temp_L0 of a reference block of a reference picture, on an assumption that a motion vector of the adjacent region of the target block and a motion vector of the target block are the same. In the matching motion derivation unit, a target block is split into multiple subblocks, and bilateral matching or template matching to be described later is performed for each of the split subblocks. In this manner, a motion vector spMvLX[xi][yi] (xi=xPb+BW*i, yj=yPb+BH*j, i=0, 1, 2, . . . , W/BW−1, j=0, 1, 2, . . . , H/BH−1) of the subblock is derived.

As illustrated in FIG. 15(*a*), in bilateral matching, in order to derive a motion vector of a target block Cur_block of a target picture Cur_Pic, two reference pictures are referred to. More specifically, first, a Block_A and a Block_B are configured. Let (xCur, yCur) be coordinates of the target block Cur_block. The Block_A is a region that is located inside a reference picture Ref0 (reference picture A) indicated by a reference picture index refIdxL0, and has upper left coordinates (xPos0, yPos0) determined according to:

(xPos0,yPos0)=(xCur+mv0[0],yCur+mv0[1])  (Expression FRUC-1).

The Block_B is a region that is located inside a reference picture Ref1 (reference picture B) indicated by a reference picture index refIdxL1, for example, and has upper left coordinates (xPos1, yPos1) determined according to:

(xPos1, yPos1)=(xCur+mv1[0], xCur+mv1[1])=(xCur−mv0[0]* DiffPicOrderCnt(Cur_Pic, Ref1)/DiffPicOrderCnt(Cur_Pic, Ref0), yCur−mv0[1] * DiffPicOrderCnt(Cur_Pic, Ref1)/DiffPicOrderCnt(Cur_Pic, Ref0)) (Expression FRUC-2). Here, as illustrated in FIG. 15(a), DiffPicOrderCnt(Cur_Pic, Ref0) and DiffPicOrderCnt(Cur_Pic, Ref1) represent a function that returns a difference of temporal information between the target picture Cur_Pic and the reference picture A and a function that returns a difference of temporal information between the target picture Cur_Pic and the reference picture B, respectively.

Next, (mv0[0], mv0[1]) is determined so that a matching cost C between the Block_A and the Block_B has a minimum value. (mv0[0], mv0[1]) derived in this manner is used as a motion vector to be assigned to the target block. Based on the motion vector assigned to the target block, a motion vector spMVL0 is derived for each subblock obtained by splitting the target block.

In one example, the matching cost C between the Block_A and the Block_B is represented as follows. First, as an error, a Sum of Absolute Difference (SAD) is calculated.

SAD=ΣΣ abs(Block_A[xi][yi]−Block_B[xi][yi])  (Expression FRUC-3)

Here, ΣΣ is a sum regarding xi and yi, and Block_A[ ][ ] and Block_B[ ][ ] are blocks whose upper left coordinates are represented by (xPos0, yPos0) and (xPos1, yPos1) of (Expression FRUC-1) and (Expression FRUC-2), respectively. This is corrected with the shift amount ShiftDistortionBitDepthY for adjusting the luminance pixel bit-depth, and a corrected result is used as an error D.

D=SAD>>ShiftDistortionBitDepthY  (Expression FRUC-4)

In addition, an unknown constant Lambda is used to calculate the matching cost C as follows, with a cost Rate of motion vectors of the sum of absolute difference from a bit-depth of error evaluation of luminance and an initial vector candidate (MVx, MVy).

Lambda=4<<(decoder_side_distortion_bit_depth−8)  (Expression FRUC-5)

Rate=abs(mv0[0]−MVx)+abs(mv0[1]−MVy)  (Expression FRUC-6)

C=D+Lambda*Rate  (Expression FRUC-7)

The matching motion derivation unit 30373 may use a matching cost C including a pixel bit-depth having D and Lambda as in the following expression.

D=SAD  (Expression FRUC-8)

Lambda=4<<(BitDepthY−8)  (Expression FRUC-9)

Particularly in a case that information of decoder_side_distortion_bit_depth is not explicitly transmitted from a coder side to a decoder side or in a case that information of decoder_side_distortion_bit_depth is not used, the above expression is used.

Further, the matching motion derivation unit 30373 may use a matching cost C including a pixel bit-depth having D and Lambda as in the following expression.

D=SAD>>ShiftDistortionBitDepthY  (Expression FRUC-10)

Lambda=4  (Expression FRUC-11)

As described above, adjusting D with an unknown constant ShiftDistortionBitDepthY dependent on the pixel bit-depth BitDepthY of luminance allows the error D and the cost Rate of the motion vector to be balanced with each other. Thus, there is an effect of enhancing coding efficiency.

As another method of calculating the matching cost C in addition to the above example, for example, a sum of absolute Hadamard transformed differences (SATD) may be used instead of SAD.

D=SATD>>ShiftDistortionBitDepth  (Expression FRUC-12)

Alternatively, as another method of calculating the matching cost C, for example, a Sum of Square Difference (SSD, square error) or a Mean Removed Sum of Absolute Differences (MRSAD, a sum of absolute difference obtained by subtracting averages of blocks) may be used instead of SAD of (Expression FRUC-4), (Expression FRUC-8), and (Expression FRUC-10).

SSD=ΣΣ(Block_A[xi][yi]−Block_B[xi][yi])$^2$ (Expression FRUC-3-2)

MRSAD=ΣΣabs(Block_A[xi][yi]−Block_B[xi][yi]−AVE(A)+AVE(B))  (Expression FRUC-3-3)

Here, AVE is an average value of pixels of a block, examples of which are AVE(A)=ΣΣBlock_A[xi][yi]/(BH*BW) and AVE (B)=ΣΣBlock_B[xi][yi]/(BH*BW). BH is the number of pixels of a block in the vertical direction, and BW is the number of pixels of a block in the horizontal direction.

In addition, instead of calculating SAD using the pixel bit-depth, the sum of absolute difference may be calculated by first correcting the value of pixel bits with the shift amount ShiftDistortionBitDepthY for adjusting the pixel bit-depth as follows.

D=ΣΣabs((Block_A[xi][yi]>>ShiftDistortionBitDepthY)−(Block_B[xi][yi]>>ShiftDistortionBitDepthY))(Expression FRUC-13)

Further, the unknown constant Lambda may be defined in a format including the value of a quantization parameter QP as in the following expression, which is a format similar to the unknown constant Lambda at the time of mode selection. Note that, instead of QP of the target block, an estimated value of QP of the target block, QP of an adjacent CU of the target block, initial QP of a CTU including the target block, or initial QP of a slice including the target block may be used. alpha is a constant value that is determined depending on a code structure or a slice type.

Lambda=sqrt(alpha*2$^{(QP-12+6*(BitDepth-8-ShiftDistortionBitDepthY))/3.0}$)  (Expression FRUC-14)

The above has described an example in which the matching cost is calculated using luminance pixels. However, in a case that chrominance pixels are taken into consideration, implementation is possible by adding a value obtained by correcting the sum of absolute difference of chrominance pixels with the shift amount ShiftDistortionBitDepthC for adjusting the chrominance pixel bit-depth to the error D as well as adding results of luminance pixels, and further multiplying the cost Rate of a motion vector with a coefficient cR according to a chrominance format. Specifically, in a case of 4:2:0 format, the value of cR is set to 1.5. In a case of 4:2:2 format, the value of cR is set to 2. In a case of 4:4:4: format, the value of cR is set to 3.

D=D_luma+D_chroma+Lambda*Rate*cR  (Expression FRUC-15)

D_luma is an error of luminance in the expression described above, D_chroma is an error of chrominance in the expression described above, and cR=1.5 (4:2:0), cR=2 (4:2:2), or cR=3 (4:4:4). Further, the value of cR is not limited to the above, other values may be used, such as cR=1 (4:2:0), cR=1.5 (4:2:2), or cR=2 (4:4:4).

In this manner, in a case that the pixel bit-depth, the error evaluation bit-depth, and the quantization parameter are taken into consideration in calculation of the matching cost C, a motion vector derived in the matching motion derivation unit 30373 conforms to motion vectors of other predictors. As a result, coding efficiency in merge prediction or the like can be improved.

The matching motion derivation unit 30373 includes a first motion vector search unit 303731 and a second motion vector search unit 303732.

The first motion vector search unit 303731 derives a motion vector for each block through matching processing. First, an initial vector of a target block is derived by using a motion vector of an adjacent block, such as an AMVP candidate and a merge candidate of the target block, as an initial vector candidate. The initial vector candidate is substituted into (mv0[0], mv0[1]), a motion vector that leads to a minimum matching cost C is used as a block level initial vector, and the block level initial vector is set in (mv0[0], mv0[1]) again (initial vector search).

Next, the first motion vector search unit 303731 performs block level local search of the target block. In the local search, a local region around the initial vector (for example, a region ±SR pixels around the initial vector) is further searched, and a vector that leads to a minimum matching cost C is derived as a final block level motion vector of the target block.

Subsequently, the second motion vector search unit 303732 derives a motion vector of each subblock included in the target block. First, an initial vector of each subblock is derived (initial vector search). Examples of initial vector candidates of the subblock include a block level motion vector derived by the first motion vector search unit 303731, a motion vector of a spatial-temporal adjacent block of each subblock, and an ATMVP or STMVP vector of the subblock. A motion vector that leads to a minimum matching cost C is calculated for each subblock out of the candidate vectors described above, and an initial vector of each subblock is derived. Note that vector candidates to be used for the initial vector search of the subblock are not limited to the vectors described above.

Next, the second motion vector search unit 303732 performs local search in a local region around the initial vector of the subblock (for example, a region ±SR pixels around the initial vector). Then, a vector that leads to a minimum matching cost C of vector candidates of the subblock is derived as a final motion vector of the subblock.

Note that, instead of raster scan, enhanced raster scan may be used. In enhanced raster scan, each point in a search range is scanned according to scanning order determined in advance as in raster scan. For example, spiral scan, in which scan is performed in a spiral manner from the center toward the periphery, is also a type of enhanced raster scan.

In raster search as well, the first motion vector search unit 303731 searches for a block level motion vector, and the second motion vector search unit 303732 searches for a subblock level motion vector.

In contrast, FIG. 15(*b*) is a diagram for describing Template matching of the matching processing.

As illustrated in FIG. 15(*b*), in template matching, in order to derive a motion vector of a target block Cur_block of a target picture Cur_Pic, one reference picture is referred to at a time.

More specifically, a reference block Block_A is configured. For example, the reference block Block_A is a region that is located inside a reference picture Ref0 (referred to as a reference picture A) indicated by a reference picture index refIdxL0, and has upper left coordinates (xPos0, yPos0) determined according to:

$$(xPos0, yPos0) = (xCur + mv0[0], yCur + mv0[1])$$ (Expression FRUC-16).

Next, a template region Temp_Cur adjacent to the target block Cur_block in the target picture Cur_Pic and a template region Temp_L0 adjacent to the Block_A in the reference picture A are configured. In the example illustrated in FIG. 15(*b*), the template region Temp_Cur includes an upper adjacent region of the target block Cur_block and a left adjacent region of the target block Cur_block. Further, the template region Temp_L0 includes an upper adjacent region of the Block_A and a left adjacent region of the Block_A.

Using the template, in a similar manner to bilateral matching, the first motion vector search unit 303731 derives a block level initial vector of the target block. In one example, the matching cost C of template matching is represented as follows. First, a Sum of Absolute Difference (SAD) of a pixel value of luminance described below is calculated.

$$SAD = \sum\sum_{[xi][yi]} abs(Temp\_Cur[xi][yi] - Temp\_L0)$$ (Expression FRUC-17)

Here, ΣΣ is a sum regarding xi and yi, and Temp_L0[ ][ ] is a template of the target block illustrated in FIG. 15(*b*), and is upper and left adjacent regions of the Block_A whose upper left coordinates are (xPos0, yPos0) expressed in (Expression FRUC-16). An initial vector candidate is substituted into (mv0[0], mv0[1]) of (Expression FRUC-16). This is corrected with the shift amount ShiftDistortionBitDepthY for adjusting the luminance pixel bit-depth, and a corrected result is used as an error D.

$$D = SAD >> ShiftDistortionBitDepthY$$ (Expression FRUC-18)

In addition, an unknown constant Lambda is used to calculate the matching cost C as follows, with a cost Rate of motion vectors of the sum of absolute difference from a bit-depth of error evaluation of luminance and an initial vector candidate (MVx, MVy).

$$Lambda = 4 << (decoder\_side\_distortion\_bit\_depth - 8)$$ (Expression FRUC-19)

$$Rate = abs(mv0[0] - MVx) + abs(mv0[1] - MVy)$$ (Expression FRUC-20)

$$C = D + Lambda * Rate$$ (Expression FRUC-21)

The matching motion derivation unit 30373 may use a matching cost C including a pixel bit-depth having D and Lambda as in the following expression.

$$D = SAD$$ (Expression FRUC-22)

$$Lambda = 4 << (BitDepthY - 8)$$ (Expression FRUC-23)

Particularly in a case that information of decoder_side_distortion_bit_depth is not explicitly transmitted from a coder side to a decoder side or in a case that information of decoder_side_distortion_bit_depth is not used, the above expression is used.

Further, the matching motion derivation unit 30373 may use a matching cost C including a pixel bit-depth having D and Lambda as in the following expression.

$$D = SAD >> ShiftDistortionBitDepthY$$ (Expression FRUC-24)

$$Lambda = 4$$ (Expression FRUC-25)

As described above, adjusting D with an unknown constant ShiftDistortionBitDepthY dependent on the pixel bit-depth BitDepthY of luminance allows the error D and the cost Rate of the motion vector to be balanced with each other. Thus, there is an effect of enhancing coding efficiency.

As another method of calculating the matching cost C in addition to the above example, for example, a sum of absolute Hadamard transformed differences (SATD) may be used instead of SAD.

$$D = SATD >> ShiftDistortionBitDepthY \quad \text{(Expression FRUC-26)}$$

Alternatively, as another method of calculating the matching cost C, for example, SSD (square error) or a Mean Removed Sum of Absolute Differences (MRSAD, a sum of absolute difference obtained by subtracting averages of blocks) may be used instead of SAD of (Expression FRUC-18), (Expression FRUC-22), and (Expression FRUC-24).

$$SSD = \Sigma\Sigma(Temp\_Cur[xi][yi] - Temp\_L0[xi][yi])^2 \quad \text{(Expression FRUC-17-2)}$$

$$MRSAD = \Sigma\Sigma \; abs(Temp\_Cur[xi][yi] - Temp\_L0[xi][yi] - AVE(Temp\_Cur) + AVE(Temp\_L0)) \quad \text{(Expression FRUC-17-3)}$$

Here, AVE is an average value of pixels of a block, examples of which are AVE(Temp_Cur)=ΣΣTemp_Cur[xi][yi]/(BH*BW) and AVE(Temp_L0)=ΣΣTemp_L0[xi][yi]/(BH*BW). BH is the number of pixels of a block in the vertical direction, and BW is the number of pixels of a block in the horizontal direction.

In addition, instead of calculating SAD using the pixel bit-depth, the sum of absolute difference may be calculated by first correcting the value of pixel bits with the shift amount ShiftDistortionBitDepthY for adjusting the pixel bit-depth as follows.

$$D = \Sigma\Sigma \; abs((Block\_A[xi][yi] >> ShiftDistortionBitDepthY) - (Block\_B[xi][yi] >> ShiftDistortionBitDepthY)) \quad \text{(Expression FRUC-27)}$$

Further, the unknown constant Lambda may be defined in a format including the value of a quantization parameter as in the following expression, which is a format similar to the unknown constant Lambda at the time of mode selection. Note that, instead of QP of the target block, an estimated value of QP of the target block, QP of an adjacent CU of the target block, initial QP of a CTU including the target block, or initial QP of a slice including the target block may be used. alpha is a constant value that is determined depending on a code structure or a slice type.

$$Lambda = sqrt(alpha * 2^{(QP-12+6*(BitDepth-8-ShiftDistortionBitDepth))/3.0}) \quad \text{(Expression FRUC-28)}$$

The above has described an example in which the matching cost C is calculated using luminance pixels. However, in a case that chrominance pixels are taken into consideration, implementation is possible by adding a value obtained by correcting the sum of absolute difference of chrominance pixels with the shift amount ShiftDistortionBitDepthC for adjusting the chrominance pixel bit-depth to the error D as well as adding results of luminance pixels, and further multiplying the cost of a motion vector according to a chrominance format. Specifically, in a case of 4:2:0 format, the value of cR is set to 1.5. In a case of 4:2:2 format, the value of cR is set to 2. In a case of 4:4:4: format, the value of cR is set to 3.

$$D32 \; D\_luma + D\_chroma + Lambda*Rate*cR \quad \text{(Expression FRUC-29)}$$

D_luma is an error of luminance in the expression described above, D_chroma is an error of chrominance in the expression described above, and cR=1.5 (4:2:0), cR=2 (4:2:2), or cR=3 (4:4:4). Further, the value of cR is not limited to the above, other values may be used, such as cR=1 (4:2:0), cR=1.5 (4:2:2), or cR=2 (4:4:4).

In this manner, in a case that the pixel bit-depth, the error evaluation bit-depth, and the quantization parameter are taken into consideration in calculation of the matching cost C, a motion vector derived in the matching motion derivation unit 30373 conforms to motion vectors of other predictors. As a result, coding efficiency in merge prediction or the like can be improved.

The first motion vector search unit 303731 selects a vector that leads to a minimum matching cost C out of the above as an initial vector, and sets the initial vector in (mv0[0], mv0[1]) again. Next, the first motion vector search unit 303731 performs block level local search of the target block. In the local search, a local region around the initial vector (for example, a region ±SR pixels around the initial vector) is further searched, and a vector that leads to a minimum matching cost C is derived as a final motion vector of the target block.

In this manner, in a case that the pixel bit-depth, the error evaluation bit-depth, and the quantization parameter are taken into consideration in calculation of the matching cost C, a motion vector derived in the matching motion derivation unit 30373 conforms to motion vectors of other predictors. As a result, coding efficiency in merge prediction or the like can be improved.

Subsequently, the second motion vector search unit 303732 derives a motion vector of each subblock included in the target block. As illustrated in FIG. 15(d), a template of the subblock in the target block is acquired. At the block level, in a case that only upper and left regions of the target block are set as the template, a template of the subblock is arranged to have the same shape as well. A motion vector that leads to a minimum matching cost C is determined to be an initial vector of each subblock by using a block level motion vector, a motion vector of a spatial-temporal adjacent block of the subblock, and an ATMVP or STMVP vector of the subblock, for example, as initial vector candidates (initial vector search). Note that vector candidates to be used for the initial vector search of the subblocks are not limited to the vectors described above.

Next, the second motion vector search unit 303732 performs local search in a local region around the initial vector of the subblock (for example, a region ±SR pixels around the initial vector). Then, the matching cost C of vector candidates around the initial vector of the subblock is derived, and a vector that leads to a minimum matching cost C is derived as the motion vector spMvL0 of the subblock.

Further, in template matching as well, processing may be performed on two reference pictures Ref0 and Ref1. In this case, matching of the reference picture Ref0 and matching of the reference picture Ref1 described above are sequentially performed. A reference block Block_B and a template region Temp_L1 are configured. The reference block Block_B is a region that is located inside a reference picture Ref1 (referred to as a reference picture B) indicated by a reference picture index refIdxL1, and has upper left coordinates (xPos1, yPos1) determined according to: (xPos1, yPos1)=(xCur+mv1[0], yCur+mv1[1]) (Expression FRUC-30).

The template region Temp_L1 is adjacent to the Block_B in the reference picture B. (mv1[0], mv1[1]) that leads to a minimum matching cost C between Temp_Cur and Temp_L1 is finally determined, and is used as a motion vector to be assigned to the target block. Based on the motion vector assigned to the target block, a motion vector spMvL1 is derived for each subblock obtained by splitting the target block.

Motion Vector Derivation Processing Using Matching Processing

The flow of motion vector derivation (pattern match vector derivation) processing in a matching mode will be described with reference to the flowchart of FIG. 16.

Figure 16:
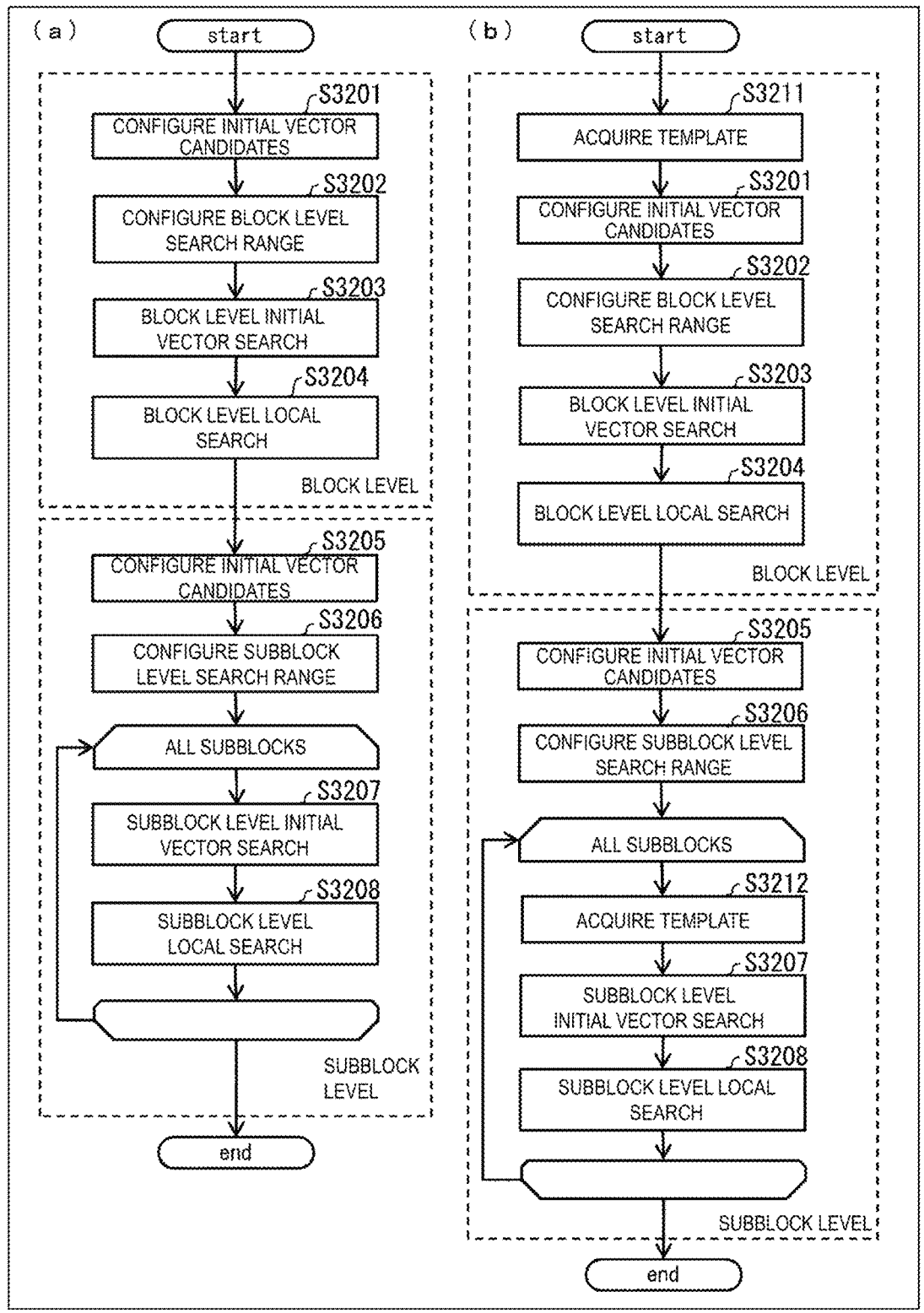
FIG. 16 is a flowchart illustrating an operation of motion vector derivation processing in a matching mode.

The processing illustrated in FIG. 16 is performed by the matching predictor 30373. FIG. 16(*a*) is a flowchart of bilateral matching processing, and FIG. 16(*b*) is a flowchart of template matching processing.

Note that S3201 to S3204 in the steps illustrated in FIG. 16(*a*) are steps for block search that is performed at the block level. In other words, the motion vector is derived in the entire block (CU or PU), through the use of pattern match.

Further, S3205 to S3208 are steps for subblock search that is performed at the subblock level. In other words, the motion vector is derived for each of the subblocks constituting the block, through the use of pattern match.

In S3201, the matching predictor 30373 (the first motion vector search unit 303731) configures block level initial vector candidates in a target block.

In S3202, the matching predictor 30373 (the first motion vector search unit 303731) configures a block level search range.

Next, in S3203, the matching predictor 30373 (the first motion vector search unit 303731) searches for a vector that leads to a minimum matching cost out of the initial vector candidates limited in S3202, and derives an initial vector.

In this case, in a case that the matching predictor 30373 (the first motion vector search unit 303731) can determine with reference to the initial vector that the matching cost is sufficiently small, based on indicators according to the Block_A in the reference picture Ref0 and the Block_B in the reference picture Ref1, for example, based on comparison results between SAD calculated according to (Expression FRUC-3) and a threshold according to a pixel bit-depth of the target block Cur_block, the processing of the matching predictor 30373 may be stopped.

Further, the matching predictor 30373 (the first motion vector search unit 303731) may stop the search of the motion vector (mv0[0], mv0[1]), based on indicators according to the Block_A in the reference picture Ref0 and the Block_B in the reference picture Ref1, for example, based on comparison results between SAD calculated according to (Expression FRUC-3) and a threshold according to a pixel bit-depth of the target block Cur_block.

As an example, in a case that the following conditional expression is true, the matching predictor 30373 may stop the search of the motion vector, and may determine that (mv0[0], mv0[1]) leading to a minimum matching cost C at the present time point is a vector to be assigned to the target block.

SAD<((BW*BH)<<TH)  (Expression FRUC-30-2)

Here, TH is a threshold for stopping search, and is a value calculated according to the following pixel bit-depth BitDepth, for example.

TH=Max(2,14−BitDepth)+(BitDepth−8)+
Alpha  (Expression FRUC-30-3)

In this example, in the matching predictor 30373, performing evaluation of errors in intermediate data in the motion compensation processing is taken into consideration. As in H.265/HEVC, in a case that the pixel bit-depth of intermediate data of a pixel value in the motion compensation processing is larger than 14 bits or 12 bits with the coded pixel bit-depth ranging from 8 bits to 12 bits, coded pixel bit-depth+2 bits is adopted. Accordingly, the threshold TH is determined in consideration that average SAD per pixel has the same value in a case that evaluation is performed with the coded pixel bit-depth. Note that, here, alpha is a parameter for adjustment.

Further, for the motion compensation error, the following threshold TH using a quantization parameter Qp as well as the pixel bit-depth BitDepth may be used, in consideration of a fact that there is a correlation with the quantization parameter Qp.

TH=Max(2,14−BitDepth)+(Qp>>3)+(BitDepth−8)+
beta  (Expression FRUC-30-4)

The use of the threshold as described above enables appropriate determination in a case that the value of the quantization parameter Qp is small or large. Note that, here, beta is a parameter for adjustment.

Note that, as another aspect, in a case that the following conditional expression is true, the matching predictor 30373 may stop the search of the motion vector, and may use as a motion vector of the target block of the motion vector of minimum SAD at the present time point.

Cost<((BW*BH)<<TH)  (Expression FRUC-30-5)

Here, Cost on the left-hand side is a value derived according to the following expression.

Cost=SAD+(λ*(1<<(BitDepth−8))*dMV  (Expression FRUC-30-6)

Further, a weight coefficient λ is a real number greater than 0 configured in advance, and dMV is a value representing a sum of absolute difference abs(mv0[0]−MVx)+abs(mv0[1]−MVy) of a motion vector.

In other words, in Step S3203, in a case that a condition regarding the conditional expression is satisfied, the matching predictor 30373 may skip the block level local search and the processing of deriving a motion vector of each subblock included in the target block. In other words, in a case that the condition is satisfied, the motion vector determined in S3203 may be configured as the motion vector spMvLX of each subblock of the target block, and the processing based on the flowchart of FIG. 16(*a*) may end.

In S3204, the matching predictor 30373 (the first motion vector search unit 303731) performs block level local search of the target block, and derives a final motion vector of the target block.

Note that, in Step S3204 as well, in a similar manner to S3203, in a case that a condition based on indicators according to the Block_A in the reference picture Ref0 and the Block_B in the reference picture Ref1, for example, based on comparison results between SAD calculated according to (Expression FRUC-3) and a prescribed threshold is satisfied, the matching predictor 30373 stops the block level search, and configures a motion vector satisfying (Expression FRUC-3) as the motion vector spMvLX of each subblock of the target block. Then, the processing of S3205 and subsequent steps of deriving a motion vector of each subblock included in the target block may be skipped.

Subsequently, the following processing is performed for each subblock included in the target block (S3205 to S3208).

In S3205, the matching predictor 30373 (the second motion vector search unit 303732) configures initial vector candidates of each subblock in the target block.

In S3206, the matching predictor 30373 (the second motion vector search unit 303732) configures a subblock level search range.

In S3207, the matching predictor 30373 (the second motion vector search unit 303732) searches for a vector that leads to a minimum matching cost out of the initial vector candidates limited in S3206, and configures the vector as a subblock level initial vector.

Note that, in Step S3207, in a case that a condition based on indicators according to the Block_A in the reference picture Ref0 and the Block_B in the reference picture Ref1, for example, based on comparison results between SAD calculated according to (Expression FRUC-3) and a prescribed threshold is satisfied, the matching predictor 30373 may configure a vector that leads to a minimum matching cost at the present time point as the motion vector spMvLX of the subblock, and may start derivation of a motion vector for the next subblock.

Next, in S3208, the matching predictor 30373 (the second motion vector search unit 303732) performs local search around the initial vector of the subblock selected in S3207, and derives a vector that leads to a minimum matching cost as a motion vector of the subblock.

Note that, in Step S3208, in a case that a condition based on indicators according to the Block_A in the reference picture Ref0 and the Block_B in the reference picture Ref1, for example, based on comparison results between SAD calculated according to (Expression FRUC-3) and a prescribed threshold is satisfied, the matching predictor 30373 may configure a vector that leads to a minimum matching cost at the present time point as a motion vector of the subblock, and may start derivation of a motion vector for the next subblock.

Then, in a case that the processing for all the subblocks included in the target block has completed, the pattern match vector derivation processing using bilateral matching ends.

As described above, a motion vector derivation apparatus according to the present embodiment that derives a motion vector to be referred to in order to generate a prediction image to be used for coding or decoding of a video is the matching predictor (motion vector search unit) 30373 that searches for a motion vector for each prediction unit through matching processing. The motion vector derivation apparatus includes the matching predictor 30373 that stops search of the motion vector, according to whether or not a conditional expression according to a pixel bit-depth is satisfied. According to the configuration described above, a load of processing in a case that a motion vector is searched for can be reduced.

As an example, in a case that the conditional expression expressed in (Expression FRUC-30-2) or (Expression FRUC-30-5) is true, the matching predictor 30373 may stop the search of the motion vector, and may determine that (mv0[0], mv0[1]) leading to a minimum matching cost C at the present time point is the vector spMvLX to be assigned to each subblock of the target block. Further, as expressed in (Expression FRUC-3) and (Expression FRUC-30-2), for example, the conditional expression may include an indicator according to a difference between two reference images and a threshold. With this, in a case that bilateral matching is performed, a configuration of stopping search of a motion vector can be applied.

Further, as expressed in (Expression FRUC-3), (Expression FRUC-30-5), and (Expression FRUC-30-6), the conditional expression may include a first term indicating a sum of absolute difference between two reference images and a second term including a value according to a pixel bit-depth. With this, search of a motion vector can be stopped by using the value of the sum of absolute difference that is appropriately corrected.

Next, pattern match vector derivation processing using template matching will be described with reference to FIG. 16(b). S3211 to S3204 in the steps illustrated in FIG. 16(b) are steps for block search that is performed at the block level. Further, S3205 to S3208 are steps for subblock search that is performed at the subblock level. Note that processing the same as the processing of FIG. 16(a) is denoted by the same number.

First, the matching predictor 30373 (the first motion vector search unit 303731) acquires a template of a target block (S3211).

Next, in S3201, the matching predictor 30373 (the first motion vector search unit 303731) configures block level initial vector candidates in the target block.

In S3202, the matching predictor 30373 (the first motion vector search unit 303731) configures a block level search range.

Next, in S3203, the matching predictor 30373 (the first motion vector search unit 303731) configures a vector that leads to a minimum matching cost C out of the initial vector candidates configured in the above as a block level initial vector.

Further, the matching predictor 30373 (the first motion vector search unit 303731) may stop the search of the motion vector, based on an indicator according to a difference between the template and a reference image, for example, based on comparison results between SAD calculated according to (Expression FRUC-17) and a threshold according to a pixel bit-depth of the target block Cur_block.

As an example, in a case that a conditional expression expressed in the expression of (Expression FRUC-30-2) or the expression of (Expression FRUC-30-5) is true, the matching predictor 30373 may stop the search of the motion vector, and determine that (mv0[0], mv0[1]) leading to a minimum matching cost C at the present time point is a vector to be assigned to the target block.

Further, as expressed in (Expression FRUC-17) and (Expression FRUC-30-2), the conditional expression may include an indicator according to a difference between the template and a reference image and a threshold. With this, in a case that template matching is performed, a configuration of stopping search of a motion vector can be applied.

Further, as expressed in (Expression FRUC-17), (Expression FRUC30-5), and (Expression FRUC30-6), the conditional expression may include a first term indicating a sum of absolute difference between a template and a reference image and a second term including a value according to a pixel bit-depth. With this, search of a motion vector can be stopped by using the value of the sum of absolute difference that is appropriately corrected.

In other words, in Step S3203, in a case that a condition regarding the conditional expression is satisfied, the matching predictor 30373 may skip the block level local search and the processing of deriving a motion vector of each subblock included in the target block. In other words, in a case that the condition is satisfied, the motion vector determined in S3203 may be configured as the motion vector spMvLX of each subblock of the target block, and the processing based on the flowchart of FIG. 16(b) may end.

In S3204, the matching predictor 30373 (the first motion vector search unit 303731) searches a local region around the initial vector derived in S3203, and configures a vector that leads to a minimum matching cost C as a final motion vector of the target block.

Note that, in Step S3204 as well, in a similar manner to S3203, in a case that a condition based on an indicator according to a difference between the template and a reference image, for example, based on comparison results between SAD calculated according to (Expression FRUC- 17) and a prescribed threshold is satisfied, the matching predictor 30373 stops the block level search, and configures a motion vector satisfying (Expression FRUC-17) as the motion vector spMvLX of each subblock of the target block. Then, the processing of S3205 and subsequent steps of deriving a motion vector of each subblock included in the target block may be skipped.

Subsequently, the following processing is performed for each subblock included in the target block (S3205 to S3208).

In S3205, the matching predictor 30373 (the second motion vector search unit 303732) configures initial vector candidates of each subblock in the target block.

In S3206, the matching predictor 30373 (the second motion vector search unit 303732) clips the initial vector candidates so that the initial vector search of the subblock is not performed beyond the block level search range. Further, a subblock level search range is limited so that image data outside the search range used at the block level is not used in the search of each subblock.

In S3212, the matching predictor 30373 (the second motion vector search unit 303732) acquires a template of the subblock of the target block.

In S3207, the matching predictor 30373 (the second motion vector search unit 303732) configures a vector that leads to a minimum matching cost C out of the initial vectors limited in S3206 as a subblock level initial vector.

Note that, in Step S3207, in a case that a condition based on an indicator according to a difference between the template and a reference image, for example, based on comparison results between SAD calculated according to (Expression FRUC-17) and a prescribed threshold is satisfied, the matching predictor 30373 configures a vector that leads to a minimum matching cost at the present time point as the motion vector spMvLX of the subblock, and may start derivation of a motion vector for the next subblock.

Next, in S3208, the matching predictor 30373 (the second motion vector search unit 303732) performs local search around the initial vector of the subblock configured in S3207, and derives a vector that leads to a minimum matching cost C as a motion vector of the subblock.

Note that, in Step S3208, in a case that a condition based on an indicator according to a difference between the template and a reference image, for example, based on comparison results between SAD calculated according to (Expression FRUC-17) and a prescribed threshold is satisfied, the matching predictor 30373 configures a vector that leads to a minimum matching cost at the present time point as a motion vector of the subblock, and may start derivation of a motion vector for the next subblock.

Then, in a case that the processing for all the subblocks included in the target block has completed, the pattern match vector derivation processing using template matching ends.

The above has described a case in which the reference picture is Ref0. However, also in a case that the reference picture is Ref1, template matching can be performed with the same processing as above. In addition, in a case that there are two reference pictures, the motion compensation unit 3091 performs bi-prediction processing by using two derived motion vectors.

fruc_merge_idx to be output to the motion compensation unit 3091 is derived according to the following expression.

fruc_merge_idx=BM_flag+(TM_flag<<1)  (Expression FRUC-31)

Note that, in a case that fruc_merge_idx is reported by the video decoding apparatus 31, BM_flag and TM_flag may be derived prior to the pattern match vector derivation processing, and only matching processing with a true value of the flag may be performed.

BM_flag=frue_merge_idx & 1  (Expression FRUC-32)

TM_flag=(fruc_merge_idx & 2)>>1  (Expression FRUC-33)

OBMC Processing

The motion compensation unit 3091 according to the present embodiment may generate a prediction image by using OBMC processing. Here, Overlapped block motion compensation (OBMC) processing will be described. The OBMC processing is processing in which an interpolation image (motion compensation image) is generated for each of the subblocks constituting a target block by using an interpolation image PredC that is generated using an inter prediction parameter (hereinafter a motion parameter) of the target block (target subblock) and a second interpolation image PredRN that is generated using a motion parameter of an adjacent block (adjacent point) of the target subblock. More specifically, processing (interpolation image correction), in which the interpolation image PredC of the target block is corrected by using the interpolation image PredRN that is based on a motion parameter of an adjacent block in pixels (pixels around a boundary) in the target block with a close distance to a block boundary, is performed.

Figure 17:
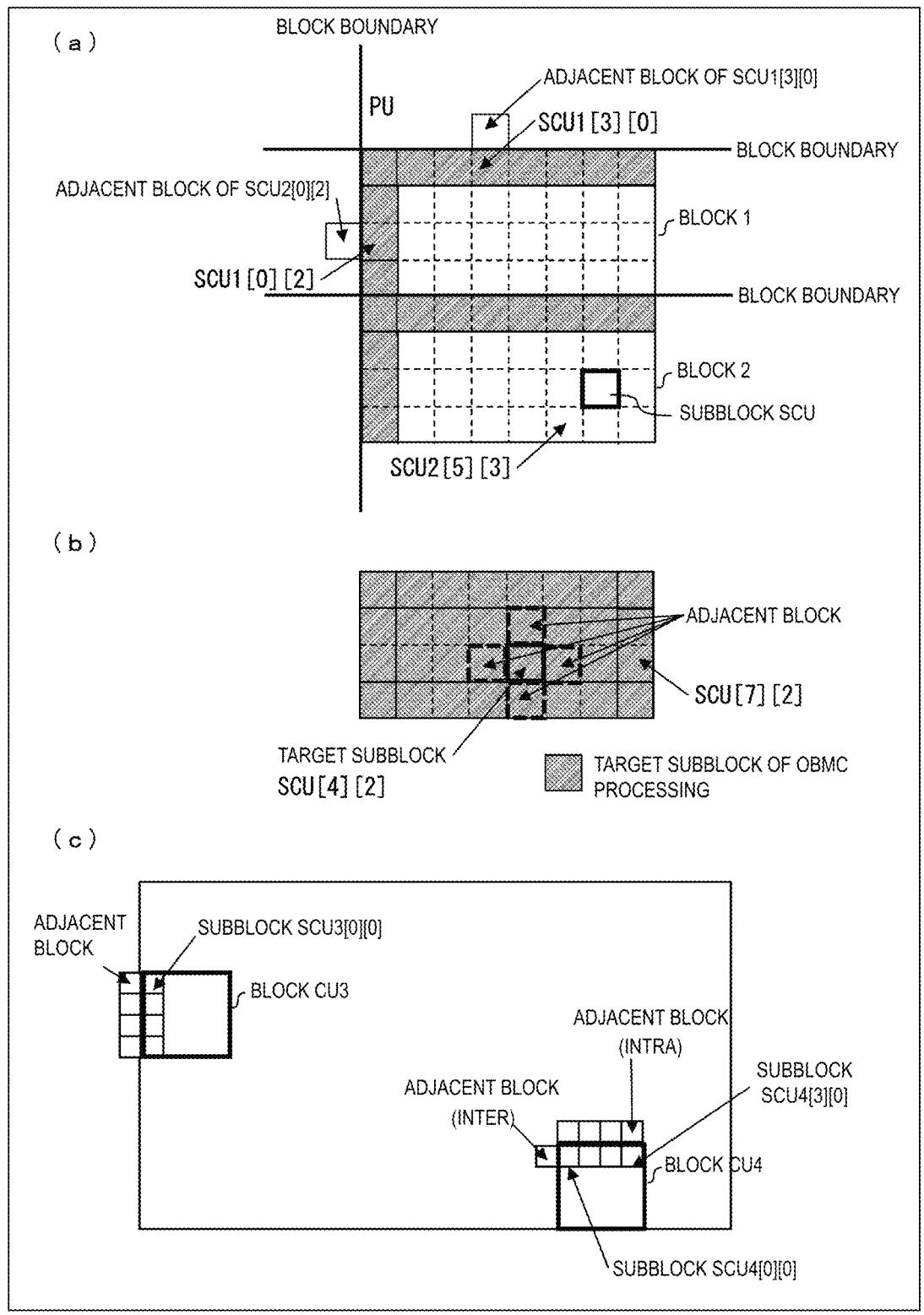
FIG. 17 is a diagram illustrating an example of a target subblock and its adjacent blocks in OBMC prediction.

FIG. 17 is a diagram illustrating an example of a region in which a prediction image is generated by using a motion parameter of an adjacent block according to the present embodiment. As illustrated in FIG. 17(*a*), each of the pixels of hatched subblocks present within a prescribed distance from a block boundary is an application target of the OBMC processing. Note that subblocks sharing the boundary with a right end or lower end boundary of the target block are not applicable as application targets of the OBMC processing. In other words, among the subblocks constituting the target block, subblocks whose right side is located outside the target block or subblocks whose lower side is located outside the target block are not applicable as application targets. In a case that subblock prediction is performed, motion parameters of subblocks in the target block may be different from one other. Thus, as illustrated in FIG. 17(*b*), subblock boundaries with the top, bottom, right, and left of the subblock are application targets of the OBMC processing.

Note that, for the sake of comprehensive processing irrespective of the size of a target block and an adjacent block, the OBMC processing is performed for each of the subblocks obtained by splitting a block (for each OBMC block). The size of a subblock may have a value of 4×4 or 8×8, for example.

In OBMC, two types of interpolation images, i.e., an interpolation image (a first OBMC interpolation image) of a target subblock that is derived based on inter prediction parameters of a target block and an interpolation image (a second OBMC interpolation image) that is derived based on inter prediction parameters of an adjacent block, are generated, and an interpolation image to be finally used for prediction is generated through weight addition processing performed on those interpolation images.

Figure 18:
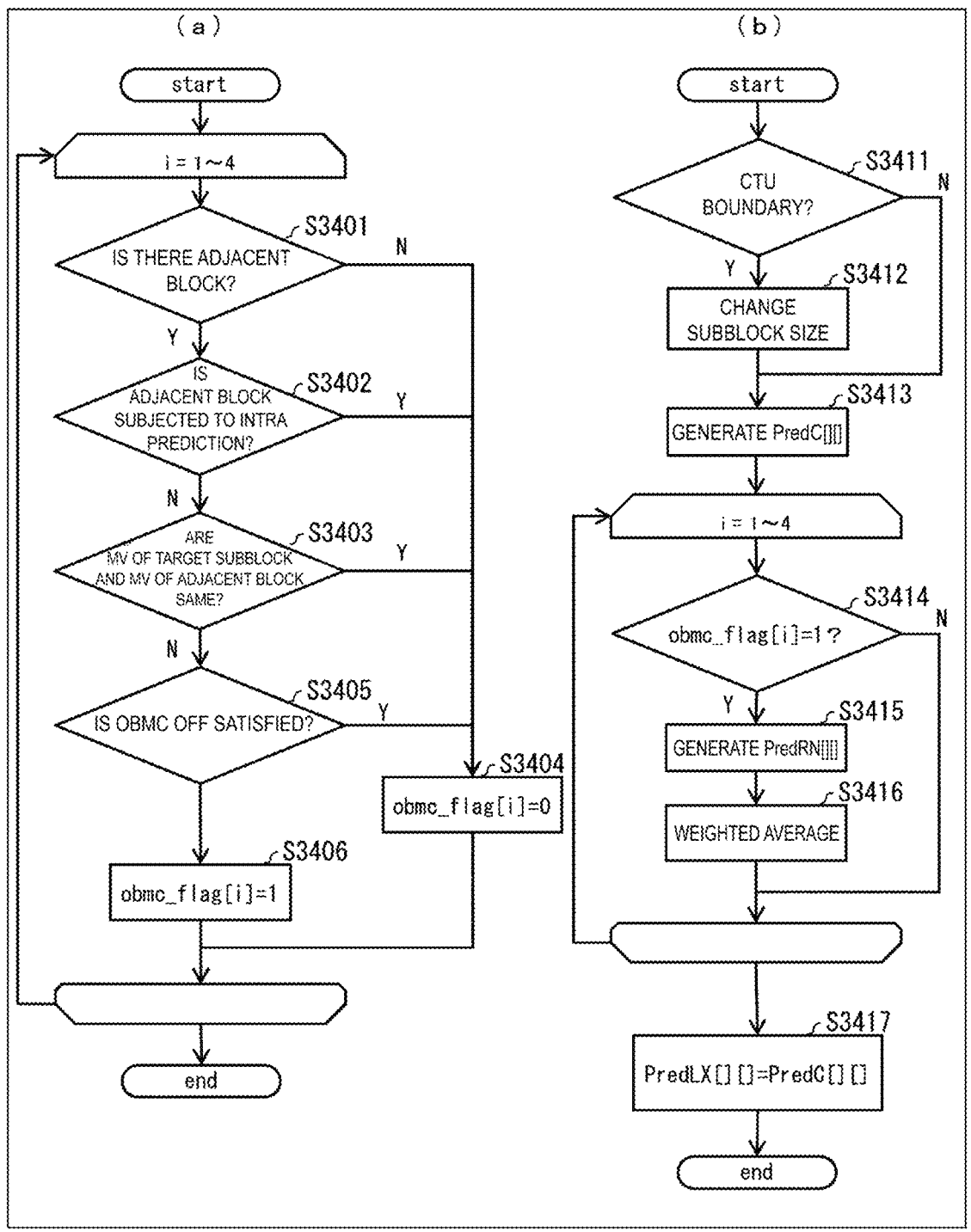
FIG. 18 is a flowchart illustrating parameter derivation processing in OBMC prediction.

Accordingly, in a block or a subblock determined to be subjected to "application of OBMC processing (OBMC ON)", two types of interpolation images are generated by using two types of motion vectors for NumOBMC pixel values from a boundary in the vertical direction, regarding upper and lower boundaries (horizontal boundaries) of the target block (target subblock). Subsequently, two interpolation images are generated by using two types of motion vectors for NumOBMC pixel values from a boundary in the horizontal direction, regarding left and right boundaries (vertical boundaries) of the target block (target subblock).
Flow of OBMC Processing FIG. 18 is a flowchart illustrating parameter derivation processing performed by the OBMC predictor 30374 according to the present embodiment.

The OBMC predictor 30374 determines presence or absence and availability of adjacent blocks (reference blocks) that are adjacent to a target subblock in each of the upper, left, lower, and right directions. FIG. 18 adopts a method in which the OBMC processing (interpolation image correction) is first performed on all of the subblocks in each of the upper, left, lower, and right directions, and then the processing proceeds to processing for the next direction. However, a method in which the OBMC processing (interpolation image correction) is first performed on a certain subblock in all the directions, and then the processing proceeds to processing for the next subblock may be adopted. In FIG. 18, the directions regarding the adjacent blocks of the target subblock are represented as follows: i=1 (up) represents the upper side, i=2 (left) represents the left side, i=3 (bottom) represents the lower side, and i=4 (right) represents the right side.

First, the OBMC predictor 30374 checks necessity of the OBMC processing and presence or absence of adjacent blocks (S3401). In a case that, with the prediction unit being a block unit, the target subblock does not share the boundary with a block boundary in the direction indicated by i or in a case that the subblock shares the boundary with a right or lower boundary of a block, there are no adjacent blocks necessary for the OBMC processing (interpolation image correction) (N in S3401). Thus, the process proceeds to S3404, and a flag obmc_flag[i] is set to 0. Otherwise (in a case that the target subblock shares the boundary with a block boundary with the prediction unit being a block unit or in a case that the processing is performed on a per subblock basis), there is an adjacent block necessary for the OBMC processing (Y in S3401). Thus, the process proceeds to S3402.

For example, a subblock SCU1[3][0] of FIG. 17(*a*) does not share the boundary with a block boundary on the left side, the lower side, and the right side, and thus obmc_flag[2 (left)]=0, obmc_flag[3 (bottom)]=0, and obmc_flag[4 (right)]=0. Further, a subblock SCU1[0][2] does not share the boundary with a block boundary on the upper side, the lower side, and the right side, and thus obmc_flag[1 (up)]=0, obmc_flag[3 (bottom)]=0, and obmc_flag[4]=0. A subblock SCU2[5][3] shares the boundary with a lower boundary of a block on the lower side and does not share the boundary with a block boundary on the upper side, the left side, and the right side, and thus obmc_flag[1 (up)]=0, obmc_flag[2 (left)]=0, obmc_flag[3 (bottom)]=0, and obmc_flag[4 (right)]=0. White subblocks are such subblocks that either do not border a block boundary on any side or border a block boundary only on the lower side or the right side, and thus obmc_flag[1 (up)]=obmc_flag[2 (left)]=obmc_flag[3 (bottom)]=obmc_flag[4]=0.

Next, to check availability of an adjacent block, the OBMC predictor 30374 checks whether or not an adjacent block in the direction indicated by i is an intra prediction block (S3402). In a case that the adjacent block is an intra prediction block (Y in S3402), the process proceeds to S3404, and obmc_flag[i] in the corresponding direction i is set to 0. Otherwise (in a case that the adjacent block is an inter prediction block) (N in S3402), the process proceeds to S3403.

For example, in the case of FIG. 17(*c*), with respect to a target subblock SCU4[3][0] of a target block CU4, an upper adjacent block is subjected to an intra prediction, and thus obmc_flag[1 (up)] of a target subblock SCU4[3][0] is set to 0.

Next, to check availability of an adjacent block, the OBMC predictor 30374 checks whether or not motion parameters of the adjacent block in the direction indicated by i and the target subblock are the same (S3403). In a case that the motion parameters are the same (Y in S3403), the process proceeds to S3404, and obmc_flag[i] is set to 0. Otherwise (in a case that the motion parameters are different) (N in S3403), the process proceeds to S3405.

Whether or not the motion parameters of the subblock and its adjacent block are the same is determined according to the following expression.

$$((mvLX[0]!=mvLXRN[0])\|(mvLX[1]!=mvLXRN[1])\\\|(refIdxLX!=refIdxLXRN))? \quad \text{(Expression OBMC-1)}$$

Here, (mvLX[0], mvLX[1]) represents a motion vector of a target subblock, refIdxLX represents a reference picture index, (mvLXRN[0], mvLXRN[1]) represents a motion vector of an adjacent block in the direction indicated by i, and refIdxLXRN represents a reference picture index. For example, in FIG. 17(*c*), let (mvLX[0], mvLX[1]) be a motion vector of a target subblock SCU4[0][0], refIdxLX be a reference picture index, (mvLXR2[0], mvLXR2[1]) be a motion vector of a left adjacent block, and refIdxLXR2 be a reference picture index. In a case that the motion vector and the reference picture index indicate the same, for example, in a case that ((mvLX[0]==mvLXR2[0]) && (mvLX[1]==mvLXR2[1]) && (refIdxLX==refIdxLXR2)) is true, obmc_flag[2] of the target subblock SCU4[0][0] is 0.

Note that, in the above expression, a motion vector and a reference picture index are used for determination. However, as in the following expression, a motion vector and POC may be used for determination.

$$((mvLX[0]!=mvLXRN[0])\|(mvLX[1]!=mvLXRN[1])\|(refPOC!=refPOCRN))? \quad \text{(Expression OBMC-2)}$$

Here, refPOC is POC of a target subblock, and refPOCRN is POC of an adjacent block.

The OBMC predictor 30374 determines whether or not an OBMC OFF condition is satisfied (S3405). In a case that the OBMC OFF condition is satisfied (Y in S3405), the process proceeds to S3404, and obmc_flag[i] is set to 0. Otherwise (in a case that the OBMC OFF condition is not satisfied) (N in S3405), the process proceeds to S3406. As the OBMC OFF condition, any one of the OBMC OFF conditions 1 to 6 described above is used.

The OBMC predictor 30374 sets obmc_flag[i] to 1 (S3406).

Next, the OBMC predictor 30374 performs the above processing of S3401 to S3406 for all the directions of the subblock (i=1 to 4), and then ends its processing.

The OBMC predictor 30374 outputs the prediction parameter (obmc_flag and the motion parameters of adjacent blocks of each subblock) derived in the above to the inter prediction image generator 309. The inter prediction image generator 309 determines necessity of the OBMC processing with reference to obmc_flag, and generates an OBMC interpolation image for the target block (details thereof will be described in Motion Compensation).

Note that, in the video decoding apparatus 31, in a case that there is obmc_flag reported from the video coding apparatus 11, the reported obmc_flag is set to obmc_flag[i], and only in a case that obmc_flag[i]=1, the above processing may be performed.

Example of Motion Vector Derivation Processing

In a case that two motion vectors derived in the merge mode are in a direction opposite to a target block, the BTM predictor 3038 performs bilateral template matching (BTM) processing.

Figure 19:
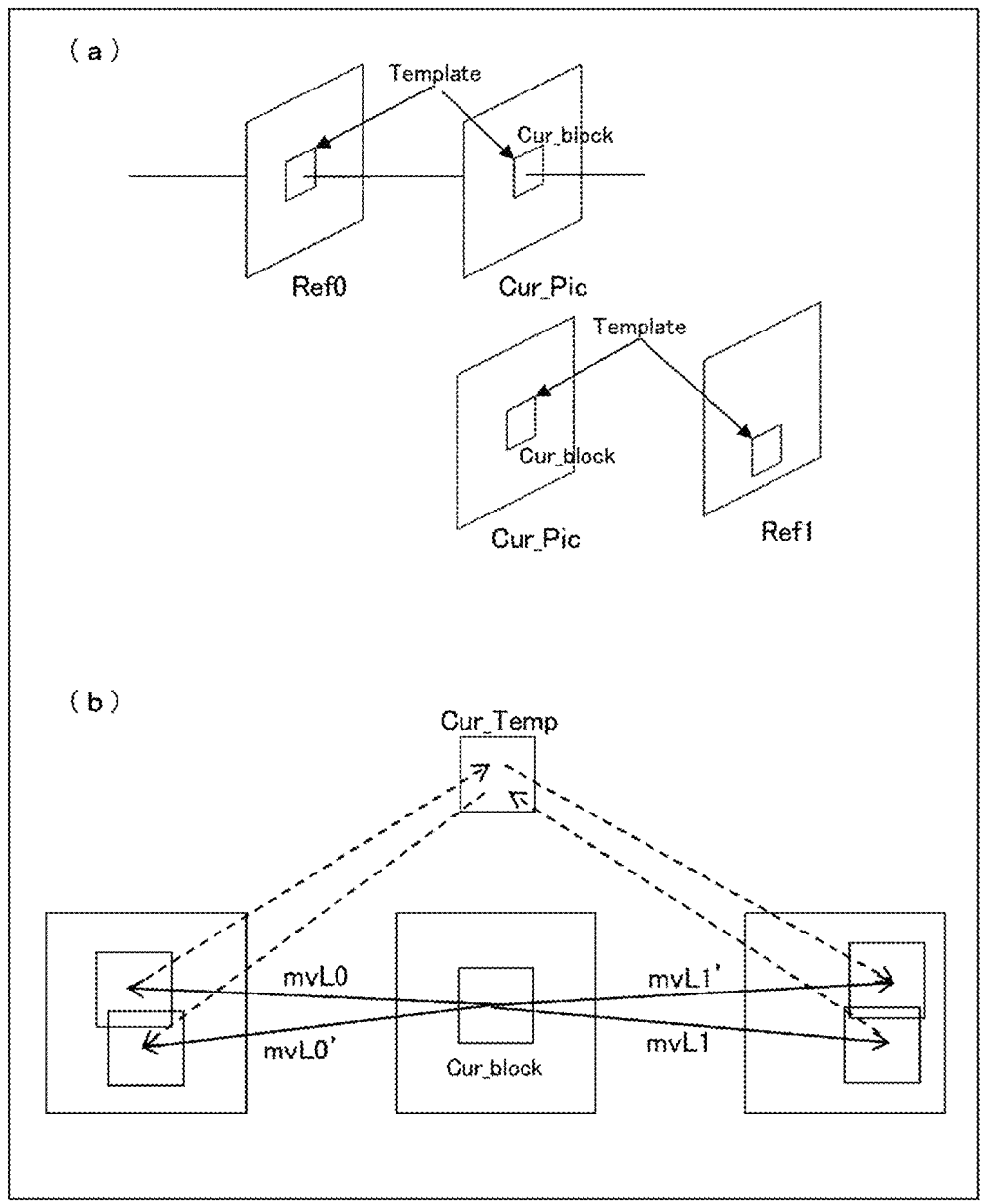
FIG. 19 is a diagram illustrating bilateral template matching processing.

With reference to FIG. 19, the bilateral template matching (BTM) processing will be described. FIG. 19(a) is a diagram illustrating a relationship between a reference picture and a template in BTM prediction, and FIG. 19(b) is a diagram illustrating the template in BTM prediction.

As illustrated in FIGS. 19(a) and 19(b), first, the BTM predictor 3038 generates a prediction block of a target block Cur_block, based on multiple motion vectors (for example, mvL0 and mvL1) derived in the merge prediction parameter derivation unit 3036, and uses the generated prediction block as a template. Specifically, a prediction block Cur_Temp is generated based on a motion compensation image predL0 that is generated based on mvL0 and a motion compensation image predL1 that is generated based on mvL1.

Cur_Temp[x][y]=Clip3(0,(1<<bitDepth)−1,(predL0[x][y]+predL1[x][y]+1)>>1)  (Expression BTM-1)

Note that, in a case that a flag included in the picture parameter set PPS indicates application of weighted prediction, the BTM predictor 3038 may generate a template image to be used for the bilateral matching processing by using at least any one of a weight coefficient and an offset associated with a first reference image and at least any one of a weight coefficient and an offset associated with a second reference image, and for example, may derive the prediction block Cur_Temp according to the following expression.

Cur_Temp[x][y]=Clip3(0,(1<<bitDepth)−1,(predL0[x][y]*w0+predL1[x][y]*w1+(o0+o1+1)<<log 2Wd))>>(log 2Wd+1))  (Expression BTM-1-2)

Here, log 2WD is a variable representing a prescribed shift amount of weighted prediction.

Further, the matching predictor (motion vector search unit) 30373 may search for a motion vector for each prediction unit through the bilateral matching processing, with reference to the template image generated based on (Expression BTM-1-2). According to the configuration described above, in a case that weighted prediction is applied, a prediction block of higher accuracy can be generated.

Next, the BTM predictor 3038 configures motion vector candidates within a range of a search range ±SR pixels around each of mvL0 and mvL1 (initial vectors), and derives a matching cost C between motion compensation images PredL0' and PredL1' generated from respective motion vector candidates and the template. Then, vectors mvL0' and mvL1' that lead to a minimum matching cost C are configured as updated motion vectors of the target block.

FIG. 6(b) is a schematic diagram illustrating a configuration of the AMVP prediction parameter derivation unit 3032 according to the present embodiment. The AMVP prediction parameter derivation unit 3032 includes a vector candidate derivation unit 3033, a vector candidate selection unit 3034, and a vector candidate storage unit 3036. The vector candidate derivation unit 3033 derives prediction vector candidates from the motion vector mvLX of a processed block stored in the prediction parameter memory 307 based on the reference picture index refIdx, and stores the derived prediction vector candidates in the prediction vector candidate list mvpListLX[ ] of the vector candidate storage unit 3036.

The vector candidate selection unit 3034 selects a motion vector mvpListLX[mvp_lX_idx] indicated by the prediction vector index mvp_lX_idx out of the prediction vector candidates in the prediction vector candidate list mvpListLX[ ] as the prediction vector mvpLX. The vector candidate selection unit 3034 outputs the selected prediction vector mvpLX to the addition unit 3035.

Note that the prediction vector candidates are blocks that have already been subjected to decoding processing, and are derived by scaling motion vectors of blocks (for example, adjacent blocks) present in a range determined in advance with respect to a decoding target block. Note that the adjacent blocks are blocks spatially adjacent to the decoding target block, for example, a left block and an upper block. In addition to this, the adjacent blocks include a region temporally adjacent to the decoding target block, for example, a region obtained based on a prediction parameter of a block including the same position as the position of the decoding target block in a picture with different display time.

The addition unit 3035 calculates the motion vector mvLX by adding the prediction vector mvpLX input from the AMVP prediction parameter derivation unit 3032 and the difference vector mvdLX input from the inter prediction parameter decoding control unit 3031. The addition unit 3035 outputs the calculated motion vector mvLX to the prediction image generator 308 and the prediction parameter memory 307.

Note that the motion vector derived in the merge prediction parameter derivation unit 3036 may be output to the inter prediction image generator 309 via the BTM predictor 3038, instead of directly outputting the motion vector to the inter prediction image generator 309.

Inter Prediction Image Generator 309

FIG. 14(b) is a schematic diagram illustrating a configuration of the inter prediction image generator 309 included in the prediction image generator 308 according to the present embodiment. The inter prediction image generator 309 includes a motion compensation unit (prediction image generation apparatus) 3091 and a weight predictor 3094.

Motion Compensation

Based on the inter prediction parameters (the prediction list utilization flag predFlagLX, the reference picture index refIdxLX, the motion vector mvLX, an on/off flag, and the like) input from the inter prediction parameter decoder 303, the motion compensation unit 3091 generates an interpolation image (motion compensation image) by reading a block located at a position shifted by the motion vector mvLX from a position of the decoding target block in a reference picture RefX indicated by the reference picture index refIdxLX from the reference picture memory 306. Here, in a case that accuracy of the motion vector mvLX is not integer accuracy, the motion compensation image is generated by applying a filter referred to as a motion compensation filter, which is for generating pixels at decimal positions.

In a case that accuracy of the motion vector mvLX or a motion vector mvLXN input into the motion compensation unit 3091 is 1/M pixel accuracy (M is a natural number of 2 or greater), the interpolation image is generated based on a pixel value of a reference picture at an integer pixel position, using an interpolation filter. In other words, the interpolation image Pred[ ][ ] described above is generated based on an interpolation filter coefficient mcFilter[nFrac][k] (k=0 ... NTAP−1) of an NTAP tap corresponding to phase nFrac and product-sum operation of pixels of the reference picture.

First, the motion compensation unit 3091 derives an integer position (xInt, yInt) and phase (xFrac, yFrac) corresponding to coordinates (x, y) in a prediction block, according to the following expression.

$$xInt=xb+(mvLX[0]>>(\log 2(M)))+x \quad \text{(Expression INTER-1)}$$

$$xFrac=mvLX[0]\&(M-1)$$

$$yInt=yb+(mvLX[1]>>(\log 2(M)))+y$$

$$yFrac=mvLX[1]\&(M-1)$$

Here, (xb, yb) represents upper left coordinates of a block. x=0 . . . W−1. y=0 . . . H−1. M represents accuracy (1/M pixel accuracy) of the motion vector mvLX.

The motion compensation unit 3091 derives a temporal image temp[ ] [ ] by performing horizontal interpolation processing with application of an interpolation filter to a reference picture refImg. In the following expression, Σ is a sum regarding k of k=0 . . . NTAP−1, shift1 is a normalization parameter that adjusts a range of values, and offset1=1<<(shift1−1).

$$temp[x][y]=(\Sigma mcFilter[xFrac][k]*refImg[xInt+k-NTAP/2+1][yInt]+offset1)>>shift1 \quad \text{(Expression INTER-2)}$$

Note that, in a case of reference to a pixel refImg[xInt+k−NTAP/2+1][yInt] of the reference picture, padding to be described later is performed.

Subsequently, the motion compensation unit 3091 derives the interpolation image Pred[ ][ ] by performing vertical interpolation processing on the temporal image temp[ ][ ]. In the following expression, Σ is a sum regarding k of k=0 . . . NTAP−1, shift2 is a normalization parameter that adjusts a range of values, and offset2=1<<(shift2−1).

$$Pred[x][y]=(\Sigma mcFilter[yFrac][k]*temp[x][y+k-NTAP/2+1]+offset2)>>shift2 \quad \text{(Expression INTER-3)}$$

Note that, in a case of bi-prediction, Pred[ ][ ] described above is derived for each of the lists L0 and L1 (referred to as interpolation images PredL0[ ][ ] and PredL1[ ][ ]), and the interpolation image Pred[ ][ ] is generated based on the interpolation image PredL0[ ][ ] and the interpolation image PredL1[ ][ ].

OBMC Interpolation Image Generation

In OBMC, two types of interpolation images, i.e., an interpolation image of a target subblock that is derived based on inter prediction parameters of a target block and an interpolation image that is derived based on inter prediction parameters of an adjacent block, are generated, and an interpolation image to be finally used for prediction is generated through weight addition processing performed on those interpolation images. Here, the interpolation image of a target subblock that is derived based on inter prediction parameters of a target block is referred to as an interpolation image PredC (first OBMC interpolation image), and the interpolation image that is derived based on inter prediction parameters of an adjacent block is referred to as an interpolation image PredRN (second OBMC interpolation image). Note that N represents any one of the upper side (A), the left side (L), the lower side (B), and the right side (R) of the target subblock. In a case that the OBMC processing is not performed (OBMC OFF), the interpolation image PredC is directly used as the motion compensation image PredLX of the target subblock. In a case that the OBMC processing is performed (OBMC ON), the motion compensation image PredLX of the target subblock is generated based on the interpolation image PredC and the interpolation image PredRN.

The motion compensation unit 3091 generates the interpolation image, based on the inter prediction parameters (the prediction list utilization flag predFlagLX, the reference picture index refIdxLX, the motion vector mvLX, and an OBMC flag obmc_flag) of the target subblock input from the inter prediction parameter decoder 303.

FIG. 18(*b*) is a flowchart illustrating an operation of interpolation image generation in OBMC prediction performed by the motion compensation unit 3091.

The motion compensation unit 3091 determines whether or not a block boundary is a CTU boundary (S3411). In a case that the block boundary is a CTU boundary (Y in S3411), the process proceeds to S3412. Otherwise (N in S3411), the process proceeds to S3413.

The motion compensation unit 3091 merges subblocks to change the size, and configures a motion vector by combining any of C1) to C3) and R1) to R3) described above (S3412).

The motion compensation unit 3091 generates a first OBMC interpolation image PredC[x][y] (x=0 . . . BW−1, y=0 . . . BH−1) of the subblock, based on a default subblock size and a default motion vector or the subblock size and the motion vector reconfigured in S3412 (S3413).

Next, it is determined whether or not obmc_flag[i] is 1 (S3414). In a case that obmc_flag[i] is 0 (N in S3414), the process proceeds for the next direction (i=i+1). In a case that obmc_flag[i] is 1 (Y in S3414), the process proceeds to S3415.

The motion compensation unit 3091 generates a second OBMC interpolation image PredRN[x][y] of the subblock (S3415). In other words, only for the subblock in the direction indicated by i that satisfies obmc_flag[i]=1, the second OBMC interpolation image PredRN[x][y](x=0 . . . BW−1, y=0 . . . BH−1) of the subblock is generated based on a prediction list utilization flag predFlagLX[xPbN][yPbN] and a reference picture index refIdxLX[xPbN][yPbN] of an adjacent block input from the inter prediction parameter decoder 303 and the motion vector mvLX[xPbN][yPbN] and the subblock size reconfigured in S3412. The motion compensation unit 3091 performs weighted average processing of the first OBMC interpolation image PredC[x][y] of the subblock and the second OBMC interpolation image PredRN[x][y] of the subblock (S3416).

In the configuration of performing the OBMC processing, the motion compensation unit 3091 updates the interpolation image PredC[x][y] by performing weighted average processing of the first OBMC interpolation image PredC[x][y] of the subblock and the second OBMC interpolation image PredRN[x][y] of the subblock. To give a detailed description, in a case that the OBMC flag obmc_flag[i] input from the inter prediction parameter decoder 303 is 1 (the OBMC processing is enabled), the motion compensation unit 3091 performs the following weighted average processing on NumOBMC pixels in a direction orthogonal to the direction indicated by i.

$$PredC[x][y]=((w1*PredC[x][y]+w2*PredRN[x][y])+o)>>shift \quad \text{(Expression INTER-4)}$$

Here, weights w1 and w2 in the weighted average processing will be described. The weights w1 and w2 in the weighted average processing are determined according to a distance (number of pixels) between a subblock boundary to a target pixel. The following relationships hold: w1+w2= (1<<shift) and o=1<<(shift−1). A shift value shift may be configured according to the distance between the subblock boundary and the target pixel, or may be fixed. In a case that BW and BH representing a subblock size (OBMC processing size) is 4, and the shift value is configured according to the distance, for example, the following may be satisfied:

{w1,w2,o,shift}={3,1,2,2},

{w1,w2,o,shift}={7,1,4,3},

{w1,w2,o,shift}={15,1,8,4}, and

{w1,w2,o,shift}={31,1,16,5}.

In the OBMC processing, a prediction image is generated by using an interpolation image of multiple adjacent blocks. Here, a method of updating the first OBMC interpolation image PredC[x][y] of the subblock based on motion parameters of multiple adjacent blocks will be described.

First, in a case that obmc_flag[1]=1, the motion compensation unit 3091 updates PredC[x][y] by applying a second OBMC interpolation image PredRA[x][y] of the subblock created by using motion parameters of an upper adjacent block to the first OBMC interpolation image PredC[x][y] of the subblock being the target subblock.

$$PredC[x][y]=((w1*PredC[x][y]+w2*PredRA[x][y])+o)>>shift \quad \text{(Expression INTER-5)}$$

Next, the motion compensation unit 3091 sequentially updates the first OBMC interpolation image PredC[x][y] of the subblock by applying second OBMC interpolation images PredRL[x][y], PredRL[x][y], and PredRL[x][y] of the subblocks created by using motion parameters of adjacent blocks on the left side (i=2), the lower side (i=3), and the right side (i=4) of the target subblock to the direction i that satisfies obmc_flag[i]=1. In other words, the first OBMC interpolation image PredC[x][y] is updated according to the following expression.

$$PredC[x][y]=((w1*PredC[x][y]+w2*PredRL[x][y])+o)>>shift$$

$$PredC[x][y]=((w1*PredC[x][y]+w2*PredRB[x][y])+o)>>shift$$

$$PredC[x][y]=((w1*PredC[x][y]+w2*PredRR[x][y])+o)>>shift \quad \text{(Expression INTER-6)}$$

In a case that obmc_flag[0]=0 or after the above processing is performed for i=1 to 4, the motion compensation unit 3091 sets the first OBMC interpolation image PredC[x][y] of the subblock as a prediction image PredLX[x] [y] (S3417).

$$PredLX[x][y]=PredC[x][y] \quad \text{(Expression INTER-7)}$$

The motion compensation unit 3091 can generate a prediction image in consideration of motion parameters of adjacent blocks of a target subblock. As a result, in the OBMC processing, a prediction image of high prediction accuracy can be generated.

Further, the number NumOBMC of pixels in a direction orthogonal to the subblock boundary to be updated through the OBMC processing may be any number (S=2 to BH). The form of splitting a block including a target subblock of the OBMC processing may also be any form of splitting, such as 2N×N, N×2N, and N×N.

As described above, with the CTU boundary, a prediction image is created by increasing the subblock size. With this, the transfer amount of image data from the reference picture memory 306 can be limited to a prescribed value or less. As a result, the memory bandwidth can be reduced.

Weight Prediction

The weight predictor 3094 generates a prediction image of a target block by multiplying an input motion compensation image PredLX by weight coefficients. In a case that weight prediction is not used with one of the prediction list utilization flags (predFlagL0 or predFlagL1) being 1 (in uni-prediction), processing according to the following expression, in which an input motion compensation image PredLX (LX is L0 or L1) is conformed to the number bitDepth of pixel bits, is performed.

$$Pred[x][y]=Clip3(0,(1<<bitDepth)-1,(PredLX[x][y]+offset1)>>shift1) \quad \text{(Expression INTER-8)}$$

Here, shift1=Max(2, 14−BitDepth) and offset1=1<<(shift1−1).

Further, in a case that weight prediction is not used with both the prediction list utilization flags (predFlagL0 and predFlagL1) being 1 (in a case of the bi-prediction BiPred), processing according to the following expression, in which input motion compensation images PredL0 and PredL1 are averaged to be conformed to the number of pixel bits, is performed.

$$Pred[x][y]=Clip3(0,(1<<bitDepth)-1,(PredL0[x][y]+PredL1[x][y]+offset2)>>shift2) \quad \text{(Expression INTER-9)}$$

Here, shift2=shift1+1 and offset2=1<<(shift2−1).

In addition, in a case that weight prediction is performed in uni-prediction, the weight predictor 3094 derives a weight prediction coefficient w0 and an offset o0 from coded data, and performs processing according to the following expression.

$$Pred[x][y]=Clip3(0,(1<<bitDepth)-1,((PredLX[x][y]*w0+2^{(\log 2WD-1)})>>\log 2WD)+o0) \quad \text{(Expression INTER-10)}$$

Here, log 2WD is a variable representing a prescribed shift amount.

In addition, in a case that weight prediction is performed in the bi-prediction BiPred, the weight predictor 3094 derives weight prediction coefficients w0, w1, o0, and o1 from coded data, and performs processing according to the following expression.

$$Pred[x][y]=Clip3(0,(1<<bitDepth)-1,(PredL0[x][y]*w0+PredL1[x][y]*w1+((o0+o1+1)<<\log 2WD))>>(\log 2WD+1)) \quad \text{(Expression INTER-11)}$$

Example of Description of Syntax

FIG. 25 is a diagram illustrating another aspect of the syntax illustrated in FIG. 24. The syntax illustrated in FIG. 25 includes refine_my_use_flag instead of decoder_side_distortion_bit_depth. Here, refine_my_use_flag is a flag indicating whether or not a motion vector calculated in the matching predictor 30373 or the BTM predictor 3038 is allowed to be referred to in processing of deriving a motion vector in another prediction unit. In a case that the flag indicates that such reference is not allowed, the inter prediction parameter decoder 303 refers to an initial vector derived in the matching predictor 30373 or the BTM predictor 3038, instead of referring to the motion vector.

With this, the inter prediction parameter decoder 303 can avoid delay that may be caused by processing necessary for deriving the motion vector.

Configuration of Video Coding Apparatus

Figure 20:
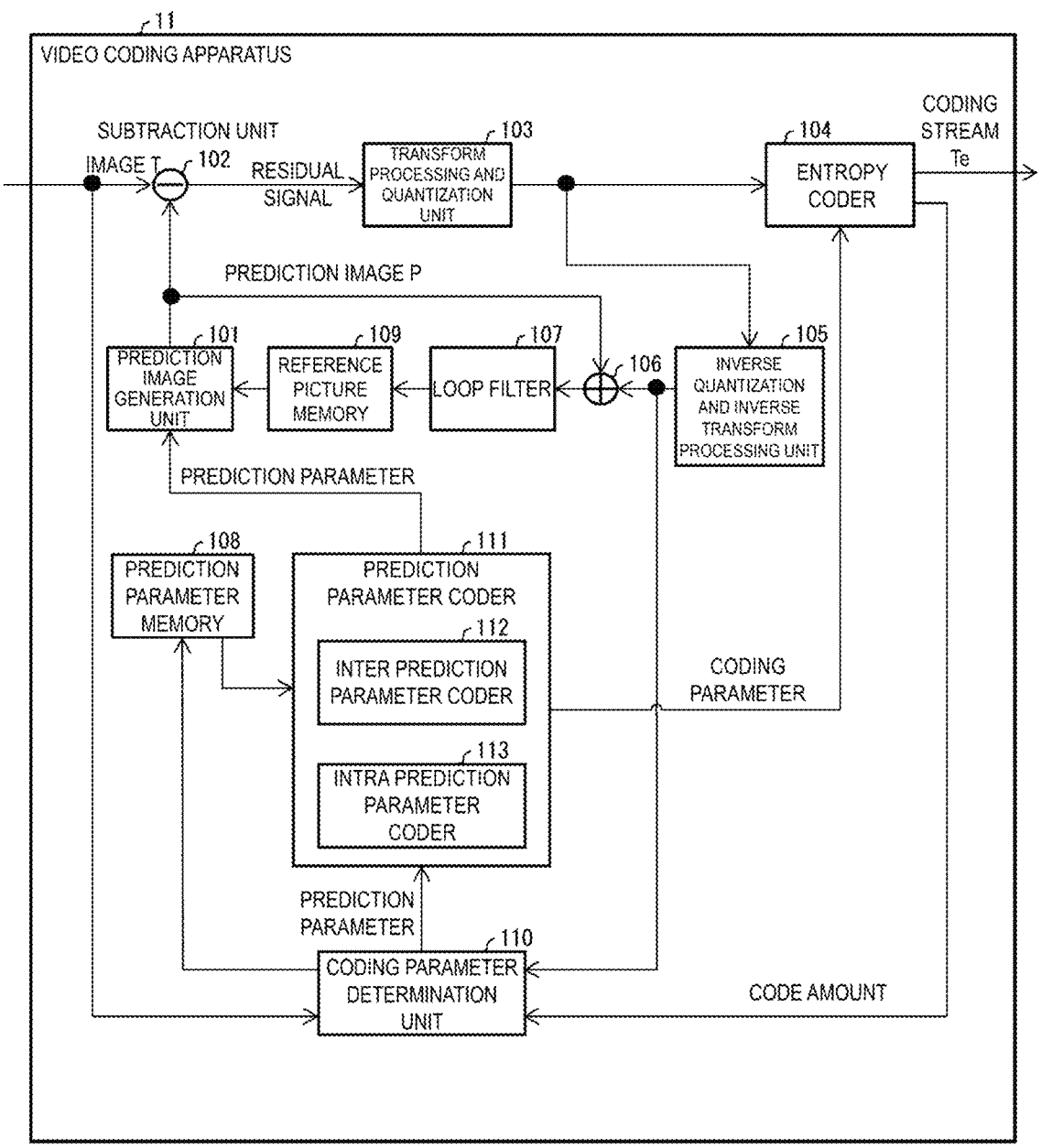
FIG. 20 is a block diagram illustrating a configuration of a video coding apparatus according to the present embodiment.

A configuration of the video coding apparatus 11 will now be described. As an example, the configuration of the video coding apparatus 11 will be described below with reference to FIG. 20.

The video coding apparatus 11 is configured to include a prediction image generator 101, a subtraction unit 102, a transform processing and quantization unit 103, an entropy coder 104, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory)

109, a coding parameter determination unit 110, and a prediction parameter coder 111. The prediction parameter coder 111 is configured to include an inter prediction parameter coder 112 and an intra prediction parameter coder 113. Note that the video coding apparatus 11 may not include the loop filter 107.

For each picture of an image T, the prediction image generator 101 generates a prediction image P of a prediction unit block for each coding unit CU that is a region where the picture is split. Here, the prediction image generator 101 reads a block that has been decoded from the reference picture memory 109, based on a prediction parameter input from the prediction parameter coder 111. For example, in a case of an inter prediction, the prediction parameter input from the prediction parameter coder 111 is a motion vector. The prediction image generator 101 reads a block in a position in a reference picture indicated by a motion vector starting from a target block. In a case of an intra prediction, the prediction parameter is, for example, an intra prediction mode. The prediction image generator 101 reads a pixel value of an adjacent block used in an intra prediction mode from the reference picture memory 109, and generates the prediction image P of a block. The prediction image generator 101 generates the prediction image P of a block by using one prediction scheme among multiple prediction schemes for the read reference picture block. The prediction image generator 101 outputs the generated prediction image P of a block to the subtraction unit 102.

Note that the prediction image generator 101 performs the same operation as the prediction image generator 308 already described.

The prediction image generator 101 generates the prediction image P of a block, based on a pixel value of a reference block read from the reference picture memory, by using a parameter input by the prediction parameter coder. The prediction image generated by the prediction image generator 101 is output to the subtraction unit 102 and the addition unit 106.

An intra prediction image generator (not illustrated) included in the prediction image generator 101 performs the same operation as the intra prediction image generator 310 described in the above.

The subtraction unit 102 subtracts a signal value of the prediction image P of a block input from the prediction image generator 101 from a pixel value at a corresponding block position of the image T, and generates a residual signal. The subtraction unit 102 outputs the generated residual signal to the transform processing and quantization unit 103.

The transform processing and quantization unit 103 performs frequency transform for the prediction residual signal input from the subtraction unit 102, and calculates transform coefficients. The transform processing and quantization unit 103 quantizes the calculated transform coefficients to calculate quantization transform coefficients. The transform processing and quantization unit 103 outputs the calculated quantization transform coefficients to the entropy coder 104 and the inverse quantization and inverse transform processing unit 105.

To the entropy coder 104, quantization transform coefficients are input from the transform processing and quantization unit 103, and prediction parameters are input from the prediction parameter coder 111. For example, input prediction parameters include codes such as a reference picture index ref_idx_lX, a prediction vector index mvp_lX_idx, a difference vector mvdLX, a prediction mode pred_mode_flag, and a merge index merge_idx.

The entropy coder 104 performs entropy coding on the input split information, prediction parameters, quantization transform coefficients and the like to generate the coding stream Te, and outputs the generated coding stream Te to the outside.

The inverse quantization and inverse transform processing unit 105 is similar to the inverse quantization and inverse transform processing unit 311 (FIG. 4) in the video decoding apparatus 31, and calculates transform coefficients by performing inverse quantization on the quantization transform coefficients input from the transform processing and quantization unit 103. The inverse quantization and inverse transform processing unit 105 performs inverse transform on the calculated transform coefficient to calculate residual signals. The inverse quantization and inverse transform processing unit 105 outputs the calculated residual signals to the addition unit 106.

The addition unit 106 adds signal values of the prediction image P of the blocks input from the prediction image generator 101 and signal values of the residual signals input from the inverse quantization and inverse transform processing unit 105 for each pixel, and generates the decoded image. The addition unit 106 stores the generated decoded image in the reference picture memory 109.

The loop filter 107 performs a deblocking filter, a sample adaptive offset (SAO), and an adaptive loop filter (ALF) to the decoded image generated by the addition unit 106. Note that the loop filter 107 need not necessarily include the three types of filters described above, and may include only a deblocking filter, for example.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned QT or BT split parameter, a prediction parameter, or a parameter to be a target of coding generated associated with those parameters. The prediction image generator 101 generates the prediction image P of the blocks by using each of the sets of these coding parameters.

The coding parameter determination unit 110 calculates RD cost values indicating a volume of an information quantity and coding errors for each of the multiple sets. For example, the RD cost value is a sum of a code amount and a value of multiplying a coefficient k by a square error. The code amount is an information quantity of the coding stream Te obtained by performing entropy coding on a quantization residual and a coding parameter. The square error is a sum of pixels for square values of residual values of residual signals calculated in the subtraction unit 102. The coefficient k is a real number that is larger than a pre-configured zero. The coding parameter determination unit 110 selects a set of coding parameters by which the calculated RD cost value is minimized. With this configuration, the entropy coder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter coder 111 derives a format for coding from parameters input from the coding parameter determination unit 110, and outputs the format to the entropy coder 104. A derivation of a format for coding is, for example, to derive a difference vector from a motion vector and a prediction vector. The prediction parameter coder 111 derives parameters necessary to generate a prediction image from parameters input from the coding parameter determination unit 110, and outputs the parameters to the prediction image generator 101. For example, parameters necessary to generate a prediction image are a motion vector of a subblock unit.

The inter prediction parameter coder 112 derives inter prediction parameters such as a difference vector, based on prediction parameters input from the coding parameter determination unit 110. The inter prediction parameter coder 112 includes a partly identical configuration to a configuration by which the inter prediction parameter decoder 303 derives inter prediction parameters, as a configuration to derive parameters necessary for generation of a prediction image output to the prediction image generator 101. A configuration of the inter prediction parameter coder 112 will be described later.

Further, the intra prediction parameter coder 113 includes a partly identical configuration to a configuration by which the intra prediction parameter decoder 304 derives intra prediction parameters, as a configuration to derive prediction parameters necessary for generation of a prediction image output to the prediction image generator 101.

The intra prediction parameter coder 113 derives a format for coding (for example, MPM_idx, rem_intra_luma_pred_mode, and the like) from the intra prediction mode IntraPredMode input from the coding parameter determination unit 110.

Configuration of Inter Prediction Parameter Coder

Figure 21:
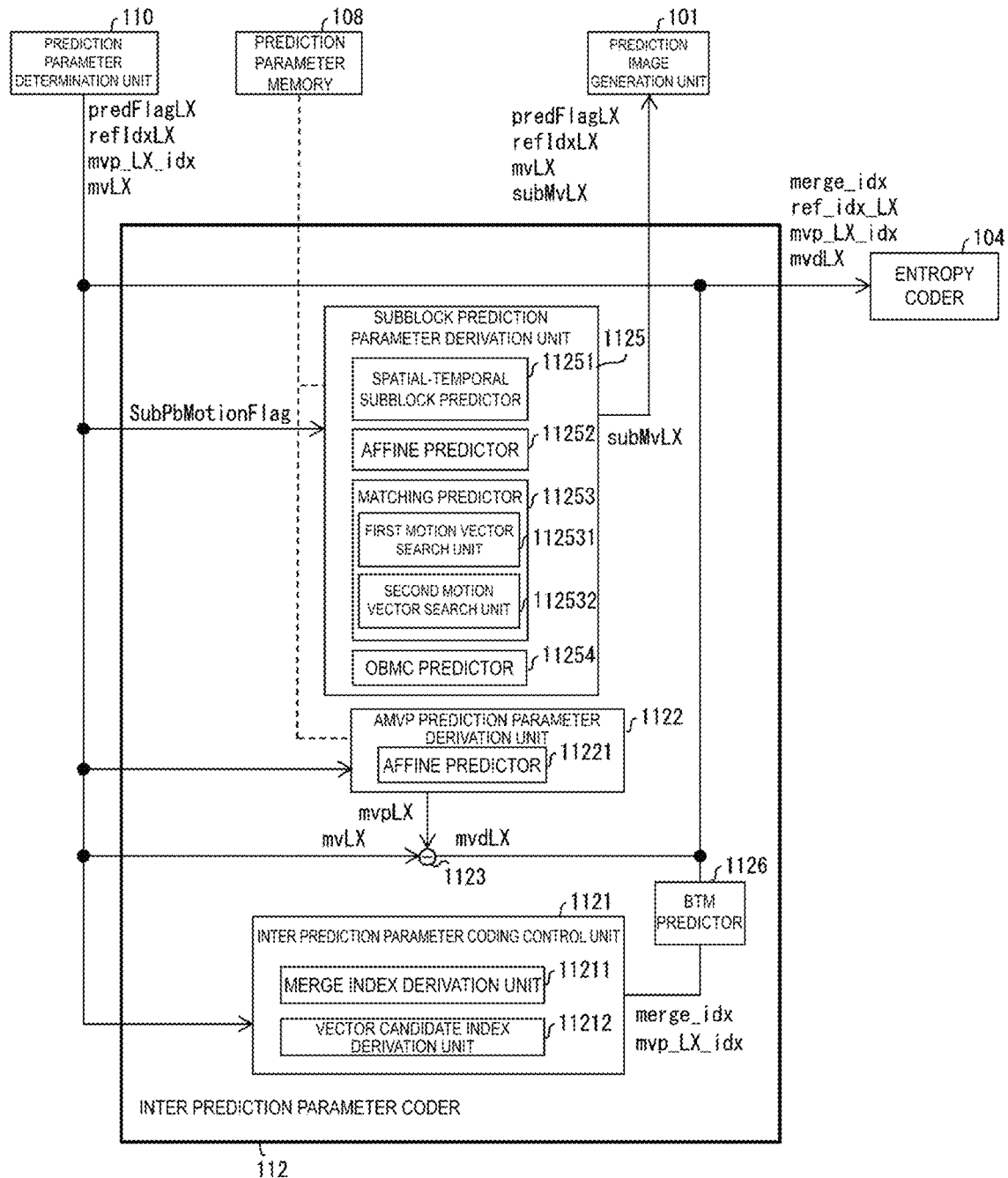
FIG. 21 is a schematic diagram illustrating a configuration of an inter prediction parameter coder according to the present embodiment.

Next, a configuration of the inter prediction parameter coder 112 will be described. The inter prediction parameter coder 112 is a means corresponding to the inter prediction parameter decoder 303 of FIG. 5, whose configuration is illustrated in FIG. 21.

The inter prediction parameter coder 112 includes an inter prediction parameter coding control unit 1121, an AMVP prediction parameter derivation unit 1122, a subtraction unit 1123, a subblock prediction parameter derivation unit 1125, and a BTM predictor 1126. The inter prediction parameter coder 112 further includes unillustrated components, such as a split mode derivation unit, a merge flag derivation unit, an inter prediction indicator derivation unit, a reference picture index derivation unit, and a vector difference derivation unit. The split mode derivation unit, the merge flag derivation unit, the inter prediction indicator derivation unit, the reference picture index derivation unit, and the vector difference derivation unit derive a PU split mode part_mode, a merge flag merge_flag, an inter prediction indicator inter_pred_idc, a reference picture index refIdxLX, and a difference vector mvdLX, respectively. The merge index derivation unit 11211, the vector candidate index derivation unit 11212, the AMVP prediction parameter derivation unit 1122, the subblock prediction parameter derivation unit 1125, and the BTM predictor 1126 may be collectively referred to as a motion vector derivation unit (motion vector derivation apparatus). The inter prediction parameter coder 112 outputs motion vectors (mvLX and subMvLX) as well as the reference picture index refIdxLX, the PU split mode part_mode, and the inter prediction indicator inter_pred_idc, or information indicating those, to the prediction image generator 101. Further, the inter prediction parameter coder 112 outputs the PU split mode part_mode, the merge flag merge_flag, the merge index merge_idx, the inter prediction indicator inter_pred_idc, the reference picture index refIdxLX, the prediction vector index mvp_lX_idx, the difference vector mvdLX, and the subblock prediction mode flag subPbMotionFlag to the entropy coder 104.

The inter prediction parameter coding control unit 1121 includes the merge index derivation unit 11211 and the vector candidate index derivation unit 11212. The merge index derivation unit 11211 compares the motion vector and the reference picture index input from the coding parameter determination unit 110 with a motion vector and a reference picture index of a block of a merge candidate read from the prediction parameter memory 108, derives the merge index merge_idx, and outputs the derived merge index merge_idx to the entropy coder 104. The merge candidate is a reference block present within a preset range from a coding target CU as a coding target (for example, a reference block sharing the boundary with a lower left end, an upper left end, or an upper right end of a coding target block), and is a block that has been subjected to coding processing. The vector candidate index derivation unit 11212 derives the prediction vector index mvp_lX_idx.

In a case that the coding parameter determination unit 110 determines to use the subblock prediction mode, in the subblock prediction parameter derivation unit 1125, a motion vector and a reference picture index in subblock prediction of any one of spatial subblock prediction, temporal subblock prediction, affine prediction, matching motion derivation, and OBMC prediction are derived according to a value of subPbMotionFlag. As has been described in the description of the video apparatus 31, the motion vector and the reference picture index are derived by reading a motion vector and a reference picture index of an adjacent block and a reference picture block, for example, from the prediction parameter memory 108. The subblock prediction parameter derivation unit 1125 as well as its components of the spatial-temporal subblock predictor 11251, the affine predictor 11252, the matching predictor 11253, and the OBMC predictor 11254 has a configuration similar to the configuration of the subblock prediction parameter derivation unit 3037 of the inter prediction parameter decoder 303 as well as its components of the spatial-temporal subblock predictor 30371, the affine predictor 30372, the matching predictor 30373, and the OBMC predictor 30374, respectively.

The AMVP prediction parameter derivation unit 1122 includes an affine predictor 11221, and has a configuration similar to the configuration of the AMVP prediction parameter derivation unit 3032 (see FIG. 5) described above.

In other words, in a case that the prediction mode predMode indicates the inter prediction mode, the motion vector mvLX is input into the AMVP prediction parameter derivation unit 1122 from the coding parameter determination unit 110. The AMVP prediction parameter derivation unit 1122 derives the prediction vector mvpLX, based on the input motion vector mvLX. The AMVP prediction parameter derivation unit 1122 outputs the derived prediction vector mvpLX to the subtraction unit 1123. Note that the reference picture index refIdxLX and the prediction vector index mvp_lX_idx are output to the entropy coder 104. Further, the affine predictor 11221 has a configuration similar to the configuration of the affine predictor 30321 of the AMVP prediction parameter derivation unit 3032 (see FIG. 5) described above.

The subtraction unit 1123 generates the difference vector mvdLX by subtracting the prediction vector mvpLX input from the AMVP prediction parameter derivation unit 1122 from the motion vector mvLX input from the coding parameter determination unit 110. The difference vector mvdLX is output to the entropy coder 104.

Implementation Examples by Software

Note that, part of the video coding apparatus 11 and the video decoding apparatus 31 in the above-mentioned embodiments, for example, the entropy decoder 301, the prediction parameter decoder 302, the loop filter 305, the prediction image generator 308, the inverse quantization and inverse transform processing unit 311, the addition unit 312, the prediction image generator 101, the subtraction unit 102, the transform processing and quantization unit 103, the entropy coder 104, the inverse quantization and inverse transform processing unit 105, the loop filter 107, the coding parameter determination unit 110, and the prediction parameter coder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the video coding apparatus 11 or the video decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiments and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

Figure 22:
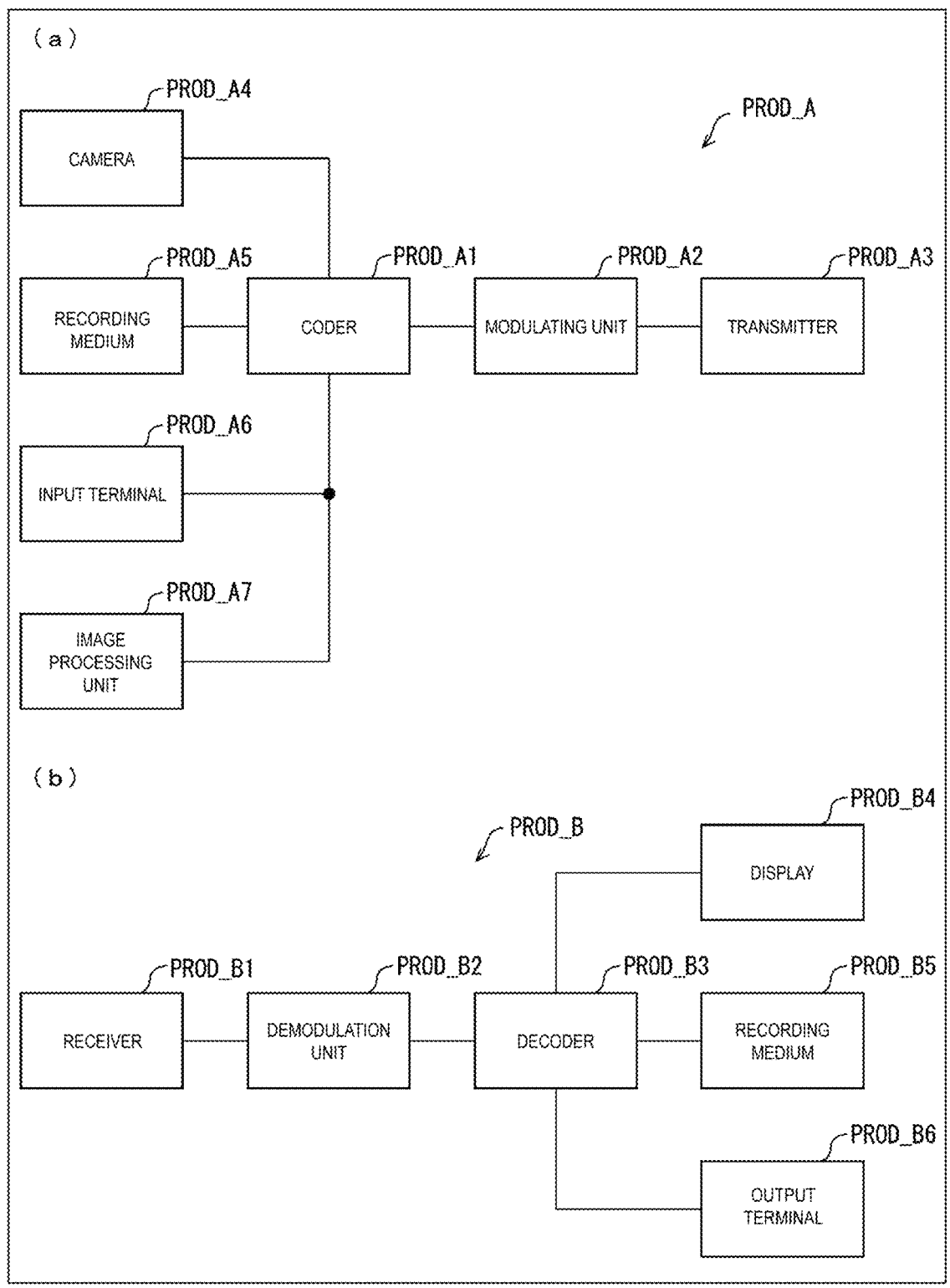
FIG. 22 is a diagram illustrating configurations of a transmitting apparatus equipped with the video coding apparatus and a receiving apparatus equipped with the video decoding apparatus according to the present embodiment. (a) illustrates the transmitting apparatus equipped with the video coding apparatus, and (b) illustrates the receiving apparatus equipped with the video decoding apparatus.

At first, referring to FIG. 22, it will be described that the above-mentioned video coding apparatus 11 and the video decoding apparatus 31 can be utilized for transmission and reception of videos.

FIG. 22(a) is a block diagram illustrating a configuration of a transmitting apparatus PROD_A installed with the video coding apparatus 11. As illustrated in FIG. 22(a), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 imaging videos, a recording medium PROD_A5 recording videos, an input terminal PROD_A6 to input videos from the outside, and an image processing unit PRED_A7 which generates or processes images, as sources of supply of the videos input into the coder PROD_A1. In FIG. 22(a), although the configuration that the transmitting apparatus PROD_A includes these all is exemplified, a part may be omitted.

Note that the recording medium PROD_A5 may record videos which are not coded, or may record videos coded in a coding scheme for recording different than a coding scheme for transmission. In the latter case, a decoder (not illustrated) to decode coded data read from the recording medium PROD_A5 according to coding scheme for recording may be interleaved between the recording medium PROD_A5 and the coder PROD_A1.

FIG. 22(b) is a block diagram illustrating a configuration of a receiving apparatus PROD_B installed with the video decoding apparatus 31. As illustrated in FIG. 22(b), the receiving apparatus PROD_B includes a receiver PROD_B1 which receives modulation signals, a demodulation unit PROD_B2 which obtains coded data by demodulating the modulation signals received by the receiver PROD_B1, and a decoder PROD_B3 which obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 displaying videos, a recording medium PROD_B5 to record the videos, and an output terminal PROD_B6 to output videos outside, as supply destination of the videos output by the decoder PROD_B3. In FIG. 22(b), although the configuration that the receiving apparatus PROD_B includes these all is exemplified, a part may be omitted.

Note that the recording medium PROD_B5 may record videos which are not coded, or may record videos which are coded in a coding scheme for recording different from a coding scheme for transmission. In the latter case, a coder (not illustrated) to code videos acquired from the decoder PROD_B3 according to a coding scheme for recording may be interleaved between the decoder PROD_B3 and the recording medium PROD_B5.

Note that the transmission medium transmitting modulation signals may be wireless or may be wired. The transmission aspect to transmit modulation signals may be broadcasting (here, referred to as the transmission aspect where the transmission target is not specified beforehand) or may be telecommunication (here, referred to as the transmission aspect that the transmission target is specified beforehand). Thus, the transmission of the modulation signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmitting apparatus PROD_A/receiving apparatus PROD_B transmitting and/or receiving modulation signals in radio broadcasting. Broadcasting stations (broadcasting equipment, and the like)/receiving stations (television receivers, and the like) of cable television broadcasting are an example of transmitting apparatus PROD_A/receiving apparatus PROD_B transmitting and/or receiving modulation signals in cable broadcasting.

Servers (work stations, and the like)/clients (television receivers, personal computers, smartphones, and the like) for Video On Demand (VOD) services, video hosting services using the Internet and the like are an example of transmitting apparatus PROD_A/receiving apparatus PROD_B transmitting and/or receiving modulation signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multi-functional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Next, referring to FIG. 23, it will be described that the above-mentioned video coding apparatus 11 and the video decoding apparatus 31 can be utilized for recording and regeneration of videos.

Figure 23:
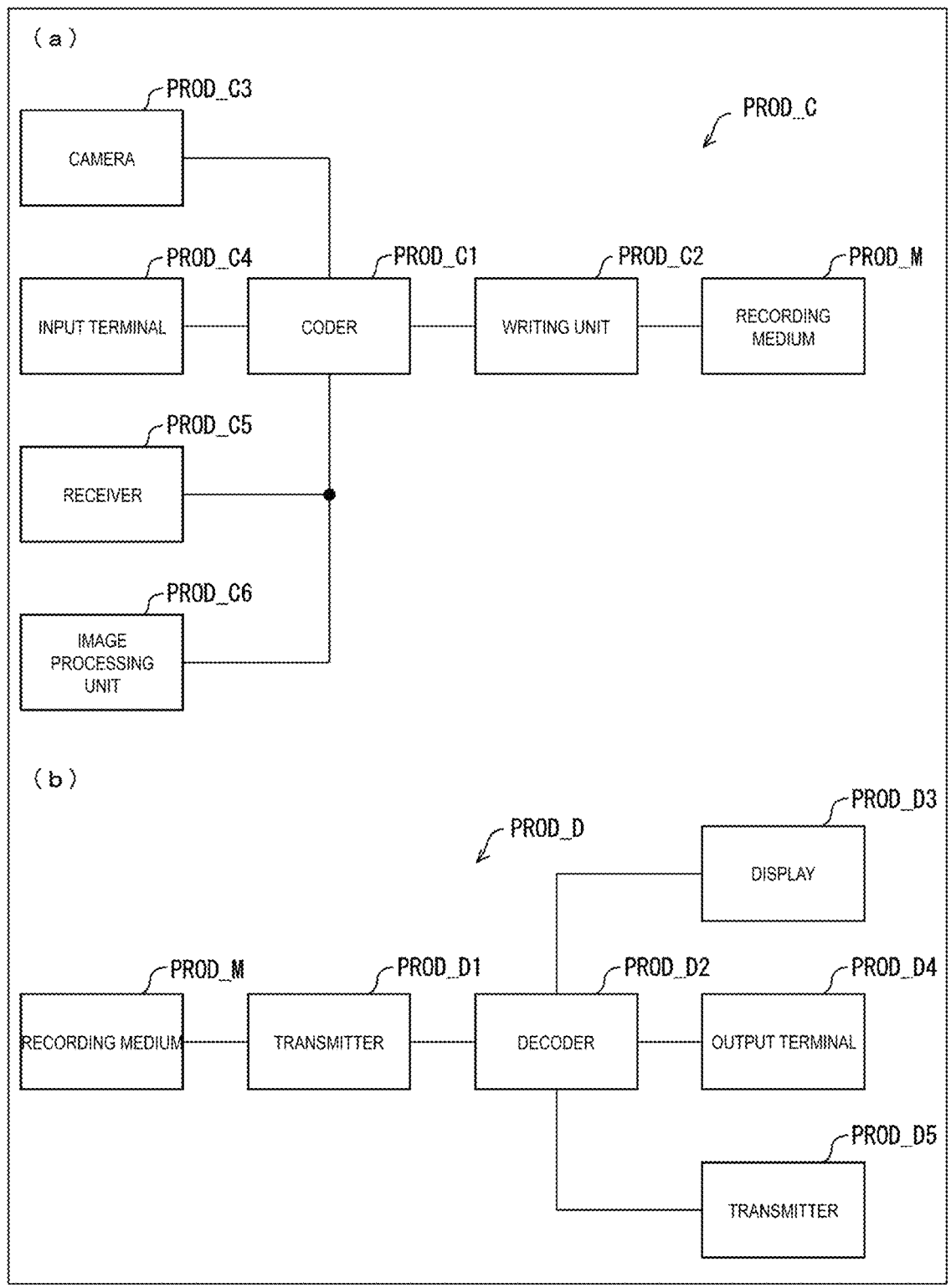
FIG. 23 is a diagram illustrating configurations of a recording apparatus equipped with the video coding apparatus and a regeneration apparatus equipped with the video decoding apparatus according to the present embodiment. (a) illustrates the recording apparatus equipped with the video coding apparatus, and (b) illustrates the regeneration apparatus equipped with the video decoding apparatus.

FIG. 23(*a*) is a block diagram illustrating a configuration of a recording apparatus PROD_C installed with the above-mentioned video coding apparatus 11. As illustrated in FIG. 23(*a*), the recording apparatus PROD_C includes a coder PROD_C1 which obtains coded data by coding a video, and a writing unit PROD_C2 which writes the coded data obtained by the coder PROD_C1 in a recording medium PROD_M. The above-mentioned video coding apparatus 11 is utilized as the coder PROD_C1.

Note that the recording medium PROD_M may be (1) a type built in the recording apparatus PROD_C such as Hard Disk Drive (HDD) or Solid State Drive (SSD), may be (2) a type connected to the recording apparatus PROD_C such as an SD memory card or a Universal Serial Bus (USB) flash memory, and may be (3) a type loaded in a drive apparatus (not illustrated) built in the recording apparatus PROD_C such as Digital Versatile Disc (DVD) or Blu-ray Disc (BD: trade name).

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the coder PROD_C1. In FIG. 23(*a*), although the configuration that the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interleaved between the receiver PROD_C5 and the coder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PROD_C.

FIG. 23(*b*) is a block illustrating a configuration of a regeneration apparatus PROD_D installed with the above-mentioned video decoding apparatus 31. As illustrated in FIG. 23(*b*), the regeneration apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type built in the regeneration apparatus PROD_D such as HDD or SSD, may be (2) a type connected to the regeneration apparatus PROD_D such as an SD memory card or a USB flash memory, and may be (3) a type loaded in a drive apparatus (not illustrated) built in the regeneration apparatus PROD_D such as DVD or BD.

The regeneration apparatus PROD_D may further include a display PROD_D3 displaying a video, an output terminal PROD_D4 to output the video to the outside, and a transmitter PROD_D5 which transmits the video, as the supply destination of the video output by the decoder PROD_D2. In FIG. 23(*b*), although the configuration that the regeneration apparatus PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, a coder (not illustrated) to code a video in a coding scheme for transmission may be interleaved between the decoder PROD_D2 and the transmitter PROD_D5.

Examples of such regeneration apparatus PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration apparatus PROD_D.

Realization as Hardware and Realization as Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the embodiments of the present invention can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEΣ 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiments of the present invention are not limited to the above-mentioned embodiments, and various modifications are possible within the scope of the claims. Thus, embodiments obtained by combining technical means modified appropriately within the scope defined by claims are included in the technical scope of the present invention.

INDUSTRIAL APPLICABILITY

The embodiments of the present invention can be preferably applied to a video decoding apparatus to decode coded data where graphics data is coded, and a video coding apparatus to generate coded data where graphics data is coded. The embodiments of the present invention can be preferably applied to a data structure of coded data generated by the video coding apparatus and referred to by the video decoding apparatus.

REFERENCE SIGNS LIST

10 CT information decoder
20 CU decoder
41 Video display apparatus
31 Video decoding apparatus
11 Video coding apparatus
3037 Subblock prediction parameter derivation unit (subblock prediction processing unit)
30371 Spatial-temporal subblock predictor (ATMVP prediction processing unit, STMVP prediction processing unit)
30372 Affine predictor (affine prediction processing unit)
30373 Matching motion derivation unit (matching prediction processing unit)
30374 OBMC predictor

The invention claimed is:

1. A motion vector derivation apparatus to derive a motion vector for each of multiple subblocks, the motion vector derivation apparatus comprising:
a matching prediction processing circuit that derives a first prediction block by using a first reference picture and a second prediction block by using a second reference picture, wherein
the matching prediction processing circuit:
derives a sum of an absolute difference between the first prediction block and the second prediction block, wherein the first prediction block and the second prediction block are modified by using a shift value derived by using a bit depth value, and
compares (i) the sum of the absolute difference to (ii) a threshold, which is derived based on a width of a subblock and a height of the subblock, wherein
if the sum of the absolute difference is smaller than the threshold, the matching prediction processing circuit terminates a process of deriving an initial motion vector,
otherwise, the matching prediction processing circuit derives the initial motion vector by using the sum of the absolute difference and derives the motion vector of the subblock by using the initial motion vector.

2. A video decoding apparatus comprising:
a matching prediction processing circuit that derives a first prediction block by using a first reference picture and a second prediction block by using a second reference picture, wherein
the matching prediction processing circuit:
derives a sum of an absolute difference between the first prediction block and the second prediction block, wherein the first prediction block and the second prediction block are modified by using a shift value derived by using a bit depth value, and compares (i) the sum of the absolute difference to (ii) a threshold, which is derived based on a width of a subblock and a height of the subblock, wherein if the sum of the absolute difference is smaller than the threshold, the matching prediction processing circuit terminates a process of deriving an initial motion vector, otherwise, the matching prediction processing circuit derives the initial motion vector by using the sum of the absolute difference and derives the motion vector of the subblock by using the initial motion vector.

3. A video coding apparatus comprising:

a matching prediction processing circuit that derives a first prediction block by using a first reference picture and a second prediction block by using a second reference picture, wherein the matching prediction processing circuit:

derives a sum of an absolute difference between the first prediction block and the second prediction block, wherein the first prediction block and the second prediction block are modified by using a shift value derived by using a bit depth value, and compares (i) the sum of the absolute difference to (ii) a threshold, which is derived based on a width of a subblock and a height of the subblock, wherein if the sum of the absolute difference is smaller than the threshold, the matching prediction processing circuit terminates a process of deriving an initial motion vector, otherwise, the matching prediction processing circuit derives the initial motion vector by using the sum of the absolute difference and derives the motion vector of the subblock by using the initial motion vector.

* * * * *